US012784113B2

(12) United States Patent
Hatfield et al.

(10) Patent No.: US 12,784,113 B2
(45) Date of Patent: Nov. 3, 2026

(54) AUTOMATED CLAIM INTEGRITY SYSTEM

(71) Applicant: Four Points Health Solutions LLC, Wentzville, MO (US)

(72) Inventors: Jeff Hatfield, Wentzville, MO (US); Chris Rogers, Bokeelia, FL (US)

(73) Assignee: Four Points Health Solutions, Wentzville, MO (US)

( * ) Notice: Subject to any disclaimer, the term of this patent is extended or adjusted under 35 U.S.C. 154(b) by 0 days.

(21) Appl. No.: 19/381,116

(22) Filed: Nov. 6, 2025

(65) Prior Publication Data

US 2026/0134486 A1 May 14, 2026

Related U.S. Application Data

(60) Provisional application No. 63/719,133, filed on Nov. 12, 2024.

(51) Int. Cl.
*G06Q 40/08* (2012.01)

(52) U.S. Cl.
CPC ........... *G06Q 40/09* (2025.08); *G06Q 40/084* (2025.08); *G06Q 40/085* (2025.08)

(58) Field of Classification Search
None
See application file for complete search history.

(56) References Cited

U.S. PATENT DOCUMENTS 7,725,335 B1 * 5/2010 Goodwin ............... G06Q 40/08 705/4
8,392,207 B2 * 3/2013 Olaniyan ............... G06Q 40/08 705/2
8,447,627 B1 * 5/2013 Cruise .................... G06Q 40/08 705/2

(Continued)

FOREIGN PATENT DOCUMENTS

CA 2816107 A1 * 5/2012 ............. G16H 70/20
CA 3121137 A1 * 6/2020 ........... G06N 3/0464

OTHER PUBLICATIONS

Saripalli et al. "Assessment of healthcare claims rejection risk using machine learning," 2017 IEEE 19th International Conference on e-Health Networking, Applications and Services (Healthcom), Dalian, China, 2017, pp. 1-6, (Year: 2017).*

(Continued)

*Primary Examiner* — Kelly S. Campen

(74) *Attorney, Agent, or Firm* — Kevin J Fournier Intellectual Property Legal Services Ltd; Kevin J Fournier

(57) ABSTRACT

A system implements a method for managing claim integrity in healthcare revenue cycle management by collecting a dataset from electronic health records and payer records, including historical medical claims with approval and denial outcomes. Machine learning engines train models using patterns in claim denial outcomes. The system receives real-time data, including medical claims awaiting submission. Machine learning engines process each claim by extracting features, generating denial probability scores and denial category classifications, and providing explainability values through SHAP analysis. For claims with a denial probability above a specified threshold, the system identifies corrective actions, automates corrections via automation agents, and recomputes the claim scores. The system receives remittance data from payer systems, including medical claim adjustment reason codes for denied claims, and retrains the models based on this feedback, creating a closed-loop learning architecture.

20 Claims, 12 Drawing Sheets

(56) References Cited

U.S. PATENT DOCUMENTS

| | | | | | |
|---|---|---|---|---|---|
| RE44,419 | E * | 8/2013 | Goodwin | G06Q 40/02 | 705/4 |
| 8,533,009 | B2 * | 9/2013 | Olaniyan | G06Q 50/18 | 705/4 |
| 8,688,480 | B1 * | 4/2014 | Singh | G06Q 10/10 | 705/2 |
| 11,538,112 | B1 * | 12/2022 | Singh | G06Q 10/10 | |
| 12,210,590 | B2 * | 1/2025 | Menard | G06F 3/04847 | |
| 12,265,448 | B2 * | 4/2025 | Turner | G06F 11/0793 | |
| 12,373,897 | B1 * | 7/2025 | Tran | G06F 40/295 | |
| 12,462,910 | B2 * | 11/2025 | Khashman | G16H 10/60 | |
| 12,633,400 | B2 * | 5/2026 | Zahora | G16H 15/00 | |
| 2005/0137912 | A1 * | 6/2005 | Rao | G06Q 40/08 | 705/4 |
| 2007/0282628 | A1 * | 12/2007 | Satterfield | G16H 40/67 | 705/2 |
| 2008/0177577 | A1 * | 7/2008 | Olaniyan | G06Q 10/10 | 705/3 |
| 2022/0044328 | A1 * | 2/2022 | Ligon | G16H 10/60 | |
| 2023/0084146 | A1 * | 3/2023 | Singh | G06Q 10/10 | 705/4 |
| 2023/0214455 | A1 * | 7/2023 | Menard | G06N 7/01 | 706/12 |
| 2023/0316225 | A1 * | 10/2023 | Zhao | G06N 5/022 | 705/2 |
| 2023/0317260 | A1 * | 10/2023 | Zahora | G06Q 10/0639 | 705/3 |
| 2023/0401274 | A1 * | 12/2023 | Denninghoff | G06F 16/9577 | |
| 2024/0281887 | A1 * | 8/2024 | Gaur | G06Q 40/08 | |
| 2024/0394801 | A1 * | 11/2024 | Fossier | G16H 50/70 | |
| 2025/0111440 | A1 * | 4/2025 | Khashman | G06Q 40/08 | |
| 2025/0209402 | A1 * | 6/2025 | Gholap | G16H 40/20 | |
| 2025/0245750 | A1 * | 7/2025 | Heinen | G06N 20/00 | |
| 2025/0278457 | A1 * | 9/2025 | Menard | G06F 18/217 | |
| 2025/0292331 | A1 * | 9/2025 | Lin | G06Q 40/08 | |
| 2025/0337742 | A1 * | 10/2025 | Jeffords | G06F 21/6218 | |
| 2026/0044826 | A1 * | 2/2026 | Bose | G06Q 10/10 | |
| 2026/0120191 | A1 * | 4/2026 | Khashman | G06Q 40/08 | |

OTHER PUBLICATIONS

Lundberg et al. "A Unified Approach to Interpreting Model Predictions" 2017, Cornell University arXiv:1705.07874v2 [cs.AI] https://doi.org/10.48550/arXiv.1705.07874 (Year: 2017).*

Kim et al. "Deep Claim: Payer Response Prediction from Claims Data with Deep Learning" Jul. 2020 Cornell university arxiv (arxiv logo>cs>arXiv:2007.06229 https://doi.org/10.48550/arXiv.2007.06229 (Year: 2020).*

Sheu et al. . A Survey on Medical Explainable AI (XAI): Recent Progress, Explainability Approach, Human Interaction and Scoring System. Sensors (Basel). Oct. 21, 2022;22(20):8068. doi: 10.3390/s22208068. PMID: 36298417; PMCID: PMC9609212. (Year: 2022).*

Russell, et al. Exploiting Machine Learning Bias: Predicting Medical Denials. (Spring 2024; published May 20, 2024). Proceedings of the AAAI Symposium Series, 3(1), 58-63. https://doi.org/10.1609/aaaiss.v3i1.31181 (Year: 2024).*

Guan, "Predicting Medical Claim Denial Using Logistic Regression and Decision Tree Algorithm," 2024 3rd International Conference on Health Big Data and Intelligent Healthcare (ICHIH), Zhuhai, China, 2024, pp. 7-10, doi: 10.1109/ICHIH63459.2024.11064794. (Year: 2024).*

Singh et al. "Application of Data Analytics in Healthcare Management: A Comprehensive Review," 2024 2nd DMIHER International Conference on Artificial Intelligence in Healthcare, Education and Industry (IDICAIEI), Wardha, India, 2024, pp. 1-6, doi: 10.1109/IDICAIEI61867.2024.10842904. (Year: 2024).*

Ho et al. "Unveiling the Black box: Determinants of Claims Investigation, Delay Payment, and Claim Denial in Private Health Insurance" Aug. 1, 2024). Available at SSRN: https://ssrn.com/abstract=5153822 or http://dx.doi.org/10.2139/ssrn.5153822 (Year: 2024).*

Tekale et al. "AI and Predictive Analytics in Underwriting, 2022 Advancements in Machine Learning for Loss Prediction and Customer Segmentation" 2022, International Journal of Artificial Intelligence, Data Science, and Machine Learning Grace Horizon Publication | vol. 3, Issue 1, 95-113, (Year: 2022).*

Rahman et al. "Advancing Explainable and Secure Machine Learning for Decision Support in U.S. Regulated Systems" May 29, 2023, ASRC Procedia: Global Perspectives in Science and Scholarship, vol. 3; Issue: 1, pp. 231-273 (Year: 2023).*

Gollapudi, Pavan Kumar. "End-to-end automation in insurance claims: A guidewireintegrated AI framework for intelligent processing." World Journal of Advanced Research and Reviews 22 (2024): 2295-2310. (Year: 2024).*

Rhodes, Callum Patrick Harrington "Secure Healthcare Data Exchange and Financial Fraud Detection Using AI-Driven Cloud Data Integration" May 2024, International Journal of Advanced Research in Computer Science & Technology (IJARCST) vol. 7, Special Issue 1 (Year: 2024).*

* cited by examiner

AUTOMATED CLAIM INTEGRITY SYSTEM

CROSS REFERENCE

This non-provisional patent application claims the benefit under 35 U.S.C. § 119(e) of U.S. Provisional Patent Application Ser. No. 63/719,133, titled AUTOMATED CLAIM INTEGRITY SYSTEM, filed on Nov. 12, 2024, the disclosure of which is incorporated by reference herein in its entirety.

FIELD

Various embodiments of the disclosure relate to artificial intelligence-based automated systems for claim integrity. More specifically, the automated claim integrity system may include an integrated framework of multiple modules, engines, models, and components that execute operations to improve the efficiency and accuracy of predicting and correcting medical claim denials, as well as monitoring the integrity of medical claim quality.

BACKGROUND

The processing of medical claims is a vital function within healthcare provider organizations, especially in Revenue Cycle Management units, where multiple complex processes must be coordinated to secure timely and accurate insurance reimbursements. Healthcare providers face significant operational challenges in efficiently processing patient claims due to complex workflows that often manage tens of thousands of claims each month. The complexity of managing multiple stakeholders, including patients, payers, regulatory agencies, and internal departments, along with strict compliance requirements and payer-specific rules, creates an environment where delays, errors, and claim denials have become common issues in the healthcare reimbursement process.

Existing and traditional systems have proven inadequate in addressing the core inefficiencies that hinder claims processing workflows. These systems heavily depend on manual data entry and human intervention to advance claims through sequential steps, which creates bottlenecks at each transition point where staff must switch between multiple work queues, payer portals, and coding systems. These manual processes are inherently error-prone and require significant resources, with healthcare organizations often employing hundreds of staff members to manage repetitive claims processing tasks. The absence of predictive capabilities in traditional EHR platforms means that potential claim issues are only recognized after submission, leading to denial rates that severely impact provider revenue. Additionally, the lack of real-time tracking and automated quality control prevents organizations from proactively addressing claim issues before they result in denials or payment delays.

The technical limitations of current systems are especially evident in their inability to adapt to changing payer needs and denial patterns. Conventional solutions utilize static, hard-coded claim edits and payer rules that necessitate manual updates whenever payers modify their requirements, which can occur on a weekly basis. These systems cannot learn from past denial patterns or forecast denial likelihood based on claim features, resulting in providers being reactive rather than proactive in managing claims. The fragmented workflows, where claim corrections are made only after payer responses are received, for example, often 30 to 90 days after submission, result in longer revenue cycles and increased administrative work. Additionally, the lack of closed-loop feedback mechanisms means that useful information from remittance files and denial codes is not systematically used to improve future claim processing.

Alternative methods to tackle these issues have also failed to deliver solutions. Manual processing remains costly and error-prone, with the repetitive nature of the work leading to high error rates and staff turnover. Outsourcing, although potentially cheaper than maintaining in-house processes, presents its own challenges, including the loss of process control, the risk of contract violations when work is sent offshore, and an ongoing reliance on manual steps that do not fundamentally address the core inefficiencies. Solutions that focus solely on small parts of claims processing lack the necessary integration and coverage to improve overall revenue cycle performance. These approaches' failure to offer real-time claim scoring, automated correction workflows, and adaptive learning from payer feedback has left healthcare providers without effective tools to enhance their revenue cycle management.

The cumulative impact of the deficiencies described above is evident in delayed reimbursements, higher claim denials, significant revenue write-offs, and ultimately, negative effects on patient care when administrative delays hinder timely access to essential treatments. Healthcare providers continue to experience substantial financial strain due to inefficient claims processing, as administrative costs divert resources that could otherwise be used for patient care. The absence of standardization, automation, and predictive intelligence in current systems has created an operational environment in which providers struggle to maintain financial stability while complying with increasingly complex payer requirements and regulatory standards.

SUMMARY

A system and method are provided for claim integrity in healthcare revenue cycle management. The system described in the subject specification may implement the steps of the method.

In an embodiment, the system and method provide for receiving a first dataset from first data sources, including electronic health records and payer records. The first dataset includes historical medical claims, including those associated with approval and denial outcomes. Each historical claim includes first attributes such as procedure codes, diagnosis codes, payer identifiers, and historical denial reasons. This mechanism enables the system to learn from actual claim processing outcomes across diverse healthcare providers and payers, establishing a knowledge base that reflects real-world claim submission patterns and denial scenarios. The system and method provide training for machine learning models using the received first dataset and machine learning engines. The training includes adjusting the weights of nodes in gradient-boosted decision trees based on patterns observed in historical claim denial outcomes. The gradient-boosted decision tree architecture provides computational efficiency and interpretability, capturing complex nonlinear relationships between claim attributes and denial probabilities through the iterative refinement of decision boundaries.

The system and method provide for receiving a second dataset from second data sources in real-time. The second dataset includes medical claims awaiting submission and associated with medical procedures, treatments, or services, each comprising second attributes. Real-time data ingestion enables immediate analysis of current claims before submission to payers, allowing proactive intervention to prevent denials rather than reactive correction after adjudication. In an embodiment, the system and method process each medical claim from the medical claims using trained machine learning models implemented by machine learning engines. This processing architecture enables the parallel evaluation of multiple claims while maintaining the consistent application of learned denial-prediction logic. The system and method extract claim features from each medical claim, including payer-specific patterns, provider histories, and coding relationships. Feature extraction transforms raw claim data into meaningful predictive signals that capture the complex dependencies between clinical documentation, billing codes, and payer-specific adjudication rules. In an embodiment, the system and method apply trained machine learning models to generate a denial probability score and a denial category classification for each medical claim. Dual-output prediction provides both quantitative risk assessment and qualitative categorization of likely reasons for denial, enabling targeted intervention strategies.

The system and method provide for generating explainability values using Shapley additive explanations (SHAP) analysis to identify features that contribute to the denial probability score. Explainability analysis reveals which specific claim attributes drive denial predictions, enabling clinical and billing staff to understand model reasoning and prioritize correction efforts on the most impactful deficiencies. In an embodiment, the system and method provide, for each medical claim with a denial probability score exceeding a threshold value, for identifying corrective actions based on the denial category classification and the explainability values. Threshold-based intervention ensures computational resources focus on high-risk claims while allowing low-risk claims to proceed without unnecessary review. The system and method provide automated corrections to medical claims by executing automation agents configured for specific denial types. Specialized agents enable domain-specific correction logic tailored to distinct denial categories such as authorization deficiencies, coding errors, or coverage verification issues. In an embodiment, the system and method provide re-scoring of the medical claims based on the automated corrections. Iterative re-scoring validates that applied corrections successfully reduce denial risk before claim submission, preventing incomplete remediation.

The system and method provide, upon verifying that the denial probability score is below the threshold value, transmitting the medical claims to payer systems for processing. Verification-gated submissions ensure that only claims meeting quality thresholds reach payers, thereby reducing denial rates and accelerating reimbursement cycles. In an embodiment, the system and method provide for receiving remittance data from the payer systems, including medical claim adjustment reason codes for any denied claims. Remittance data integration captures actual adjudication outcomes, enabling measurement of prediction accuracy and identification of evolving denial patterns.

The system and method provide retraining of machine learning models based on remittance data to improve future denial predictions. The computer-implemented method operates as a closed-loop learning process that continuously improves denial prediction accuracy and maintains medical claim integrity by detecting and correcting deficiencies in medical claims before submission to payers. Closed-loop retraining enables the system to adapt to changing payer policies, seasonal patterns, and regulatory updates without manual model maintenance, ensuring sustained prediction accuracy over time.

The system and method provide machine learning models comprising gradient-boosted decision tree ensembles. Training machine learning models includes constructing decision trees with controlled depth to prevent overfitting, applying gradient descent to minimize prediction error, and implementing early stopping when validation performance plateaus. Ensemble methods aggregate predictions from multiple weak learners to achieve robust performance across diverse claim types, while regularization techniques prevent memorization of training data noise. In an embodiment, the system and method provide automation agents comprising an authorization agent that interfaces with payer systems to verify and update prior authorization data, a coding agent that validates and corrects procedure and diagnosis code combinations, and a coverage agent that verifies patient eligibility and benefit information. Specialized agent architecture enables concurrent execution of domain-specific validation and correction tasks, reducing processing latency compared to sequential validation approaches.

The system and method provide for extracting claim features, which include calculating rolling-window statistics of historical denial rates per payer, encoding categorical variables using target encoding based on denial outcomes, and implementing interaction features between procedure codes and diagnosis codes. Rolling window statistics capture temporal trends in payer behavior while target encoding transforms high-cardinality categorical variables into continuous representations that preserve their relationship with denial outcomes. In an embodiment, the system and method maintain a distributed feature store for caching computed features, implement real-time scoring with a latency of less than 100 milliseconds, and route medical claims to corresponding automation agents based on denial-type predictions. Distributed caching eliminates redundant feature computation for claims with overlapping attributes, while sub-100-millisecond scoring enables immediate feedback during claim entry workflows.

The system and method provide receiving remittance data comprising parsing electronic remittance advice files to extract denial codes, correlating actual denial outcomes with predicted probabilities, and calculating a population stability index to detect distribution drift. Population stability monitoring identifies when claim characteristics or payer policies shift beyond the training distribution, triggering model retraining before prediction accuracy degrades. In an embodiment, the system and method provide for generating visual analytics, including dashboards that display key performance indicators for denial rates, explainability visualizations that show feature contributions to denial predictions, and compliance reports that display decision transparency. Visual analytics enable stakeholders to monitor system performance, understand model behavior, and demonstrate regulatory compliance with explainable AI requirements in healthcare.

The system and method provide automated corrections, including updating missing or incorrect authorization numbers, modifying diagnosis codes to align with medical necessity requirements, adjusting service dates to comply with timely filing limits, and correcting provider identification and credentialing information. Automated correction logic encodes domain knowledge about common denial reasons and their corresponding remediation strategies, reducing manual review burden. In an embodiment, the system and method provides interfacing with electronic health record systems comprising extracting structured claim data in real-time and storing computed features in a distributed cache with sub-100 millisecond access latency, implementing bidirectional data flow that automatically updates claim records based on denial predictions and correction outcomes, and executing parallel processing workflows for concurrent validation of authorization, coverage, and coding accuracy. Bidirectional integration enables the system to both read claim data from electronic health record systems and write back corrections, maintaining data consistency across the healthcare IT infrastructure.

In an embodiment, the system and method address inefficiencies in healthcare revenue cycle management by combining predictive analytics, automated correction, and continuous learning to reduce claim denial rates, accelerate reimbursement cycles, and minimize manual rework. The closed-loop architecture ensures sustained performance improvement as the system encounters new claim types, payer policies, and regulatory requirements.

DETAILED DESCRIPTION

Figure 1:
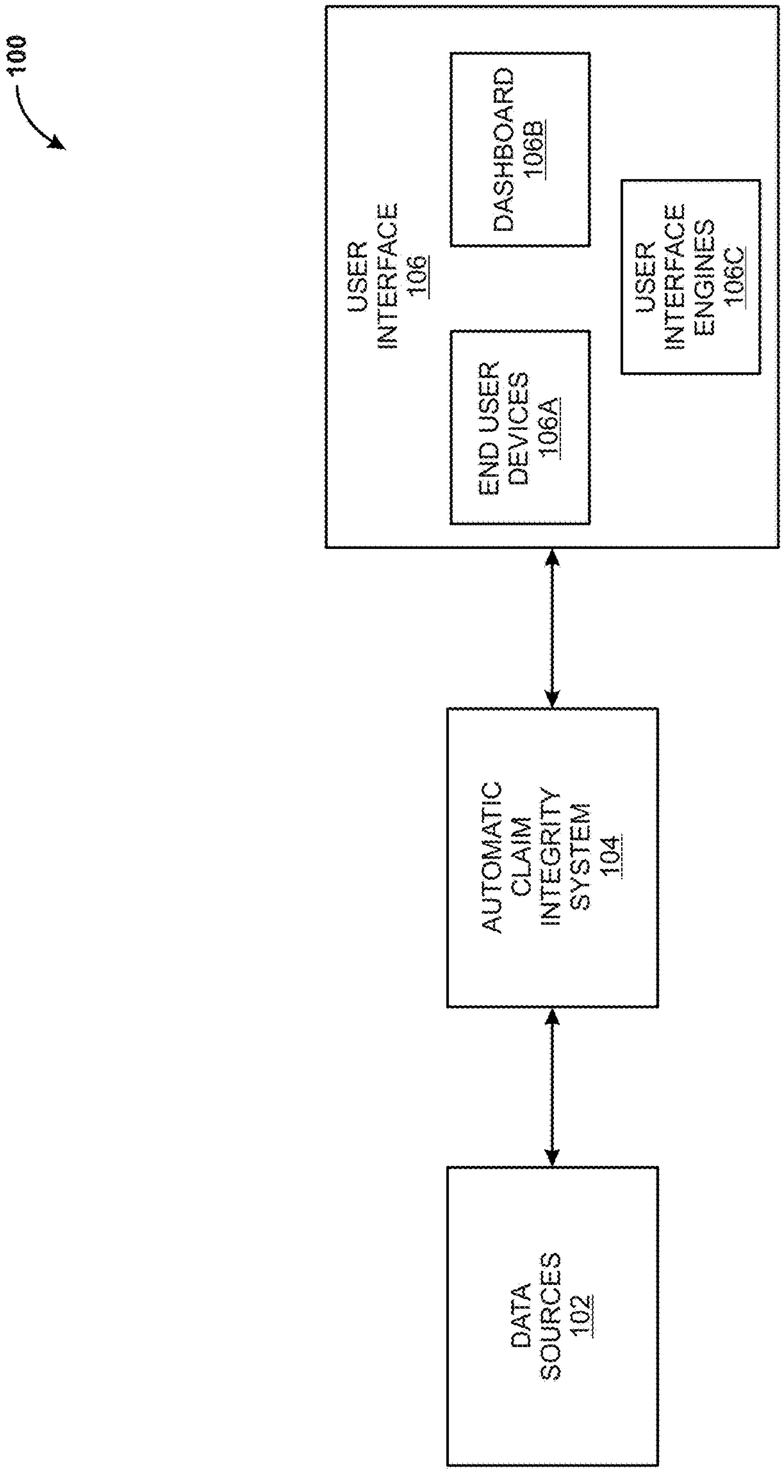
FIG. 1 illustrates an environment showing a communicatively coupled arrangement of data sources, an ACIS, and a user interface, according to an exemplary embodiment.

The following description provides numerous specific details to provide a thorough understanding of the present disclosure. However, one skilled in the art will realize that the present disclosure may be practiced without these specific details. In other instances, systems, apparatuses, and methods are shown in block diagram form only to avoid obscuring the present disclosure.

In this specification, reference to "one embodiment," "an embodiment," or "example embodiment" means that a particular feature, structure, or characteristic described in connection with the embodiment is included in at least one embodiment of the present disclosure. The appearance of the phrase "in one embodiment" in various places in the specification does not necessarily all refer to the same embodiment, nor are separate or alternative embodiments mutually exclusive of other embodiments. Further, the terms "a" and "an" do not denote a limitation of quantity but denote at least one of the referenced items. Moreover, various features are described, which may be exhibited by some embodiments and not by others. Similarly, various requirements are described, which may apply to some embodiments but not to others.

The terms "comprise," "comprising," "includes," or any other variations thereof are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus preceded by "includes . . . a" do not, without more constraints, preclude the existence of other elements or additional elements in the system or method.

The terms "machine learning model" or "machine learning engine" may refer to a computational, statistical, or mathematical model or engine trained using machine learning techniques. The machine learning models may be trained on a dataset using techniques or mechanisms that learn from or model the dataset's information, using one or more machine learning engines. An artificial intelligence model may refer to a model built using simple or complex Neural Networks, deep learning techniques, or computer vision mechanisms. The artificial intelligence model learns from data and applies that learning to achieve specific, predefined objectives.

An artificial intelligence (AI) based automated claim integrity system (ACIS) is described herein. In an embodiment, the ACIS may also be referred to as a system, an integrated system, a framework, a platform, etc., depending on the context or the implementation used with hardware processing elements. The ACIS may also include a communicatively coupled, integrated framework of multiple machine learning engines and models that can execute operations independently or in cooperation to perform specific functions. The ACIS may include the independent or collaborative execution of operations by multiple engines, models, and circuitries that execute logic, code, and other instructions. An authorization request or a request for authorization may correspond to a request to authorize medical services or procedures, or medical claims, either before or after a procedure is performed. The claims process following the procedure may include medical claims for authorizing specific procedures, medical processes, and bill settlements, etc. An engine may correspond to a special-purpose program or an executable code that enables the execution of core and/or supplementary functions or operations.

In an embodiment, agents, automation agents, or software agents may include autonomous software components configured to execute specific tasks and operations within the system architecture. Each agent includes computer-executable instructions stored in non-transitory computer-readable memory and executed by one or more processors to perform designated functions independently or in coordination with other system components. Agents may monitor data streams, identify patterns, instantiate automated workflows, interact with machine learning models, and execute corrective actions based on predefined rules and learned behaviors. When implemented, agents operate as processes running on one or more processors of a special-purpose computer system.

In an embodiment, engines may include processing components that execute core functional operations within the integrated system. Each engine includes a combination of hardware and software components or elements, including processor-executable instructions, data-processing logic, and computational resources dedicated to specific operational domains. Engines may be implemented as discrete software modules executed by general-purpose or special-purpose processors, as application-specific integrated circuits (ASICs), or as field-programmable gate arrays (FPGAs) configured to perform designated processing tasks. Multiple engines may operate concurrently on a single special-purpose computer or be distributed across multiple computing devices connected via network interfaces.

In an embodiment, modules may include functional units of the system that encapsulate related operations, data structures, and processing logic. Each module includes computer program instructions to perform a specific set of related functions within the broader system architecture. Modules may include multiple sub-components, interfaces, and data processing routines that collectively implement a particular aspect of system functionality. When executed, modules operate as collections of computer-executable instructions loaded into system memory and processed by one or more central processing units (CPUs) or special-purpose processors.

In an embodiment, components may include discrete functional elements within the system architecture, implemented as hardware circuits, software routines, interfaces, or combinations thereof. Components include interfaces for data exchange, processing units for computational operations, storage elements for data persistence, and communication elements for system integration. Each component may be realized as executable code stored on computer-readable media, special-purpose hardware circuits, or hybrid implementations combining programmable logic with dedicated processing elements.

In an embodiment, the framework may include a structured architecture that defines the organization, interconnection, and operational relationships among system elements. The framework includes the foundational infrastructure, including communication protocols, data exchange mechanisms, processing workflows, and integration interfaces that enable coordinated operation of engines, modules, components, and agents. The framework provides standardized methods for component interaction, resource allocation, error handling, and system extensibility, implemented through a combination of software libraries, application programming interfaces (APIs), and system services executed on special-purpose computing hardware.

In an embodiment, a platform may include a computing environment including hardware infrastructure, operating system services, middleware components, and application-level functionalities that collectively support system operations. The platform comprises physical computing resources, including processors, memory systems, storage devices, and network interfaces, as well as software layers such as operating systems, runtime environments, and system services. The platform provides the execution environment for all system components, managing resource allocation, process scheduling, and inter-component communication.

In an embodiment, an integrated system may comprise a complete, operational assembly consisting of multiple interconnected engines, modules, components, and agents that function as a unified whole. The integrated system implements coordinated processing workflows, shared internal and external data repositories, common communication channels, and synchronized operational behaviors across all constituent elements. The integrated system may be represented as a distributed computing architecture comprising multiple physical or virtual computing devices, or as a consolidated implementation on a single, special-purpose computer system equipped with the necessary processing, memory, and communication resources.

In an embodiment, the above-described architectural elements may be implemented using a special-purpose computer comprising one or more processors, including central processing units (CPUs), graphics processing units (GPUs), tensor processing units (TPUs), neural processing units (NPUs), field-programmable gate arrays (FPGAs), or application-specific integrated circuits (ASICs). The special-purpose computer also includes system memory, comprising both volatile and non-volatile storage, as well as network interfaces for external communication and system buses for internal data transfer. Computer-executable instructions implementing the described functionality are stored in non-transitory computer-readable media and loaded into system memory for execution by the appropriate processing elements.

The implementation may use various types of processors optimized for specific computational tasks. Machine learning operations may be accelerated using special-purpose AI processors configured for parallel processing of tensor operations, matrix multiplications, and neural network computations. These processors may use reduced-precision arithmetic and include dedicated hardware components such as multiply-accumulate units and on-chip memory to optimize performance for artificial intelligence workloads.

FIG. 1 illustrates an environment 100 showing a communicatively coupled arrangement of data sources 102, an ACIS 104, and a user interface 106, according to an exemplary embodiment. The data sources 102 may include information or data from multiple sources. For example, data sources 102 may include internal and external data repositories. In an embodiment, the external data repositories may include external data from outside the healthcare entities, such as healthcare data, national health services, the center for disease control, and including data such as healthcare data, national health services, Centers for Disease Control, etc. The internal data repositories may include internal data from inside of the healthcare entities and including data such as clinical data, electronic health record (EHR), administrative data, claims data, patients, care coordinators, medical licensed providers, pharmacies, and other providers, medical claims data, data associated with authorization requests, such as historical authorization requests (e.g., historically approved authorization requests, historically rejected or denied authorization requests, historical authorization requests flagged for reviews, redirecting the authorization requests to Medicaid or Medicare for further scrutiny, etc.), and the like. The data in internal and external repositories may be stored in multiple formats and normalized and processed by machine learning engines and/or models (not shown) in ACIS 104.

In an embodiment, the data in the external repositories may additionally include measures or metrics for benchmarking. For example, key performance indicators (KPIs) that measure the quality of tasks related to healthcare provisioning, measures of information or data associated with the treatment of prevalent diseases, such as cancer, and measures of cost associated with healthcare provisioning for the diagnosis and/or treatment of prevalent diseases, etc.

The ACIS 104 may be configured to receive data from electronic health records (EHRs), including reimbursement information in the form of transactions from payers to providers, claim submissions in the form of transactions from providers to payers, claim status requests in the form of transactions, and claim status responses in the form of transactions. The ACIS 104 receives both eligibility and benefit requests, as well as responses, via transactions. The ACIS 104 also receives data from patient accounts, including demographic and insurance information, as well as data from discharge records and work queues (WQs). Furthermore, the ACIS 104 may receive data from payers, including information related to status, eligibility, benefits, authorization, and provider enrollment.

The ACIS 104 integrates data from national clinical databases, including but not limited to clinical trials, registries, and data from the Centers for Medicare and Medicaid Services (CMS), as well as data from foundations and commercial databases. The ACIS 104 also receives data from monitoring equipment, including remote patient monitoring (RPM) data, inpatient monitoring data, and data from intensive care units (ICUs). The integrated data may be processed and analyzed to facilitate efficient and accurate claims processing, including claims submission, tracking claims status, and reimbursement processing. The ACIS 104 may provide real-time monitoring and tracking capabilities, enabling healthcare providers to identify and address issues promptly, thereby reducing delays and inefficiencies in the claims processing workflow.

The data repositories or data sources may be internal, private, or restricted to a specific healthcare entity, such as a hospital, which provides healthcare services in a specific geographical area. Such internal data repositories may include information on services offered and associated costs, demographic coverage, patient populations, and risk factors associated with patients based on their health conditions, lifestyle habits, and socioeconomic factors. Furthermore, information or data may also include the influence of demographic factors, such as Medicaid and disability status, gender, age, and whether a beneficiary or patient resides in a community or an institution. For example, the patient or beneficiary may live in a skilled nursing facility.

Further, the information may include data on assessed risk, care coordinators, licensed providers, healthcare services, and other relevant healthcare professionals. The data stored in the external and internal data repositories may be interchangeably referred to as the first dataset, the second dataset, the third dataset, etc. The multiple engines and/or models of the ACIS 104 may execute operations on the data to perform processing or analysis, and the results of the processing or analysis may provide insights into tasks that may be used to make further decisions.

The ACIS 104 may include the integration of multiple machine learning engines and machine learning models (not shown). The ACIS 104 may implement multiple machine learning engines, models, and circuits, with the circuits executing code to perform specific operations or functions. The machine learning engines may execute operations by augmenting or accessing data from various sources, including historical and real-time data, internal data repositories (e.g., independent hospitals and hospital networks), and external data repositories.

The user interface (UI) 106 system may include end-user devices 106A, dashboards 106B, and user interface engines 106C. The UI 106 system may be configured to create or generate dashboards and UIs to display the visualizations created or generated in response to the execution of the operations by the ACIS 104. The dashboards and UIs created or generated may be configured to receive inputs, and based on those inputs, the ACIS 104 may execute additional operations to validate the integrity of the claims.

Figure 2:
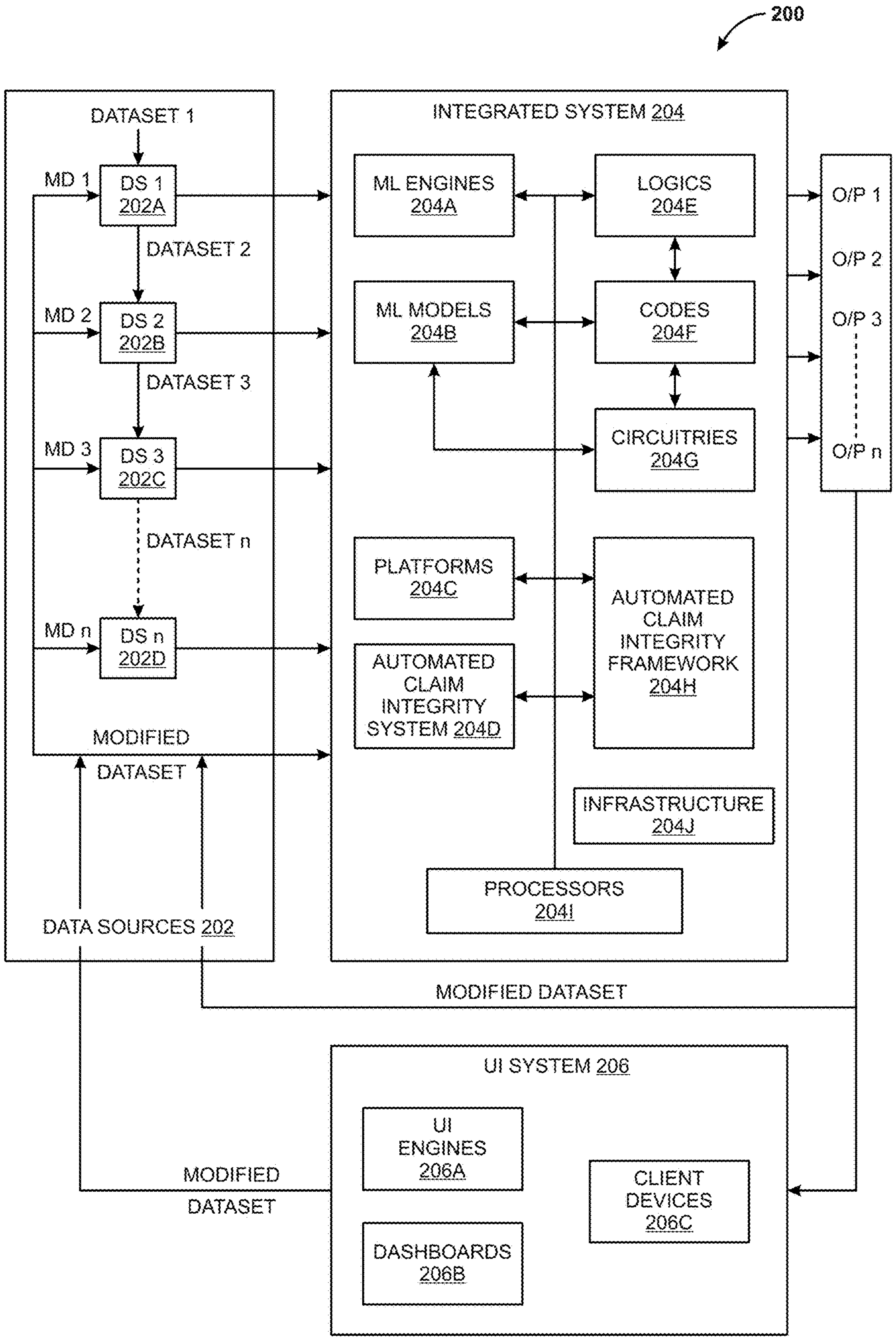
FIG. 2 illustrates an environment showing the deployment of an integrated system that includes the automated claim integrity framework, according to an exemplary embodiment.

FIG. 2 illustrates an environment 200 showing the deployment of an integrated system that includes the automated claim integrity framework, according to an exemplary embodiment. FIG. 2 is described in conjunction with FIG. 1. In an embodiment, FIG. 2 shows data sources 202, an integrated system 204, and a UI system 206. The system components may include dataset 1 (DS 1) 202A, dataset 2 (DS 2) 202B, dataset 3 (DS 3) 202C, dataset n (DS n) 202D, machine learning (ML) engines 204A, machine learning (ML) models 204B, platform 204C, ACIS 204D, logic 204E, codes 204F, circuitries 204G, automated claim integrity framework 204H, processors 204I, infrastructure 204J, UI engines 206A, dashboards 206B, client devices 206C, modified dataset 1 (MD 1), modified dataset 2 (MD 2), modified dataset 3 (MD 3), modified dataset n (MD n), output 1 (O/P 1), output 2 (O/P 2), output 3 (O/P 3), and output n (O/P n).

In an embodiment, the data sources 202 may include multiple distinct datasets. For instance, Dataset 1 (DS 1) 202A may include historical claim transactions with associated approval and denial outcomes. Each historical claim transaction may include attributes such as procedure codes, diagnosis codes, payer identifiers, and historical reasons for denials. Dataset 2 (DS 2) 202B may include real-time medical claims awaiting submission associated with medical procedures, treatments, or services. Each medical claim may include patient demographic information, insurance details, and benefit eligibility data. Dataset 3 (DS 3) 202C may include payer remittance data, including claim adjustment reason codes, payment histories, and resolution outcomes, which may support predictive analytics and process improvement. Dataset n (DS n) 202D may include supplementary information that supports various integrated system functions, such as reference data, compliance requirements, auxiliary documentation, and external data from national clinical databases.

The integrated system 204 executes operations as a processing architecture, receiving datasets from data sources 202 and executing operations across multiple interconnected components. The ML engines 204A may execute machine learning operations on the received datasets. For example, the ML engines 204A may implement gradient-boosted decision tree algorithms that process claim features extracted from medical claim data. The ML models 204B may be trained using the datasets received from the data sources 202. For instance, the training may include adjusting node weights in gradient-boosted decision trees based on patterns identified in claim denial outcomes. Model parameters are then iteratively adjusted to minimize a loss function, which quantifies the difference between the model's predictions and the ground-truth labels in the training data. In an embodiment, operations executed on the data set may include splitting the dataset (e.g., the first dataset) into training, validation, and test sets using temporal stratification. The steps of training the machine learning engine may include iteratively adjusting model parameters to minimize a loss function that combines a prediction error term and false-negative penalty weights, and implementing cross-validation to prevent overfitting to payer-specific patterns.

The platforms 204C may provide computational infrastructure for executing the ML engines 204A and the ML models 204B. For instance, the platform 204C may include special-purpose hardware configurations optimized for processing large volumes of claim data. The ACIS 204D may be communicatively coupled to execute operations across the integrated system 204. The ACIS 204D may manage workflow orchestration, resource allocation, and system synchronization. The logic 204E may include multiple combinations of rules and decision trees that may manage claim processing workflows. In an embodiment, the logic 204E may be updated based on outputs from the ML models 204B to adapt to emerging patterns in claim denials.

The codes 204F may be executed by the circuitries 204G to implement specific functions or operations. For instance, the code 204F may implement routines, mechanisms, processes, or algorithms for feature extraction, data normalization, and model inference. The circuitries 204G may include processing units that may execute the codes 204F. The circuitries 204G may be configured as application-specific integrated circuits (ASICS) or graphics processing units (GPUs) that may provide computational or enhanced capabilities for machine learning operations. The automated claim integrity framework 204H may provide an architectural structure for integrating the various components of the integrated system 204. In an embodiment, the automated claim integrity framework 204H may include an integrated set of modules, engines, components, and other elements that define interfaces, data flow patterns, and communication protocols among system components. In an embodiment, the processors 204I may execute instructions stored in memory to integrate operations across the integrated system 204. For instance, the processors 204I may facilitate the execution of operations or functions such as data transformation, model execution, execution of operations or functions, and output generation. In an embodiment, the infrastructure 204J may include the computational and storage resources that may support the integrated system 204. For instance, the infrastructure 204J may include distributed computing clusters, data storage systems, and network connectivity components that may enable scalable processing of claim data.

The integrated system 204 may process the received datasets to generate modified datasets optimized for downstream processing and analysis. Modified dataset 1 (MD 1) may be generated by executing operations on dataset 1 (DS 1) 202A. For example, the modifications may include extraction and normalization of structured fields, calculation of payer-specific denial rates, submission lag metrics, and rolling window aggregations. Modified dataset 2 (MD 2) may be generated through preprocessing operations applied to dataset 2 (DS 2) 202B. For example, the modifications may include categorical encoding using target and frequency encodings, imputing missing values with payer-specific medians, and quantile binning for continuous variables. Modified dataset 3 (MD 3) may be generated by applying data cleaning operations to dataset 3 (DS 3) 202C. For example, the modifications may include outlier handling, duplicate removal, and schema enforcement to maintain data quality. Modified dataset n (MD n) may be generated by applying transformation operations to dataset n (DS n) 202D. For example, the modifications may include data aggregation, feature derivation, and standardization to align with model input requirements.

The UI system 206 may be configured to execute operations to provide end users with visualization and interaction capabilities. The UI engines 206A may execute operations to generate user interfaces that may display system outputs. For example, the UI engines 206A may generate interactive visualizations of claim processing metrics, denial predictions, and system performance indicators. The dashboards 206B may be generated by the UI engines 206A to present aggregated views of the integrated system 204 operations. For example, the dashboards 206B may display real-time monitoring of key performance indicators, trend analysis, forecasting results, and customizable views for different user roles. The client devices, 206C, may access the dashboards, 206B, through web-based or application interfaces. For example, the client devices 206C may enable users to review claim processing results, investigate specific issues, and provide feedback that may be incorporated into model retraining processes.

The integrated system 204 may generate multiple outputs by processing modified datasets with the ML engines 204A and the ML models 204B. For instance, output 1 (O/P 1) may include denial probability scores for each processed medical claim. For instance, the scores may be generated by applying trained machine learning models to claim features extracted from the modified datasets. Output 2 (O/P 2) may include denial category classifications that may identify specific types of potential claim issues. For example, the classifications may be generated using multi-class prediction models that may distinguish between coding errors, prior authorization issues, benefit coverage problems, and other denial categories. Output 3 (O/P 3) may include explainability values generated through SHAP analysis. For example, explainability values may identify which features contribute most to predictions of denial probability, thereby providing transparency into the model's decisions. Output n (O/P n) may include corrective action recommendations based on the denial predictions and classifications. For example, the recommendations may be generated by mapping identified issues to specific remediation strategies stored in the system knowledge base.

Figure 3:
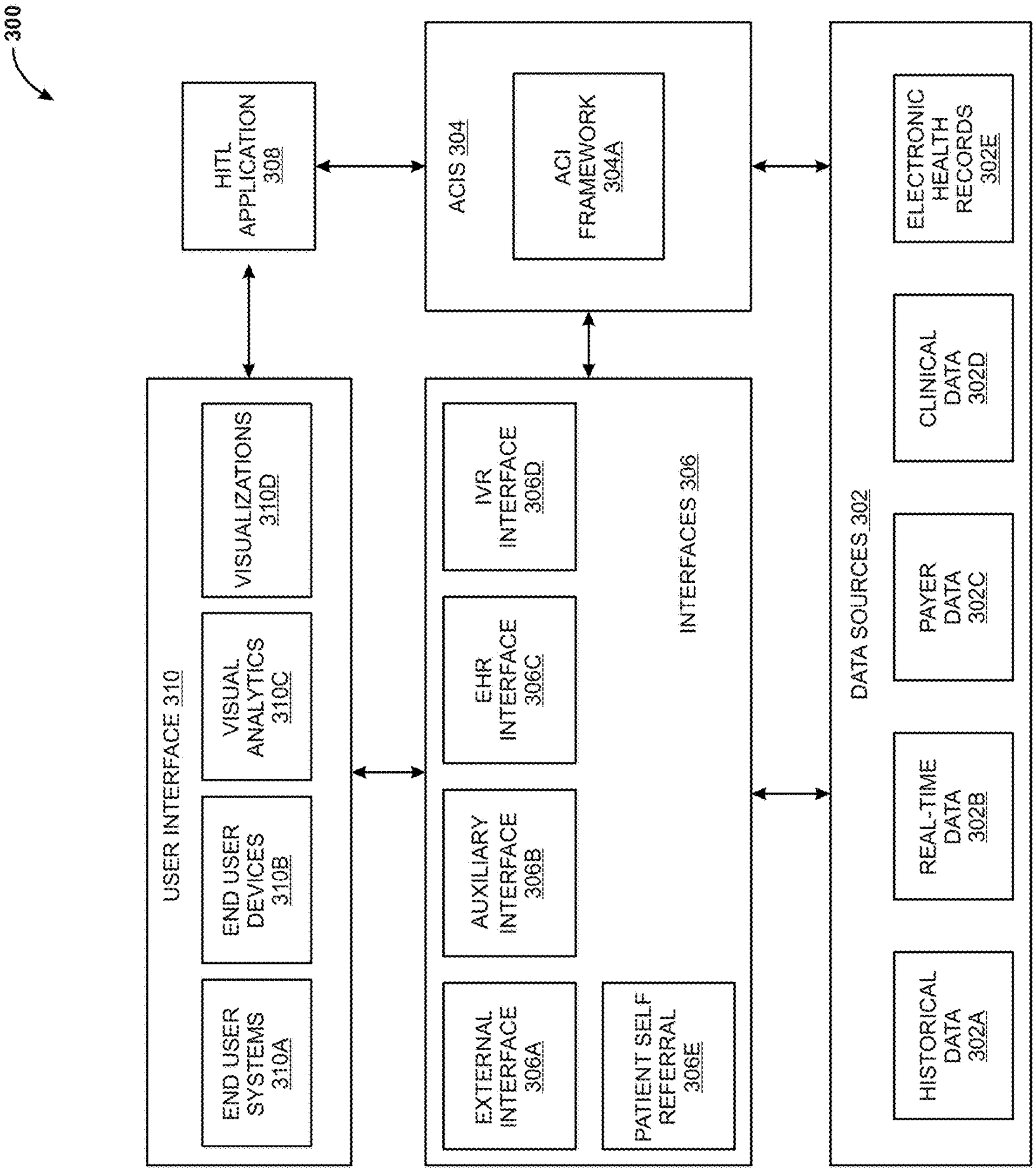
FIG. 3 illustrates an overall system architecture including the ACIS for automated claim integrity verification and processing in healthcare revenue cycle management, according to an exemplary embodiment.

FIG. 3 illustrates an overall system architecture 300 including an ACIS 304, for automated claim integrity verification and processing in healthcare revenue cycle management, according to an exemplary embodiment. FIG. 3 is described in conjunction with FIG. 1 and FIG. 2. The system architecture 300 includes a communicatively arranged data sources 302, an ACIS 304, interfaces 306, a human-in-the-loop (HITL) application 308, and a user interface 310. Each component or sub-component may be communicatively coupled through application programming interfaces and data exchange protocols to facilitate real-time claim processing and integrity validation.

In an embodiment, the data sources 302 may include multiple sources of repositories that provide healthcare-related information to the system. For example, historical data 302A may include transaction logs, verification records, and system interaction histories, all of which are maintained to ensure complete traceability of claim-related activities. Real-time data 302B may be received continuously from various healthcare systems and may include current claim submissions, status updates, and processing requests. Payer data 302C may include information or data from insurance payer systems and may include remittance information, eligibility verification responses, benefits confirmation data, authorization status information, and provider enrollment details. Clinical data 302D may be sourced from healthcare providers and may include medical records, procedure information, diagnosis codes, and treatment documentation. Electronic health records 302E may provide patient information, including medical histories, treatment plans, medications, and clinical notes, which may be processed to support claim validation and integrity verification.

The ACIS 304 may implement an ACI framework 304A configured or operable to execute multiple operations using integrated machine learning engines and models. The ACI framework 304A may, for example, implement gradient-boosted decision tree ensemble models trained on historical claim data to detect patterns in claim approvals and denials. The ACI framework 304A may process each incoming claim through feature extraction operations that may identify payer-specific patterns, provider histories, and coding relationships. The extracted features may be evaluated through trained machine learning models to generate denial probability scores and denial category classifications for each medical claim. The ACIS 304 may produce explainability values via SHAP analysis to identify which features may contribute to predictions of denial probability. In an embodiment, the trained machine learning models may be applied through a multi-stage inference pipeline that executes operations including loading pre-trained model artifacts from a model registry. The next step may include computing features using cached and real-time data sources. Further, the next steps may include executing ensemble predictions across multiple models and generating a denial probability score with a confidence interval.

The interfaces 306 may facilitate bidirectional communication between the ACIS 304 and other components or sub-components (e.g., 302, 308, and 310). For instance, an external interface 306A may be configured to establish connectivity with third-party healthcare systems, enabling data exchange with clearinghouses, financial institutions, and regulatory bodies. Auxiliary interface 306B may provide additional integration points for healthcare systems that standard protocols may not cover. An EHR interface 306C may be configured to communicate with electronic health record systems and may facilitate the collection and processing of healthcare data, including reimbursement transactions, claim submissions, claim status requests and responses, and eligibility and benefit verification messages. An IVR interface 306D may enable automated telephone interactions with patients and providers for status inquiries and information collection. A patient self-referral interface 306E may provide direct patient access to submit referral requests and related documentation through secure portals.

The human-in-the-loop (HITL) application 308 may be configured to execute operations that manage exceptions and complex cases, which may require human judgment or intervention. The HITL application 308 may receive claims that machine learning models have flagged for additional review or manual processing. The HITL application 308 may present these claims to qualified personnel through structured workflows that may guide the review process. The HITL application 308 may capture decisions and corrections made by human operators and may feed this information back to the machine learning models for continuous improvement. The HITL application 308 may maintain audit trails of all human interventions and may track the outcomes of manually processed claims to identify patterns that may be automated in future iterations.

The user interface 310 may include multiple presentation and interaction components. The end user systems 310A may include desktop workstations, servers, and terminal systems that may be used by healthcare personnel to access the integrated system 204. The end user devices 310B may include, for example, mobile devices, tablets, and portable computers that may enable remote access to system functions. Visual analytics 310C may provide data visualization capabilities, including charts, graphs, heat maps, and trend analyses, enabling users to identify patterns and anomalies in claim processing. Visualizations 310D may generate interactive dashboards and reports that may be customized based on user roles and preferences. The user interface 310 may implement responsive design principles to ensure consistent functionality across different device types and screen sizes.

The data flow through the integrated system architecture 300 may begin with the collection of claim-related data from the data sources 302. The collected data may be normalized and standardized to ensure consistency across different source systems. The ACIS 304 may receive this normalized data and execute feature extraction operations to identify relevant attributes for claim analysis. The extracted features may include temporal patterns such as submission lag times, historical denial rates for specific payer-provider combinations, and coding relationship patterns. The ACI framework 304A may implement trained machine learning models to generate predictions about claim outcomes.

In an embodiment, for claims identified as having a high denial probability, the integrated system 204 may execute automated correction operations via automated components, modules, or engines, referred to as automation agents. The automation agents may be configured to address specific denial categories such as authorization issues, coding errors, eligibility problems, or documentation deficiencies. Each agent may interface with appropriate external systems via interfaces 306 to obtain missing information or to validate existing data. For example, an authorization agent may connect to payer portals through the external interface 306A to verify prior authorization status and may update claim records accordingly. In an embodiment, the machine learning models (not shown) in the ACI framework 304A may be continuously retrained using actual claim outcomes derived from remittance data. When denial outcomes are received from payers, the integrated system 204 may compare actual results with predicted probabilities to calculate model accuracy metrics. The integrated system 204 may detect model drift using statistical measures, such as the population stability index, and instantiate retraining when drift exceeds predetermined thresholds. The retraining process may include new denial patterns and may adjust model weights to improve future predictions.

The system architecture 300 may implement multiple validation and verification mechanisms to ensure data integrity and processing accuracy. For example, a process metrics engine (not shown) may continuously monitor ACIS performance and track key indicators such as processing throughput, error rates, and response times. In an embodiment, the system architecture 300 may support both batch and real-time processing modes. In batch processing mode, claims may be collected and processed in groups at scheduled intervals. In real-time processing mode, claims may be evaluated immediately upon receipt, enabling rapid identification and correction of potential issues. The selection of the processing mode may be determined by factors such as claim volume, ACIS load, and business requirements.

The security and privacy protection may be implemented throughout the system architecture 300. All data transmissions between components may be encrypted using industry-standard protocols. Patient health information may be de-identified or pseudonymized for model training to ensure compliance with privacy regulations. Access controls may be enforced at multiple levels to ensure that users may access only information appropriate to their roles and responsibilities. Audit logs may be maintained for all ACIS activities to provide complete traceability of data access and modifications. In an embodiment, the system architecture 300 may be designed to scale horizontally to accommodate varying claim volumes. Processing components may be deployed as containerized microservices that may be dynamically scaled based on demand. Load balancing mechanisms may distribute processing requests across available resources to maintain optimal performance. The integrated system 204 may implement caching strategies to reduce redundant processing and improve response times for frequently accessed data.

In operation, the overall system architecture 300 may receive medical claims from healthcare providers through the data sources 302. The historical data 302A, the real-time data 302B, the payer data 302C, the clinical data 302D, and the electronic health records 302E may be aggregated and normalized. The ACIS 304 may implement the components, modules, engines, etc., of the ACI framework 304A, may extract features from each claim, and may implement trained machine learning models to generate denial probability scores and classifications. Claims exceeding threshold probabilities may be routed to automation agents that execute corrections by interfacing with external systems via interfaces 306, including the external interface 306A, Auxiliary interface 306B, EHR interface 306C, IVR interface 306D, and patient self-referral interface 306E. Complex cases may be directed to the HITL application 308 for human review and intervention. In an embodiment, the results of the processing and analysis may be presented through the user interface 310. For example, the end user systems 310A, end user devices 310B, visual analytics 310C, and visualizations 310D may enable monitoring and analysis of claim processing outcomes. The integrated system 204 may continuously receive remittance data containing actual claim outcomes, which can be used to retrain the machine learning models, thereby creating a closed-loop integrated system 204 that improves denial prediction accuracy over time. The integrated processing workflow executed using the system architecture 300 may detect and correct claim deficiencies before submission to payers, thereby reducing denial rates and improving revenue cycle efficiency for healthcare providers.

Figure 4:
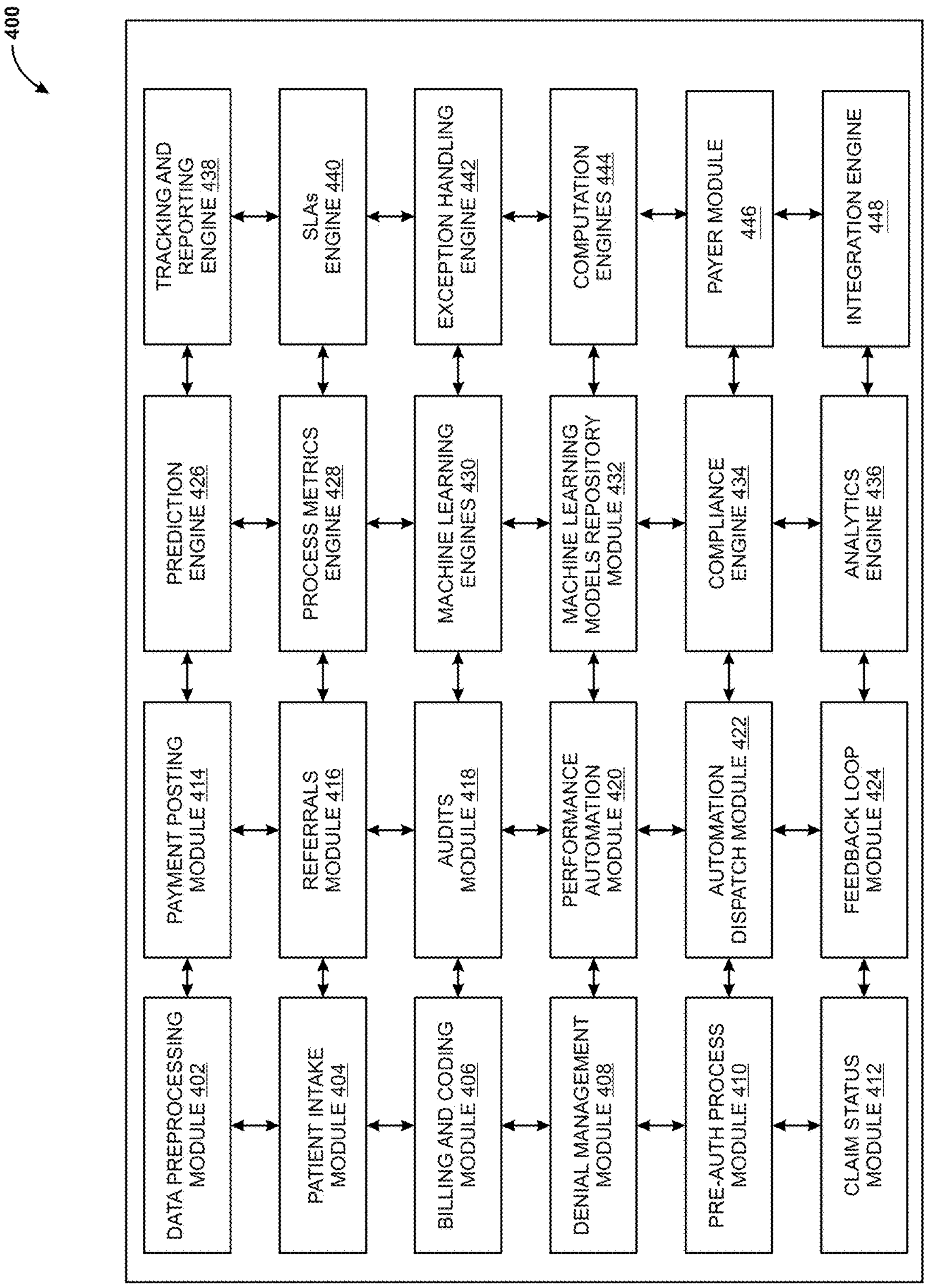
FIG. 4 illustrates an integrated environment of elements of the ACI framework, according to an exemplary embodiment.

FIG. 4 illustrates an integrated environment 400 of elements of the ACI framework, according to an exemplary embodiment. FIG. 4 is described in conjunction with FIGS. 1, 2, and 3. The elements of the ACI framework 304A may include the integration of multiple components, modules, and engines that are operable to receive, process, analyze, and correct healthcare claims to reduce denial probabilities before submission to payer systems. In an embodiment, FIG. 4 shows components including a data preprocessing module 402, a patient intake module 404, a billing and coding module 406, a denial management module 408, a pre-auth process module 410, a claim status module 412, a payment posting module 414, a referrals module 416, an audits module 418, a performance automation module 420, an automation dispatch module 422, a feedback loop module 424, a prediction engine 426, a process metrics engine 428, machine learning engines 430, a machine learning models repository module 432, a compliance engine 434, an analytics engine 436, a tracking and reporting engine 438, a SLA engine 440, an exception handling engine 442, computation engines 444, a payer module 446, and an integration engine 448.

The data preprocessing module 402 may be configured to receive raw claim data from multiple data sources, including electronic health record systems, payer portals, clinical databases, and historical transaction files. The data preprocessing module 402 may execute operations, including extraction, normalization, and transformation operations on the received raw claim data to generate structured datasets suitable for downstream processing. For instance, the data preprocessing module 402 may parse multiple medical claims-related files, such as X12 EDI transaction files (e.g., 837 claim submission files and 835 remittance advice files), to extract claim-level attributes and payment adjudication outcomes. The data preprocessing module 402 may implement schema validation using predefined data contracts to enforce data type correctness, value range constraints, and mandatory field completeness. The data preprocessing module 402 may implement deduplication logic to identify and remove duplicate claim records based on claim identifiers, payer identifiers, and service dates, preserving the most recent version of each claim transaction.

The data preprocessing module 402 may execute operations to impute missing values using statistical methods, replacing absent numerical values with payer-group-specific medians or provider-specific historical averages, and filling absent categorical values with designated sentinel codes. The data preprocessing module 402 may execute operations to detect and manage outlier values by capping extreme billing amounts at the 99.5th percentile and flagging submission lag times exceeding predefined thresholds. The data preprocessing module 402 may create temporal splits of the preprocessed data, partitioning historical claim records into training, validation, and test datasets based on service dates to prevent temporal leakage. The data preprocessing module 402 may execute operations to generate feature vectors for each claim by identifying payer-specific denial rates over rolling time windows, encoding categorical variables using target encoding methods, and computing interaction features between procedure codes and diagnosis codes. The data preprocessing module 402 may maintain versioned snapshots of preprocessed datasets, each with an associated schema hash, to support reproducibility and lineage tracking.

The patient intake module 404 may execute operations to capture and validate demographic information, insurance coverage details, and clinical history for incoming patients. The patient intake module 404 may interface with electronic health record systems to retrieve patient attributes, including name, date of birth, address, contact information, insurance member identifiers, and policy group numbers. The patient intake module 404 may perform real-time eligibility verification by transmitting, for example, X12 270 eligibility inquiry transactions to payer systems and processing returned, for example, X12 271 eligibility response transactions. The patient intake module 404 may validate coverage status, benefit levels, deductible amounts, copayment requirements, and coinsurance percentages for the patient's active insurance plan. The patient intake module 404 may flag missing or incomplete patient information fields, which can lead to downstream claim denials, generating alerts for manual correction or automated data enrichment. The patient intake module 404 may store validated patient records in a structured repository accessible to downstream modules within the integrated environment 400.

The billing and coding module 406 may execute operations to assign appropriate medical codes to clinical encounters, treatments, and procedures rendered to patients. The billing and coding module 406 may translate clinical documentation from electronic health record systems into standardized code sets, including Current Procedural Terminology (CPT) codes for procedures and services, International Classification of Diseases (ICD) codes for diagnoses, and Healthcare Common Procedure Coding System (HCPCS) codes for supplies and equipment. The billing and coding module 406 may validate code combinations to detect mismatches between procedure and diagnosis codes that fail to meet the medical necessity requirements set by payer policies. The billing and coding module 406 may crosswalk diagnosis codes and procedure codes to identify invalid or deprecated codes that payers may reject. The billing and coding module 406 may implement coding rules specific to individual payers, including bundling restrictions, modifier requirements, and place-of-service constraints. The billing and coding module 406 may generate charge capture records associating billed amounts with corresponding procedure codes, units of service, and revenue codes. The billing and coding module 406 may output structured claim line items for downstream modules to aggregate into claim-level records.

The denial management module 408 may be configured to track, analyze, and resolve claim denials received from payer systems. The denial management module 408 may receive remittance data from payer systems, including electronic remittance advice files in formats such as X12 835, which may include claim adjustment reason codes and remittance advice remark codes for denied claims. The denial management module 408 may parse claim adjustment reason codes to classify denials into the following categories: authorization-related, coverage-related, coding-related, timely filing, and medical necessity. The denial management module 408 may correlate denied claims with their original submission records to identify root causes of denial and patterns of denial behavior across payers, providers, and service lines. The denial management module 408 may generate work queues for revenue cycle staff to review and manually correct denied claims. The denial management module 408 may track appeal outcomes and resubmission success rates to measure the effectiveness of corrective actions. The denial management module 408 may feed denial outcome data to the feedback loop module 424 and machine learning engines 430 to support model retraining and continuous improvement.

The pre-auth process module 410 may execute operations to manage prior authorization requirements for medical procedures and services that require payer system pre-approval before care is rendered. The pre-auth process module 410 may identify claims associated with procedures that require prior authorization based on payer-specific policies stored in reference tables. The pre-auth process module 410 may interface with payer systems through application programming interfaces or robotic process automation to submit authorization requests and retrieve authorization status information. The pre-auth process module 410 may validate that authorization numbers are present, active, and unexpired for claims requiring pre-authorization before submission. The pre-auth process module 410 may flag claims with missing, expired, or invalid authorization numbers for corrective action by the automation dispatch module 422. The pre-auth process module 410 may track authorization approval rates, turnaround times, and denial reasons to identify opportunities for process optimization.

The claim status module 412 may be configured to monitor the lifecycle status of claims as they progress through submission, adjudication, payment, and resolution stages. The claim status module 412 may assign status codes to claims, including new, scored, queued for correction, corrected, rescored, clean, submitted, adjudicated, approved, denied, appealed, and resubmitted. The claim status module 412 may maintain a state machine representation of claim progression, enforcing valid transitions between states and preventing invalid state changes. The claim status module 412 may query payer systems for claim status updates using, for example, X12 276 claim status inquiry transactions and process returned X12 277 claim status response transactions. The claim status module 412 provides real-time visibility into claim status for revenue cycle staff through dashboard interfaces connected to the user interface systems described in other figures. The claim status module 412 may generate alerts when claims remain in pending statuses for durations exceeding predefined service-level agreement thresholds.

The payment posting module 414 may execute operations to reconcile received payments from payer systems against submitted claim amounts and post payment transactions to patient accounts. The payment posting module 414 may receive electronic remittance advice files, for example, in X12 835 format from payer systems, containing payment amounts, adjustment amounts, patient responsibility amounts, and reason codes. The payment posting module 414 may parse remittance advice transactions to extract payment details at the claim level and claim line level. The payment posting module 414 may match payments to outstanding claim balances using claim identifiers, patient identifiers, service dates, and billed amounts. The payment posting module 414 may implement payments to reduce accounts receivable balances and generate patient statements for the remaining patient responsibility amounts. The payment posting module 414 may identify underpayments and overpayments by comparing received payment amounts to expected allowed amounts from fee schedules and payer contracts. The payment posting module 414 may generate financial reconciliation reports quantifying revenue capture, write-off amounts, and contractual adjustments.

The referrals module 416 may execute operations to manage referral requirements for specialist visits and diagnostic services that require authorization or notification to payer systems. The referrals module 416 may validate that referral documentation is present for claims associated with services rendered by out-of-network or specialist providers. The referrals module 416 may interface with payer systems to verify that referral authorizations are active and have not exceeded visit limits or dollar limits. The referrals module 416 may flag claims with missing or expired referral authorizations for corrective action before submission. The referrals module 416 may track referral utilization patterns and authorization compliance rates to identify opportunities for workflow improvements.

The audits module 418 may execute operations to perform internal quality checks and compliance reviews on claims before submission and after adjudication. The audits module 418 may implement rule-based validation logic to detect claim defects, including missing required fields, invalid code combinations, incorrect billing units, and inconsistent service dates. The audits module 418 may sample claims for detailed review by clinical auditors to verify the adequacy of documentation and coding accuracy. The audits module 418 may generate audit findings and recommendations for corrective actions, feeding results to the denial management module 408 and feedback loop module 424. The audits module 418 may track audit failure rates and corrective action completion rates to measure improvements in claim quality over time.

The performance automation module 420 may be configured to execute automated tasks and workflows that correct identified deficiencies in claims, eliminating the need for manual intervention. The performance automation module 420 may receive work instructions from the automation dispatch module 422, specifying the type of corrective action required for each flagged claim. The performance automation module 420 may implement multiple automation agents, each configured to address a specific category of claim deficiency. For example, an authorization agent within the performance automation module 420 may interface with payer systems through application programming interfaces or robotic process automation to retrieve missing authorization numbers, verify authorization statuses, and update claim records with authorization data.

A coding agent within the performance automation module 420 may validate and correct procedure-code and diagnosis-code combinations by applying payer-specific coding rules, cross-walking deprecated codes to current codes, and adding required modifiers. A coverage agent within the performance automation module 420 may verify patient eligibility and benefit information by transmitting eligibility inquiry transactions to payer systems and updating claim records with returned coverage details. A timely filing agent within the performance automation module 420 may flag claims approaching submission deadlines and expedite their processing to prevent denials due to late filing. A documentation agent within the performance automation module 420 may identify missing or incomplete clinical documentation in electronic health record systems using natural language processing techniques and generate requests for additional documentation from clinical staff. The performance automation module 420 may log all automated actions, including timestamps, action types, and outcome statuses, to support audit trails and performance measurement. The performance automation module 420 may operate asynchronously, processing multiple claims in parallel through event-driven messaging architectures to achieve high throughput.

The automation dispatch module 422 may execute operations to route claims to appropriate automation agents within the performance automation module 420 based on predicted denial types and corrective action requirements. The automation dispatch module 422 may receive scored claims from the prediction engine 426, including denial probability scores and denial category classifications for each claim. The automation dispatch module 422 may compare denial probability scores against predefined threshold values to determine whether a claim requires corrective action before submission. The automation dispatch module 422 may analyze denial category classifications to identify the specific types of corrective actions needed for each claim, such as authorization verification, eligibility confirmation, or coding correction.

The automation dispatch module 422 may prioritize claims based on denial probability scores, billed amounts, and service line importance, ensuring that high-risk and high-value claims receive corrective attention first. The automation dispatch module 422 may generate work queue entries for each flagged claim, assigning claims to queues corresponding to authorization deficiencies, coverage deficiencies, coding deficiencies, timely filing risks, and other categories. The automation dispatch module 422 may publish claim correction tasks to event-driven messaging topics, enabling the performance automation module 420 to subscribe to and process them asynchronously. The automation dispatch module 422 tracks task completion statuses and instantiates the prediction engine 426 to rescore corrected claims, verifying that denial probabilities have decreased below threshold values.

The feedback loop module 424 may execute operations to capture outcomes from submitted claims and feed the resulting data back into the machine learning engines 430, enabling continuous model improvement. The feedback loop module 424 may receive adjudication outcomes from payer systems, including approval statuses, denial statuses, payment amounts, adjustment amounts, and denial reason codes from electronic remittance advice files. The feedback loop module 424 may correlate adjudication outcomes with the original denial probability predictions generated by the prediction engine 426 for each claim, calculating prediction accuracy metrics. The feedback loop module 424 may detect distribution drift in claim features by computing population stability index metrics and comparing feature distributions in recent claim submissions against those in historical training datasets. The feedback loop module 424 may instantiate model retraining workflows when drift metrics exceed predefined threshold values, indicating that payer denial patterns have shifted and model performance may degrade. The feedback loop module 424 may extract new denial patterns from adjudication outcomes, identifying emerging denial reason codes and changes in denial frequency distributions across payers, service lines, and procedure codes. The feedback loop module 424 may generate labeled training records from adjudication outcomes, assigning denial flags to claims based on payment status and denial reason codes while respecting temporal cutoff dates to prevent data leakage. The feedback loop module 424 may compute performance metrics for automated corrective actions, measuring the success rates of authorization, coding, and eligibility corrections to refine the automation agent's logic.

The prediction engine 426 may execute operations to generate denial probability scores and denial category classifications for medical claims before submission to payer systems. The prediction engine 426 may receive feature vectors from the data preprocessing module 402 that contain claim attributes derived from raw claim data. The prediction engine 426 may load trained machine learning models from the machine learning models repository module 432, selecting model versions designated for production use by the machine learning engines 430. The prediction engine 426 may use the loaded machine learning models to process input feature vectors, executing model inference operations to generate numerical denial probability scores ranging from 0 to 1 for each claim. The prediction engine 426 may produce multi-label denial-category classification probabilities, assigning probability scores to various denial categories, including authorization-related, coverage-related, coding-related, timely filing, and other types of denials. The prediction engine 426 may implement gradient-boosted decision tree ensemble models, processing claims through a sequence of shallow decision trees that perform binary threshold splits on input features and aggregate tree outputs additively to produce final scores. The prediction engine 426 may compute explainability values, for example, using SHAP analysis techniques, thereby calculating the contribution of each input feature to the overall denial probability score. The prediction engine 426 may rank features by absolute SHAP values to identify the top contributing factors driving denial risk for each claim, enabling downstream agents to prioritize corrective actions. The prediction engine 426 may execute inference operations with a low latency, achieving 95th percentile response times of less than 100 milliseconds to support real-time scoring of active claims as they are created or modified in electronic health record systems. The prediction engine 426 may implement micro-batching techniques, accumulating small batches of claims and processing them together to improve computational efficiency while maintaining near-real-time responsiveness. The prediction engine 426 may interface with a distributed feature store to retrieve precomputed feature values cached in memory-based data stores, reducing feature computation latency during inference. The prediction engine 426 outputs scored claim records, which contain claim identifiers, denial probability scores, denial category probabilities, and SHAP-based feature importance values, to the automation dispatch module 422 for routing decisions. The prediction engine 426 may publish scoring results to event-driven messaging topics, enabling asynchronous consumption by downstream modules, including the automation dispatch module 422 and analytics engine 436.

The process metrics engine 428 may execute operations to compute performance indicators quantifying the operational efficiency and financial impact of the integrated environment 400. The process metrics engine 428 may compute key performance indicators, including clean claim rate, denial rate, first-pass resolution rate, average days in accounts receivable, and net collection rate. The process metrics engine 428 may aggregate metrics at multiple granularity levels, including facility-level, payer-level, service line-level, and provider-level metrics. The process metrics engine 428 may compare computed metrics against enterprise targets, industry benchmarks, and historical baseline values to quantify performance improvements attributable to the integrated environment 400. The process metrics engine 428 may generate time-series trend data showing metric evolution over daily, weekly, and monthly periods to support performance monitoring dashboards. The process metrics engine 428 may feed computed metrics to the tracking and reporting engine 438 for visualization and distribution to end users.

The machine learning engines 430 may execute operations to train, validate, and retrain machine learning models used by the prediction engine 426 for predicting denial probabilities. The machine learning engines 430 may retrieve training datasets from the data preprocessing module 402, including historical claim records with associated denial outcome labels derived from adjudication results. The machine learning engines 430 may implement gradient-boosted decision tree training algorithms, constructing ensemble models by sequentially adding decision trees that fit the residual errors from previously trained trees.

The machine learning engines 430 may configure training hyperparameters, including learning rate, number of boosting rounds, tree depth, number of leaves per tree, minimum data in leaf nodes, feature fraction for column sampling, subsample fraction for row sampling, and regularization parameters. The machine learning engines 430 may set learning rate parameters to control each tree's contribution to the ensemble, using values such as 0.05 to enable gradual learning and reduce the risk of overfitting. The machine learning engines 430 may set maximum tree depth parameters to limit tree complexity, using controlled depth values to prevent overfitting on training data. The machine learning engines 430 may implement feature subsampling by randomly selecting a fraction of input features for each tree, using feature fraction values such as 0.8 to introduce diversity across trees and improve generalization. The machine learning engines 430 may implement row subsampling by randomly selecting a fraction of training samples for each tree, using subsample values such as 0.8 to reduce overfitting. The machine learning engines 430 may implement L2 regularization penalties to tree weights, using lambda values such as 10.0 to stabilize model training on datasets with high-cardinality categorical features.

The machine learning engines 430 may implement early stopping logic that halts training when validation performance plateaus or degrades over a consecutive number of rounds, preventing overtraining. The machine learning engines 430 may implement class imbalance correction techniques, including adjusting sample weights to increase the influence of minority class examples corresponding to denied claims. The machine learning engines 430 may partition the training data using stratified K-fold cross-validation, creating multiple train-validation splits that preserve denial rate distributions and payer group distributions within each fold. The machine learning engines 430 may evaluate trained models on holdout test datasets using performance metrics, including the area under the receiver operating characteristic curve, the precision-recall area under the curve, precision at business-defined probability thresholds, recall at business-defined probability thresholds, and the Brier score for calibration assessment. The machine learning engines 430 may register trained models to the machine learning models repository module 432 using semantic version identifiers, tagging models for staging, production, or shadow deployment. The machine learning engines 430 may implement automated retraining pipelines, instantiated by the feedback loop module 424, when model drift metrics exceed thresholds, ensuring that models remain accurate as payer denial patterns evolve. The machine learning engines 430 may implement A/B testing frameworks to evaluate candidate model versions against production models, routing a fraction of claim traffic to candidate models and comparing performance metrics across model versions before promoting candidates to production.

The machine learning models repository module 432 may be configured to store trained machine learning model artifacts, including model parameters, hyperparameters, feature schemas, preprocessing transformations, calibration curves, explainability summaries, and training metadata. The machine learning models repository module 432 may implement version control for models, assigning semantic version numbers with major, minor, and patch components to track model evolution. The machine learning models repository module 432 may maintain multiple model stages, including development, staging, production, and archived stages, with promotion workflows governing the progression of models across these stages. The machine learning models repository module 432 may store lineage metadata linking each model version to source code commit identifiers, training dataset snapshots, hyperparameter configurations, and performance metrics achieved during training and validation. The machine learning models repository module 432 may provide model retrieval interfaces to the prediction engine 426, enabling the prediction engine to load models for inference. The machine learning models repository module 432 may implement atomic model updates through double-buffering techniques, warming new model versions in memory before swapping them into active serving positions to prevent inference disruptions.

The compliance engine 434 may execute operations to verify that claim processing workflows and data-handling practices comply with regulatory requirements and industry standards. The compliance engine 434 may enforce data privacy protections required by the Health Insurance Portability and Accountability Act (HIPAA), including access controls, encryption, and audit logging for protected health information. The compliance engine 434 may validate that claim submissions comply with payer-specific billing guidelines, including coding rules, modifier requirements, and documentation standards. The compliance engine 434 may generate compliance reports documenting adherence to internal policies and external regulations, supporting audit activities and regulatory reviews. The compliance engine 434 may monitor for fraudulent billing patterns and flag claims with unusual billing characteristics for review by compliance staff.

The analytics engine 436 may execute operations to perform descriptive, diagnostic, and predictive analyses on claim data and performance metrics. The analytics engine

436 may aggregate claim data across multiple dimensions, including time periods, payers, providers, facilities, service lines, and procedure codes, to identify trends and patterns. The analytics engine 436 may compute statistical summaries, including denial rates by payer, average days to payment, and revenue recovery percentages. The analytics engine 436 may perform root-cause analysis of denied claims, identifying common features and characteristics associated with high denial risk. The analytics engine 436 may generate forecasts of future denial rates, revenue projections, and resource requirements using historical trend data. The analytics engine 436 may feed analytical results to the tracking and reporting engine 438 for visualization and dissemination.

The tracking and reporting engine 438 may execute operations to generate reports, dashboards, and visualizations that present claim processing performance and financial outcomes to end users. The tracking and reporting engine 438 may receive metrics from the process metrics engine 428 and analytics engine 436, consolidating performance data for presentation. The tracking and reporting engine 438 may generate interactive dashboards displaying key performance indicators, including denial rates, clean claim rates, revenue capture, and automation effectiveness metrics. The tracking and reporting engine 438 may produce explainability visualizations showing feature contributions to denial predictions, enabling revenue cycle staff to understand why specific claims were flagged for correction. The tracking and reporting engine 438 may create compliance reports documenting decision transparency, model performance, and audit trails for regulatory purposes. The tracking and reporting engine 438 may distribute reports to end users through user interface systems connected to the integrated environment 400.

The SLA engine 440 may execute operations to define, monitor, and enforce service level agreements governing claim processing performance targets. The SLA engine 440 may maintain service-level agreement (SLA) definitions specifying performance thresholds for metrics, including claim scoring latency, corrective action completion times, and claim submission turnaround times. The SLA engine 440 may monitor actual performance against service level agreement thresholds, generating alerts when performance degrades below acceptable levels. The SLA engine 440 may instantiate escalation workflows when service-level agreement violations occur, notifying supervisory staff or initiating automated remediation actions. The SLA engine 440 may generate service-level-agreement compliance reports documenting adherence to performance commitments.

The exception handling engine 442 may be configured to detect, capture, and manage errors and exceptions occurring during claim processing workflows. The exception handling engine 442 may implement retry logic with exponential backoff for transient failures, including network timeouts, temporary service unavailability, and database connection errors. The exception handling engine 442 may route non-retriable errors, including schema validation failures, invalid feature values, and business rule violations, to dead-letter queues for manual investigation. The exception handling engine 442 may implement circuit breaker patterns that temporarily halt requests to failing downstream services, preventing cascading failures and allowing systems to recover. The exception handling engine 442 may implement fallback mechanisms that degrade functionality gracefully when components become unavailable, such as reverting to rule-based scoring when machine learning model inference fails. The exception handling engine 442 may log all exceptions with detailed context information, including timestamps, error messages, stack traces, and claim identifiers to support troubleshooting and root cause analysis.

The computation engines 444 may execute operations to provide computing resources for executing computationally intensive operations, including machine learning model training, feature engineering, and batch scoring. The computation engines 444 may include artificial intelligence processors, such as Graphics Processing Units (GPUs), Field-Programmable Gate Arrays (FPGAs), Application-Specific Integrated Circuits (ASICs), Neural Processing Units (NPUs), and Tensor Processing Units (TPUs), configured to accelerate machine learning computations through parallel processing architectures. The computation engines 444 may allocate processing resources dynamically based on workload demands, scaling up during batch training operations and scaling down during idle periods to optimize cost efficiency. The computation engines 444 may implement distributed computing frameworks to parallelize training and inference operations across multiple processor nodes.

The payer module 446 may execute operations to manage payer-specific configurations, rules, and interface connections. The payer module 446 may maintain payer master data, including payer identifiers, payer names, plan types, network statuses, and contact information. The payer module 446 may store payer-specific business rules, including coding guidelines, authorization requirements, timely filing limits, and bundling restrictions. The payer module 446 may interface with payer systems through multiple communication channels, including application programming interfaces (APIs), Secure File Transfer Protocol (SFTP) connections, and clearinghouse intermediaries. The payer module 446 may transmit claim submission files, for example, in X12 837 format, to payer systems for adjudication and processing. The payer module 446 may receive remittance advice files, for example, in X12 835 format, from payer systems containing payment and denial information. The payer module 446 may submit eligibility inquiries using, for example, X12 270 transactions and receive eligibility responses using, for example, X12 271 transactions. The payer module 446 may submit claim status inquiries using X12 276 transactions and receive claim status responses, for example, using X12 277 transactions.

The integration engine 448 may be configured to facilitate data exchange and interoperability between the components 400 and external systems, including electronic health record systems, practice management systems, and clearinghouse platforms. The integration engine 448 may implement multiple integration protocols, including HL7 messaging standards, X12 transaction standards, and Fast Healthcare Interoperability Resources application programming interfaces to support structured data exchange. The integration engine 448 may implement robotic process automation techniques to integrate with legacy systems that lack modern application programming interfaces, utilizing screen scraping and user interface automation to extract data and perform actions. The integration engine 448 maintains secure communication channels using mutual Transport Layer Security (TLS) authentication and OAuth 2.0 authorization to protect sensitive healthcare data during transmission. The integration engine 448 may implement event-driven architecture patterns, publishing and subscribing to event streams through the messaging infrastructure to enable asynchronous communication between the integrated environment 400 and external systems. The integration engine 448 may implement idempotency controls using request identifiers to prevent duplicate processing of messages.

In operation, the integrated system 204 implements a closed-loop claim integrity workflow that continuously improves denial prediction accuracy and prevents claim denials before they are submitted to payer systems. The data preprocessing module 402 receives raw claim data from electronic health record systems and payer portals, extracts and normalizes claim attributes, and generates structured feature vectors. The patient intake module 404, billing and coding module 406, and pre-auth process module 410 validate patient demographics, insurance coverage, clinical codes, and authorization requirements, flagging incomplete or erroneous data elements. The data preprocessing module 402 engineers payer-specific features, including historical denial rates, submission lag metrics, and coding relationships by aggregating historical claim transaction data over rolling time windows. The machine learning engines 430 train gradient-boosted decision tree ensemble models on historical claim data, labeled with denial outcomes extracted from electronic remittance advice files by the denial management module 408, adjusting the weights of decision tree nodes based on patterns detected in the claim denial outcomes. The trained machine learning models are stored in the machine learning models repository module 432 with version identifiers and lineage metadata, enabling reproducible model deployment. When new medical claims awaiting submission are created or modified in electronic health record systems, the integration engine 448 captures claim creation events and instantiates the prediction workflow. The data preprocessing module 402 assembles feature vectors for the new claims by retrieving precomputed feature values from a distributed feature store maintained by the integrated environment 400. The prediction engine 426 loads the trained machine learning models from the machine learning models repository module 432 and applies the models to the feature vectors, generating denial probability scores and denial category classifications for each claim.

The prediction engine 426 computes explainability values using SHAP analysis to identify which features contribute most significantly to the denial probability, producing ranked lists of contributing factors. The automation dispatch module 422 compares the denial probability scores against predefined threshold values to identify claims requiring corrective action. For claims with denial probabilities exceeding the threshold value, the automation dispatch module 422 analyzes denial category classifications and explainability values to identify specific corrective actions, such as authorization verification, eligibility confirmation, or coding correction. The automation dispatch module 422 routes flagged claims to work queues organized by denial type and publishes corrective action tasks to event-driven messaging topics. The performance automation module 420 subscribes to the corrective action tasks and dispatches automation agents configured for specific denial types. The authorization agent interfaces with payer systems to verify and update prior authorization data, retrieving missing authorization numbers and validating authorization statuses. The coding agent validates and corrects procedure-code and diagnosis-code combinations by applying payer-specific coding rules and cross-walking invalid codes to valid codes. The coverage agent verifies patient eligibility and benefit information by transmitting eligibility inquiry transactions to payer systems. The automated corrections performed by the agents update claim records in the electronic health record systems through the integration engine 448, modifying claim attributes such as authorization numbers, diagnosis codes, service dates, and provider information. The corrected claims are re-evaluated by prediction engine 426, which generates updated denial probability scores to verify that the corrections have reduced the denial risk below the threshold. Claims with denial probabilities reduced below the threshold value are marked as clean and queued for submission to payer systems.

The payer module 446 transmits the clean claims to payer systems in X12 837 format for processing. The payer module 446 receives electronic remittance advice files in X12 835 format from payer systems, containing claim adjustment reason codes for denied claims and payment information for approved claims. The denial management module 408 and feedback loop module 424 parse the remittance data to extract adjudication outcomes, correlating actual denial results with the denial probabilities predicted by the prediction engine 426. The feedback loop module 424 computes prediction accuracy metrics and detects distribution drift by comparing feature distributions in recent claims with those in historical training data. When drift metrics exceed predetermined thresholds, the feedback loop module 424 instantiates the machine learning engines 430 to retrain the machine learning models using updated claim data that includes recent adjudication outcomes. The machine learning engines register the retrained models with the machine learning models repository module, assigning incremented version identifiers. The prediction engine then loads the updated models for subsequent claim scoring operations. The process metrics engine 428 computes performance indicators, including denial rates, clean claim rates, and automation effectiveness metrics by aggregating claim processing outcomes. The analytics engine 436 executes operations for trend and root-cause analysis of the computed metrics, identifying patterns in denial behavior and opportunities for process optimization. The tracking and reporting engine 438 generates dashboards and reports that present key performance indicators and explainability visualizations to end users via connected user interface systems. The compliance engines 434 enforce regulatory requirements, service level agreements, and data quality standards throughout the workflow, generating alerts and compliance reports to maintain operational integrity. The exception handling engine 442 manages errors and transient failures through retry logic, circuit breakers, and fallback mechanisms, ensuring robust operation under adverse conditions. The closed-loop architecture enables the integrated environment 400 to continuously learn from payer feedback, automatically adapting to evolving denial patterns without manual intervention, thereby maintaining high claim integrity and maximizing revenue capture for healthcare providers.

Figure 5:
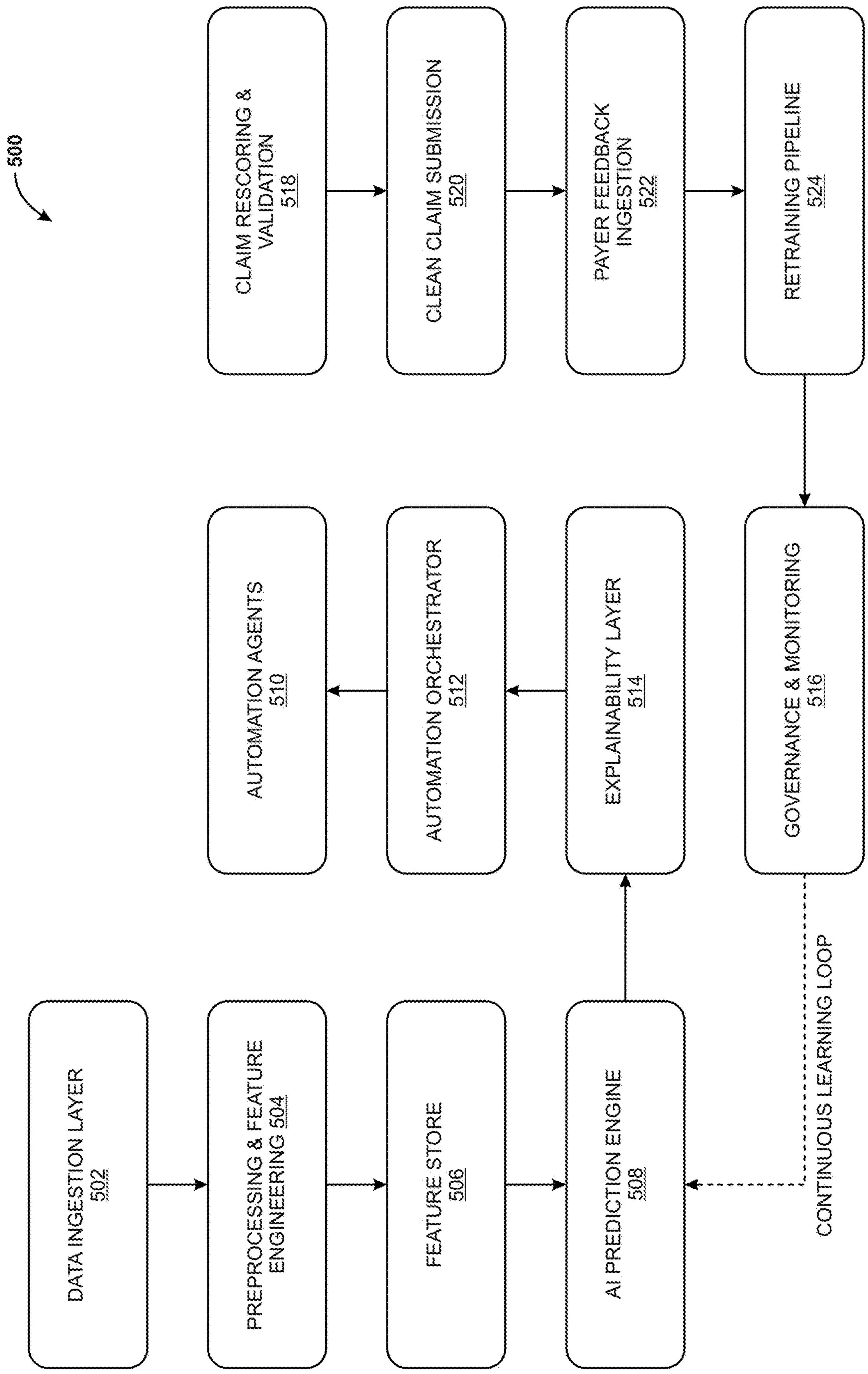
FIG. 5 illustrates an operational workflow executed by the ACIS, according to an exemplary embodiment.

FIG. 5 illustrates an operational workflow 500 executed by the ACIS, according to an exemplary embodiment. FIG. 5 is described in conjunction with FIGS. 1-4. FIG. 5 illustrates the operational workflow 500 executed by the ACIS 102, 204H, and 304 across multiple interconnected layers that collectively establish a self-improving denial-prevention system. FIG. 5 shows a data ingestion layer 502, a preprocessing and feature engineering layer 504, a feature store 506, an AI prediction engine 508, automation agents 510, an automation orchestrator 512, an explainability layer 514, a governance and monitoring layer 516, a claim rescoring and validation layer 518, a clean claim submission module 520, a payer feedback ingestion module 522, and a retraining pipeline 524.

In an embodiment, the data ingestion layer 502 may execute operations to receive and collect real-time patient and claim data from multiple heterogeneous data sources. For example, the data sources may include electronic health record systems, payer portals, clearinghouse feeds, billing systems, and revenue cycle management databases. These data sources utilize standardized protocols, such as HL7, X12 EDI transactions, and FHIR-compliant APIs, as well as robotic process automation for legacy system integration when application programming interfaces are unavailable. The data ingestion layer 502 corresponds functionally to the data sources 302 and interfaces 306 as shown and described in FIG. 3 and operationally extends the data preprocessing module 402, as shown and described in FIG. 4. The data ingestion layer 502 is structured to parse incoming claim data from, for example, 837 claim files, which represent HIPAA-standardized electronic documents used by healthcare providers to submit claims to payers for payment of medical services. The 837 claim files may include information about patients, services rendered, diagnoses, procedure codes, diagnosis codes, payer identifiers, billed amounts, service dates, provider identification, credentialing information, and associated costs.

The data ingestion layer 502 may access historical claim transactions, along with associated approval and denial outcomes, stored in distributed data repositories. Each historical claim transaction includes attributes, including procedure codes (CPT/HCPCS), diagnosis codes (ICD-10), payer-specific identifiers, historical denial reasons documented through Claim Adjustment Reason Codes (CARC) and Remittance Advice Remark Codes (RARC), facility identifiers, service line designations, and temporal metadata indicating submission timestamps and adjudication timelines. The data ingestion layer 502 may establish secure data transmission channels using Transport Layer Security (TLS) version 1.3 for in-transit encryption and Advanced Encryption Standard (AES) with 256-bit keys for at-rest encryption to protect sensitive protected health information during collection and storage operations. The data ingestion layer 502 may implement event-driven mechanisms that capture claim state changes in real time, instantiating downstream processing workflows when new claims are created, existing claims are modified for pre-submission review, or claims are finalized and marked as ready for scoring.

The preprocessing and feature engineering layer 504 may be configured to transform raw claim data into structured feature vectors for processing by machine learning models, including data cleansing, validation, normalization, enrichment, and feature derivation operations. The preprocessing and feature engineering layer 504 may correspond functionally to the data preprocessing module 402 shown and described in FIG. 4. The preprocessing and feature engineering layer 504 executes operations to extract predictive signals from multi-dimensional contextual relationships within the claim data. The preprocessing and feature engineering layer 504 may extract and engineer multiple feature categories, including static features comprising CPT procedure codes, ICD-10 diagnosis codes, payer identifiers, healthcare facility identifiers, service line classifications, and billed monetary amounts. The temporal features may include submission lag (measured as the number of days between the service and submission dates), prior authorization timeliness metrics, resubmission delays, and seasonal indicators. The behavioral features may include rolling window statistics that calculate payer-specific denial rates over configurable time periods, such as 180-day windows, as well as facility-specific denial trend metrics, provider-specific denial ratios, and historical denial frequency distributions. The contextual features, including historical patterns of similar claims, were identified by matching payer-CPT-ICD combinations, encoding categorical variables using target encoding based on observed denial outcomes, and interaction features that capture the relationships between procedure and diagnosis codes.

The preprocessing and feature engineering layer 504 may implement exploratory data analysis techniques and pattern mining algorithms to identify latent structures and correlations within the claim data that exhibit statistical association with denial outcomes, including payer-specific behavioral patterns, provider practice variations, coding relationship anomalies, and temporal submission patterns. The preprocessing and feature engineering layer 504 may calculate rolling window statistics by aggregating historical denial rates per payer over configurable time windows. For instance, the rolling calculations capture evolving payer adjudication behavior and seasonal variations in denial patterns that static features would not reveal. The preprocessing and feature engineering layer 504 may perform categorical variable encoding by applying target encoding transformations that replace categorical values with aggregate denial probability statistics computed from training data, thereby converting high-cardinality categorical features such as payer identifiers and procedure codes into continuous numerical representations that the gradient boosted decision tree models process efficiently. The preprocessing and feature engineering layer 504 may implement interaction features by computing derived attributes representing co-occurrence patterns between procedure codes and diagnosis codes. The specific code combinations exhibit elevated denial risk due to medical necessity requirements, coverage limitations, or coding guideline violations that payers systematically reject.

The preprocessing and feature engineering layer 504 may validate data schema integrity by, for example, enforcing JSON contract specifications that ensure completeness of required attributes and correct data type assignments for all feature fields prior to downstream processing. The preprocessing and feature engineering layer 504 may de-identify protected health information by replacing personally identifiable information with internal unique identifiers, while preserving the statistical relationships and predictive utility of the claim attributes for training and inference of machine learning models. The preprocessing and feature engineering layer 504 may detect and handle missing data using imputation strategies tailored to each feature type. The missing categorical values may be assigned a distinct "unknown" category, and missing numerical values may be imputed using median statistics computed from similar claims stratified by payer and service line to minimize bias in feature distributions.

The feature store 506 may be operationally connected to the preprocessing and feature engineering layer 504 and configured to maintain a distributed, versioned repository of computed feature vectors that enables efficient feature reuse. Such feature reuse enables consistent feature definitions across training and inference workflows, as well as a low-latency feature retrieval during real-time scoring operations. The feature store 506 may implement a dual-storage architecture, including an offline storage component that utilizes the Parquet file format or a data warehouse platform, such as Snowflake, for batch feature computation. The historical feature archival and online storage components utilize in-memory caching systems, such as Redis or Memcached, for the low-latency feature retrieval during real-time inference, with configurable time-to-live values ranging from 30 to 120 seconds. The feature store 506 maintains feature lineage metadata, which enables the execution of operations to document the transformation logic, source data dependencies, computation timestamps, and versioning information for each feature definition, ensuring the reproducibility and auditability of machine learning model inputs. The feature store 506 may cache frequently accessed features for active claims undergoing editing or review workflows, thereby reducing database fallback operations and maintaining end-to-end inference latency within target service-level objectives. The feature store 506 may support atomic feature updates that refresh cached feature values when upstream claim data is modified, thereby recalculating derived features, such as submission lag metrics or payer denial rate statistics, to reflect the current claim state during rescoring operations.

The AI prediction engine 508 may be communicatively coupled to the feature store 506 and configured to implement trained machine learning models to feature vectors retrieved from the feature store 506 to generate denial probability scores, denial category classifications, and feature importance metrics for each claim undergoing evaluation. The AI prediction engine 508 corresponds functionally to the prediction engine 426 and machine learning engines 430, as shown and described in FIG. 4. The prediction engine 426 executes operations to implement the core inference operations that transform claim features into actionable risk assessments. The AI prediction engine 508 may comprise gradient-boosted decision tree ensemble models, such as LightGBM or XGBoost. The ensemble models may include multiple shallow decision trees constructed sequentially through additive boosting. Each subsequent tree incorporates residual prediction errors from preceding trees to improve predictive accuracy progressively.

The AI prediction engine 508 may be configured with specific training hyperparameters, including a binary classification objective to predict whether an outcome is denied. In an embodiment, the AI prediction engine 508 may implement a learning rate of approximately 0.05 to control the contribution of each tree and prevent overfitting, a number of boosting rounds set to approximately 2000 iterations, and early stopping mechanisms that terminate training when validation performance plateaus. Subsample fractions of approximately 0.8 for row sampling per iteration may introduce stochastic variation, feature fraction values of approximately 0.8 for column sampling to prevent over-reliance on dominant features, a maximum number of leaves per tree set to approximately 63 to control tree complexity and generalization, minimum data in leaf values set to approximately 100 observations to regularize leaf predictions, and L2 regularization lambda values of approximately 10.0 to stabilize predictions on wide categorical feature spaces.

The AI prediction engine 508 may implement class imbalance handling by assigning positive weights to positive examples, computed as the ratio of negative to positive examples in the training data. For instance, denial rates typically range from 5 to 25 percent, creating imbalanced class distributions that benefit from reweighting to prevent the model from trivially predicting no denial for all claims. The AI prediction engine 508 may generate multiple output components for each scored claim, including a denial probability score represented as a continuous value between 0 and 1 obtained by applying a sigmoid transformation to the ensemble log-odds output. A set of denial-type probabilities quantifying the likelihood of specific denial categories, such as authorization denial, coverage denial, coding denial, timely filing denial, and documentation denial. The denial type classifications enable targeted routing of corrective action. The AI prediction engine 508 may compute feature importance values using SHAP analysis, which decomposes the prediction of the denial probability into additive contributions from each input feature. The SHAP values quantify both the magnitude and direction of each feature's influence on the prediction. For example, interpretable explanations may include "Authorization missing contributes +0.12 to denial probability" or "Late submission contributes +0.06 to denial probability".

The AI prediction engine 508 may be implemented as a containerized microservice using frameworks such as FastAPI for request handling and ONNX runtime for optimized model inference. This containerized architecture enables horizontal scaling through orchestration platforms like Kubernetes with Horizontal Pod Autoscaler configurations that adjust computational resources based on request load, CPU utilization, or custom latency metrics. The AI prediction engine 508 achieves inference latency performance characterized by 50th percentile (P50) latency values of approximately 0.3 to 1.0 milliseconds for raw model scoring and 95th percentile (P95) end-to-end latency values of less than 100 milliseconds, including feature retrieval, pre-processing, model inference, and post-processing. The AI prediction engine 508 may provide batch scoring modes for processing large volumes of claims during overnight sweeps or retrospective quality audits. The vectorized operations across batches of 8 to 64 claims reduce computational overhead and can achieve throughput rates of 1 to 3 million predictions per minute per CPU socket, or 15 to 45 million predictions per minute with GPU acceleration using devices such as L4 or A10 graphics processing units. The AI prediction engine 508 may also implement decision logic that compares the computed denial probability against configurable threshold values. Claims with denial probability scores exceeding the threshold may be routed to the automation orchestrator 512 for corrective intervention, while those with denial probability scores below the threshold may be classified as clean and queued for submission to payers via 837 electronic data interchange export processes.

The automation agents 510 may include multiple software modules, each configured to perform specific corrective actions for different denial type categories identified by the AI prediction engine 508. The automation agents 510 extend the functionality of the automation dispatch module 422 and the performance automation module 420, as shown in FIG. 4. The automation agents 510 may include an authorization pre-certification agent that interfaces with payer portal application programming interfaces to verify the authorization status for procedures requiring prior approval. This agent retrieves existing authorization numbers when available or submits new prior authorization requests with the correct CPT procedure codes and ICD diagnosis code mappings when authorizations are missing or expired. It then updates claim authorization fields with the retrieved authorization identifiers to meet payer submission requirements. Additionally, the automation agents 510 may include an eligibility agent that validates patient coverage status by executing real-time eligibility verification transactions through clearinghouse APIs using X12 270/271 transaction sets. This agent confirms active insurance coverage, retrieves benefit details including deductible amounts and coverage limits, and updates the insurance segment of claim records with current coverage information. The eligibility agent also flags claims for patient responsibility notification when coverage is found to be inactive or terminated.

The automation agents 510 may include a coding validation agent configured to verify compatibility between CPT procedure codes and ICD diagnosis codes using machine learning-based code mapping rules and official coding guidelines, wherein the coding validation agent applies code crosswalk transformations to correct mismatched code combinations that fail to satisfy medical necessity requirements, and wherein the coding validation agent writes corrected procedure codes and diagnosis codes directly to electronic health record claim records through FHIR endpoints or robotic process automation interfaces. The automation agents 510 may include a timeliness agent configured to calculate payer-specific submission time windows by comparing claim service dates against payer filing deadlines stored in payer reference databases, wherein the timeliness agent flags claims approaching submission cutoffs within configurable thresholds such as 3-day windows for urgent processing, and wherein the timeliness agent automatically prioritizes flagged claims in the 837 export queue to prevent timely filing denials.

The automation agents 510 may include a clinical documentation agent configured to parse electronic medical record clinical notes using natural language processing techniques to evaluate documentation completeness and extract clinical evidence supporting billed services. The clinical documentation agent generates documentation deficiency alerts when it finds notes missing required elements, such as medical necessity justification, treatment plan details, or diagnostic findings, and then sends notifications to clinical staff for correction. The automation agents 510 may also include a historical pattern agent configured to query 835 remittance archive databases to retrieve prior denial outcomes for claims with similar attribute combinations, such as payer, procedure code, diagnosis code, and service type. The historical pattern agent detects recurring denial patterns and recommends preemptive adjustments, like adding modifiers, changing code sequences, or attaching supplemental documentation, based on patterns learned from previous successful resubmissions. The automation agents 510 can perform operations asynchronously using event-driven architectures. Each agent subscribes to message queue topics related to its specific denial category, while the automation orchestrator 512 publishes claim correction tasks to the appropriate topic channels based on denial type probability distributions, allowing multiple correction workflows to run in parallel without bottlenecks.

The automation orchestrator 512 executes operations to receive scored claim records with denial probability assessments and denial type classifications. Further operations may include evaluating the severity and category distribution of predicted denials and dispatching targeted correction tasks to the appropriate automation agents 510, based on configurable routing rules and priority weights. The automation orchestrator 512 corresponds functionally to the automation dispatch module 422 shown and described in FIG. 4. The automation orchestrator 512 may evaluate denial-type probability distributions for each high-risk claim to determine which agents should be invoked. For example, the claims exhibiting authorization denial probabilities may be routed to the authorization agent, claims with coverage denial probabilities may be routed to the eligibility agent, claims with coding denial probabilities may be routed to the coding validation agent, and claims with multiple elevated denial type probabilities may instantiate concurrent agent dispatches to address multiple deficiencies in parallel. The automation orchestrator 512 may implement priority weighting algorithms that calculate corrective action urgency based on factors including denial probability magnitude, claim monetary value, days remaining until filing deadlines, payer adjudication patterns, and organizational key performance indicator targets, wherein higher-priority claims receive expedited processing through dedicated processing lanes with stricter service level objectives. The automation orchestrator 512 may track claim state transitions using a finite-state machine model comprising states such as SCORED, QUEUED, IN_CORRECTION, CORRECTED, RESCORED, CLEAN, and SUBMITTED. The state transitions are logged with timestamps and agent identifiers, creating an auditable history of corrections for each claim. The automation orchestrator 512 may implement load-balancing mechanisms that distribute correction tasks across multiple instances of automation agents 510 to achieve horizontal scalability and prevent processing bottlenecks during peak claim volumes. The automation orchestrator 512 may monitor agent execution outcomes and maintain success rate metrics for each agent type. Execution failures or timeouts trigger fallback workflows, such as routing claims to human-in-the-loop review queues or activating alternative correction strategies. The automation orchestrator 512 may coordinate sequential correction dependencies, wherein certain correction actions must precede others. For example, eligibility verification must be completed before authorization checks, and authorization updates must be completed before final coding validation, ensuring that correction workflows progress in a logical dependency order.

The explainability layer 514 may be integrated with the AI prediction engine 508 and configured to generate human-interpretable explanations for each denial probability prediction through SHAP-based feature attribution analysis. The explainability layer 514 decomposes prediction scores into additive contributions from individual features, providing transparency into the model's decision-making logic. The explainability layer 514 may compute Shapley values for each feature in a scored claim's feature vector, wherein Shapley values represent the marginal contribution of each feature to the deviation between the predicted denial probability and the baseline average denial probability computed across the training dataset. The explainability layer 514 may generate structured explanation packets comprising ranked lists of contributing features with associated Shapley values indicating both magnitude and directional influence. Positive Shapley values indicate features that increase denial probability, while negative Shapley values indicate features that decrease denial probability. The explainability layer 514 may produce natural-language explanations, such as "This claim has a 72 percent denial probability because: Payer BCBS-TX contributes +0.12, Authorization missing contributes +0.08, Late submission contributes +0.06, High billed amount contributes +0.04". The explainability layer 514 may attach explanation metadata to scored claim records for display in user interface dashboards, audit reports, and workflow queue interfaces, enabling billing specialists, revenue cycle managers, and compliance officers to understand the rationale underlying AI-generated risk assessments. The explainability layer 514 supports regulatory compliance requirements and organizational governance policies by providing auditable documentation of algorithmic decision factors. This documentation may be reviewed by internal auditors, external auditors, payer representatives during appeals processes, and regulatory agencies evaluating compliance with healthcare regulations, such as HIPAA and Medicare billing rules. The explainability layer 514 may enable trust and adoption of the AI prediction engine 508 among clinical and financial stakeholders by transforming opaque black-box predictions into transparent, interrogable assessments that align with domain expertise and business logic.

The governance and monitoring layer 516 may execute operations to implement continuous performance monitoring, model drift detection, audit logging, compliance enforcement, and operational observability functions. The governance and monitoring layer 516 may correspond functionally to the compliance engine 434, the tracking and reporting engine 438, and the audits module 418 shown in FIG. 4. The governance and monitoring layer 516 may implement model performance monitoring by continuously calculating statistical metrics. For example, the statistical metrics may include receiver operating characteristic (ROC) curve (AUROC), precision-recall area under the curve (PR-AUC), precision at operating threshold, recall at operating threshold, F1 score, calibration metrics such as Brier score, and denial prevention rates, quantified as prevented denials per thousand claims processed.

The governance and monitoring layer 516 may execute operations to calculate a population stability index (PSI) that quantifies distribution drift in feature values between training data and production inference data. PSI values exceeding thresholds, such as 0.2, indicate significant distribution shifts that may degrade model predictive accuracy and instantiate retraining alerts. The governance and monitoring layer 516 may detect data drift through, for example, Kullback-Leibler divergence measurements comparing feature distributions across time windows, identifying systematic shifts in key features such as payer mix changes, procedure code distribution changes, or billed amount distribution changes that may indicate data quality issues or operational process changes requiring model adaptation. The governance and monitoring layer 516 may monitor label drift by comparing monthly denial rates observed in production data with those in historical training data. Significant deviations indicate evolving payer adjudication behavior or policy changes that necessitate retraining the model with updated examples.

The governance and monitoring layer 516 may track operational latency metrics, including end-to-end processing time from claim ingestion to scoring completion, feature retrieval latency, model inference latency, and agent execution duration. The latency percentiles (P50, P95, P99) are monitored against service level objective targets and alert thresholds. The governance and monitoring layer 516 may maintain audit logs documenting all claim scoring events, agent correction actions, model version deployments, configuration changes, and access events. The audit log entries may include timestamps, user identifiers, claim identifiers, model versions, prediction scores, features accessed, and actions taken, all of which support forensic analysis and compliance auditing. The governance and monitoring layer 516 may implement compliance validation checks that enforce organizational policies and regulatory requirements, including verification that protected health information access complies with minimum necessary standards, confirmation that automated corrections align with coding guidelines and payer-specific policies, and validation that model predictions do not exhibit prohibited bias across demographic segments. The governance and monitoring layer 516 may generate automated alert notifications when monitored metrics breach predefined thresholds, such as when PR-AUC degrades by more than 0.03 over a rolling evaluation window, when PSI exceeds 0.2 for three consecutive days, when inference latency P95 exceeds 100 milliseconds for sustained periods, or when agent error rates exceed 0.5 percent of execution attempts. The governance and monitoring layer 516 may integrate with observability platforms, such as Prometheus and Grafana, to provide real-time dashboards that visualize system health metrics, performance trends, throughput statistics, error rates, cache hit rates, and per-payer performance slices, enabling operations teams to identify and proactively remediate issues.

The claim rescoring and validation layer 518 may execute operations to verify that denial probabilities have been reduced below acceptable threshold values before proceeding to submission. The claim rescoring and validation layer 518 may retrieve updated claim records from electronic health record systems or billing databases after automation agents 510 have written corrections. It then extracts refreshed feature vectors reflecting the corrected claim attributes and submits the updated feature vectors to the AI prediction engine 508 for recalculation of denial probability scores. The claim rescoring and validation layer 518 may implement comparison logic that evaluates whether the recalculated denial probability has decreased below a configurable clean claim threshold, such as 0.25 or 25 percent. For instance, claims meeting the threshold criteria are classified as clean and advanced to the clean claim submission module 520. Claims remaining above the threshold may be routed back to the automation orchestrator 512 for additional correction attempts or escalated to human-in-the-loop review queues when automated correction capabilities are exhausted.

The claim rescoring and validation layer 518 may track the effectiveness of corrections by calculating the reduction in denial probability resulting from automated agent actions. The substantial probability reductions validate the efficacy of correction strategies; minimal reductions may indicate limitations in current agent capabilities or the presence of claim defects that require manual intervention. The claim rescoring and validation layer 518 may implement iterative correction loops permitting multiple correction and rescoring cycles. Each iteration allows different automation agents 510 to address distinct denial risk factors sequentially or permits refined correction attempts when initial corrections prove insufficient. The claim rescoring and validation layer 518 may enforce maximum iteration limits to prevent infinite correction loops. When the claims fail to achieve clean status after a predetermined number of rescoring cycles, such as 3 iterations, they are automatically routed to exception-handling workflows for human review. The claim rescoring and validation layer 518 may log rescoring events with delta metrics, quantifying the change in denial probability attributable to each correction action. This provides analytical data that informs agent performance optimization and identifies which correction types deliver the greatest risk reduction for specific denial categories.

The clean claim submission module 520 may execute operations to aggregate validated claims that have successfully achieved denial probability scores below the clean threshold into submission batches, formatted, for example, according to X12 EDI 837 transaction standards for electronic transmission to payer systems or clearinghouse intermediaries. The clean claim submission module 520 may correspond functionally to the billing and coding module 406 and claim status module 412 shown in FIG. 4. The clean claim submission module 520 may generate 837 institutional (837I), professional (837P), or dental (837D) transaction files depending on claim type and service setting. The 837 files encode claim data elements, including patient demographics, insurance coverage information, provider identifiers, service line details with CPT procedure codes and ICD diagnosis codes, charge amounts, service dates, place-of-service codes, and all supplemental information required by payer adjudication systems. The clean claim submission module 520 may implement transmission protocols, including Secure File Transfer Protocol (SFTP) connections to payer data exchange endpoints, direct API submissions to payer claim ingestion services, or batch file uploads to clearinghouse platforms that route claims to multiple payers through aggregated connections. The clean claim submission module 520 may attach submission metadata to each transmitted claim, including submission timestamps, transmission batch identifiers, destination payer identifiers, and claim tracking numbers that enable subsequent correlation with remittance advice responses in the payer feedback ingestion module 522. The clean claim submission module 520 may implement retry logic for handling transient transmission failures, such as network timeouts or payer system unavailability. This logic automatically retries failed transmissions with exponential backoff, aiming to achieve eventual successful delivery while avoiding aggressive retry patterns that could overwhelm payer systems. The clean claim submission module 520 updates claim status records in billing system databases to reflect the submission state, records transmission confirmation details, and transitions claim workflow states to submitted status for subsequent accounts receivable tracking.

The payer feedback ingestion module 522 may execute operations to receive, parse, and process electronic remittance advice files (designated as 835 files) returned by payer systems in response to submitted claims. The 835 files contain payer adjudication decisions, including payment amounts, adjustment details, denial notifications, and reason codes explaining payment determinations. The payer feedback ingestion module 522 may correspond functionally to the payment posting module 414, denial management module 408, and feedback loop module 424 shown in FIG. 4. The payer feedback ingestion module 522 may parse 835 electronic remittance advice files conforming to X12 EDI standards. The payer feedback ingestion module 522 may extract structured data elements, including claim identifiers, which enable correlation with the originally submitted claims and claim line-level adjudication results indicating the approved or denied status for each service line. Further, the payer feedback ingestion module 522 may extract payment amounts specifying the monetary reimbursement provided by the payer, adjustment amounts indicating reductions or additions to billed charges, Claim Adjustment Reason Codes (CARC) providing standardized numeric codes explaining denial reasons or adjustment rationales, Remittance Advice Remark Codes (RARC) supplying additional explanatory information, and patient responsibility amounts specifying deductibles, copayments, or coinsurance portions.

The payer feedback ingestion module 522 may implement correlation algorithms that match 835 remittance records to original claim submissions using multiple identifier strategies, including claim control numbers, patient account numbers, service date ranges, provider identifiers, and matching of billed amounts. Probabilistic matching techniques assign confidence scores to correlations when exact identifier matches are unavailable due to data quality issues or payer data transformations. The payer feedback ingestion module 522 may classify adjudication outcomes into categorical labels, including approved, partially approved, denied, and pending, wherein denied claims are further categorized by denial reason family based on CARC code analysis into categories such as authorization denial, coverage/eligibility denial, coding denial, timely filing denial, and documentation denial.

The payer feedback ingestion module 522 may calculate actual denial outcomes for comparison with predicted denial probabilities generated by the AI prediction engine 508 prior to submission. The outcome comparisons quantify model performance through metrics such as true positive rate (e.g., claims correctly predicted as denials), false positive rate (e.g., claims incorrectly predicted as denials but approved), true negative rate (e.g., claims correctly predicted as clean and approved), and false negative rate (e.g., claims predicted as clean but actually denied). The payer feedback ingestion module 522 may extract temporal patterns in denial behavior by aggregating denial rates across time windows and detecting systematic shifts in payer adjudication patterns, such as sudden increases in authorization denials for specific procedure categories or the emergence of new denial reason codes indicating policy changes. The payer feedback ingestion module 522 may transform parsed remittance data into structured retraining examples suitable for machine learning model updates, wherein each retraining example includes the original claim feature vector submitted for prediction, the predicted denial probability generated by the model, the actual adjudication outcome received from the payer, and the detailed denial reason codes when applicable, forming supervised learning labels for model refinement.

The retraining pipeline 524 may be operationally connected to the payer feedback ingestion module 522, the feature store 506, and the AI prediction engine 508. The retraining pipeline 524 may execute operations to implement automated model retraining workflows that update machine learning model parameters based on newly observed claim outcomes, maintaining predictive accuracy as payer behaviors evolve. The retraining pipeline 524 corresponds functionally to the feedback loop module 424 and machine learning models repository module 432 shown in FIG. 4. The retraining pipeline 524 may implement scheduled retraining cycles executing at predetermined intervals such as every 4 to 6 weeks to capture gradual payer policy drift, quarterly cycles coinciding with feature schema updates, or event-instantiated hotfix retraining cycles activated when drift detection alerts indicate significant model degradation.

The retraining pipeline 524 may aggregate retraining data by querying the payer feedback ingestion module 522 for newly adjudicated claims since the previous retraining cycle, retrieving corresponding feature vectors from the feature store 506, and merging prediction metadata with actual outcomes to construct a temporally ordered dataset reflecting recent payer behavior. The retraining pipeline 524 may implement temporal validation strategies, such as out-of-time validation, in which training is performed on historical claims from earlier time periods and validation is performed on more recent claims to simulate realistic deployment conditions, requiring the model to predict future outcomes rather than memorize past patterns. The retraining pipeline 524 may implement temporal weighting schemes that assign greater importance to recent claims during training to emphasize current payer behavior, while retaining historical examples to preserve learned patterns. Exponential decay weighting or sliding-window sampling may be employed to balance temporal relevance with sample diversity.

The retraining pipeline 524 may execute automated hyperparameter optimization routines that search configuration spaces for learning rate values, tree depth limits, regularization strengths, and class imbalance weights to identify optimal parameter settings for the updated training dataset. The retraining pipeline 524 may include newly identified denial patterns by extracting emergent denial reason code combinations from the payer feedback ingestion module 522 and engineering additional features capturing these patterns, such as creating indicator variables for newly problematic payer-procedure combinations or encoding temporal surge patterns in specific denial categories. The retraining pipeline 524 may perform model validation through stratified k-fold cross-validation techniques, wherein the validation dataset is partitioned into multiple folds stratified by payer, service line, and denial category to ensure representative evaluation across key segments, and wherein validation metrics, including AUROC, PR-AUC, precision, recall, F1 score, and calibration error are computed across folds to assess model performance. The retraining pipeline 524 may implement automated model quality gates that compare candidate retrained models against currently deployed production models across validation metrics. Candidate models must demonstrate statistically significant improvements or maintain performance within acceptable degradation tolerances to qualify for promotion to production deployment. The retraining pipeline 524 may register validated candidate models in a model registry with versioned artifacts, including metadata that documents training dataset characteristics, hyperparameter configurations, validation metric scores, and provenance information linking the model to specific training pipeline executions.

The retraining pipeline 524 may implement progressive deployment strategies, such as shadow mode, where candidate models score production claims in parallel with production models without influencing operational decisions. Alternatively, it may use canary deployments, in which candidate models serve a small percentage of production traffic while monitoring performance metrics before a full rollout. The retraining pipeline 524 may maintain automated rollback capabilities that detect performance degradation in newly deployed models through continuous monitoring in the governance and monitoring layer 516 and automatically revert to previous model versions when degradation thresholds are breached, such as when precision at operating threshold drops by more than 5 absolute percentage points on any top-5 payer or when inference latency P95 exceeds 100 milliseconds for sustained periods.

Figure 6A:
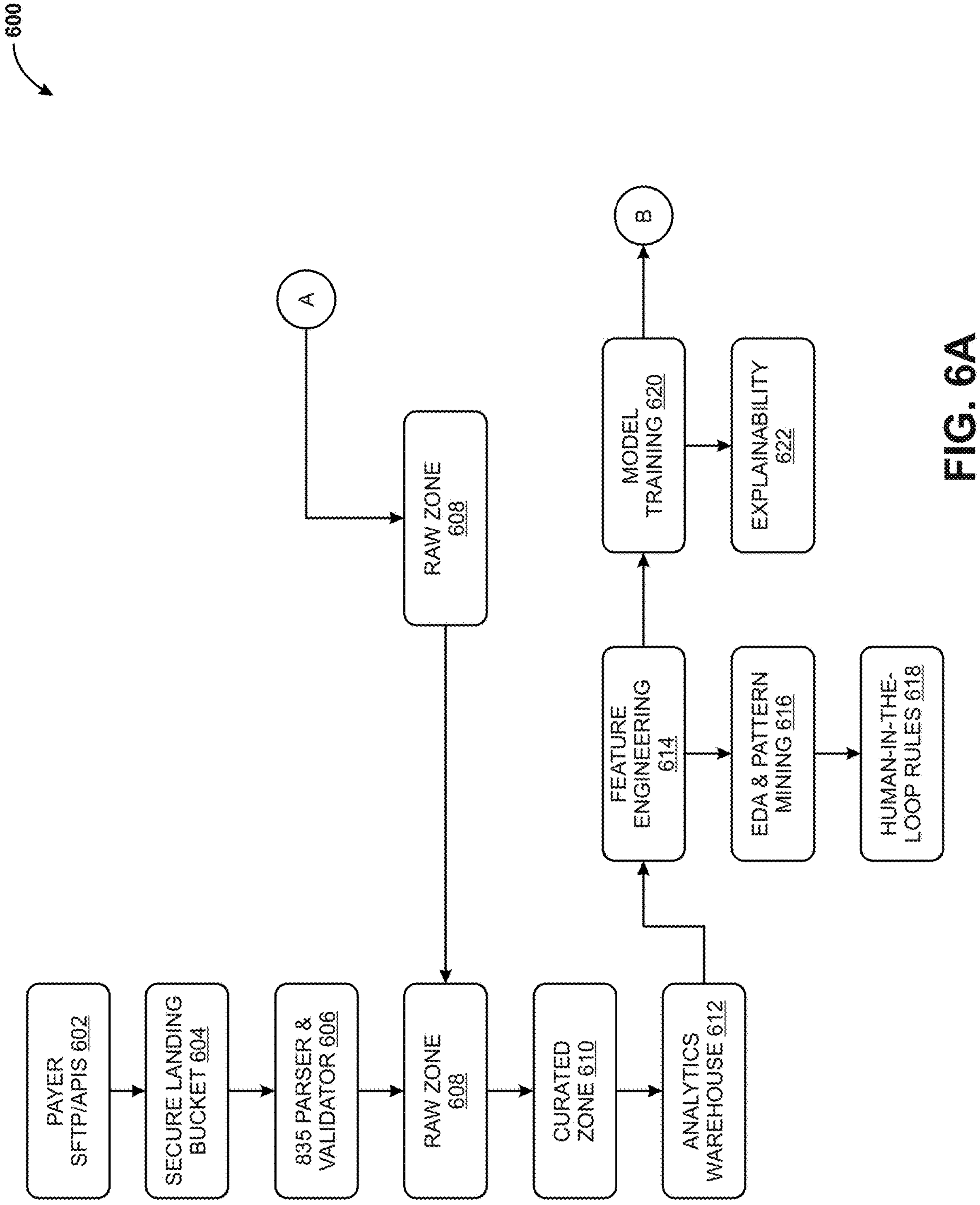
FIGS. 6A and 6B illustrate a flow diagram for automated claim integrity verification, according to an exemplary embodiment.
Figure 6B:
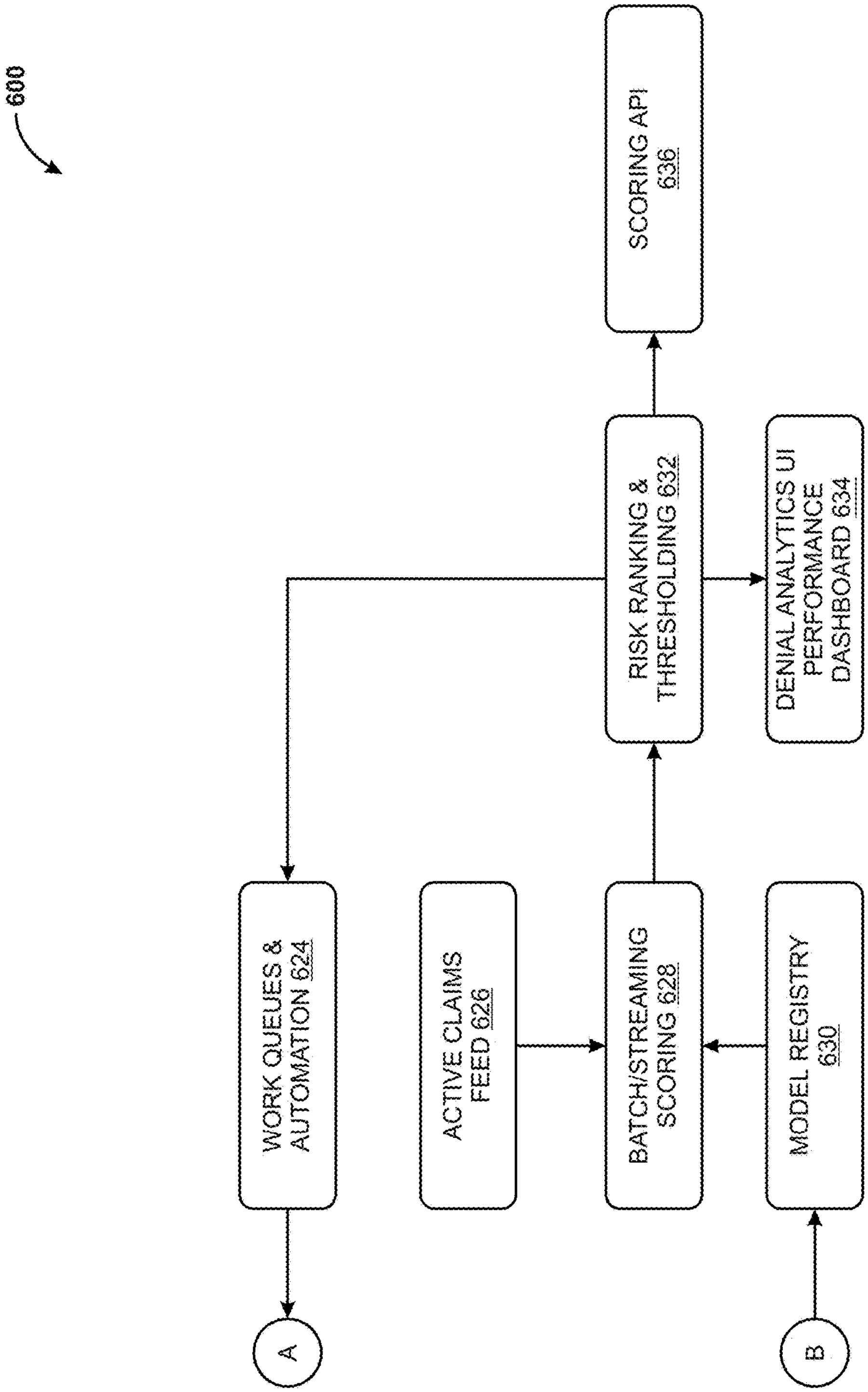

FIGS. 6A and 6B illustrate a flow diagram 600 for automated claim integrity verification, according to an exemplary embodiment. FIGS. 6A and 6B are described in conjunction with FIGS. 1-5. FIG. 6A shows components of the flow diagram 600 that includes payer SFTP/APIs 602, secure landing bucket 604, 835 parser & validator 606, raw zone 608, curated zone 610, analytics warehouse 612, feature engineering 614, EDA & pattern mining 616, human-in-the-loop rules 618, model training 620, explainability 622, work queues & automation 624, active claims feed 626, batch/streaming scoring 628, model registry 630, risk ranking & thresholding 632, denial analytics UI-performance dashboard 634, and scoring API 636. The components may be interconnected through data flow paths marked as A and B, establishing continuity between FIG. 6A and FIG. 6B.

In an embodiment, the payer SFTP/APIs 602 component may receive electronic data interchange transactions from multiple payer systems. The payer SFTP/APIs 602 may be configured to accept X12 EDI format files, including 835 electronic remittance advice files that contain payment information, denial codes, and adjustment reasons. The payer SFTP/APIs 602 may implement secure file transfer protocols and may maintain authentication mechanisms to ensure data security and integrity during transmission. The payer SFTP/APIs 602 may support both batch-file transfers via SFTP and real-time data streaming via RESTful APIs, enabling flexible integration with diverse payer infrastructures.

The secure landing bucket 604 may be used as a temporary repository for raw data files received from the payer via SFTP/APIs 602. The secure landing bucket 604 may be implemented using cloud storage services and may enforce encryption at rest and in transit. The secure landing bucket 604 may maintain access control lists and may implement retention policies to manage the data lifecycle. The secure landing bucket 604 may provide a buffer zone, decoupling the ingestion process from downstream processing and allowing the ACIS to manage variable data arrival rates without impacting processing performance.

The 835 parser & validator 606 may execute operations to extract structured data from the raw EDI files stored in the secure landing bucket 604. The 835 parser & validator 606 may implement robust parsing algorithms that may manage various loop structures and segment repetitions commonly found in X12 835 transactions. The 835 parser & validator 606 may validate the parsed data against EDI schema specifications and may identify malformed or incomplete transactions. The 835 parser & validator 606 may extract key data elements, including claim payment information, claim adjustment reason codes, remittance advice remark codes, patient identifiers, provider identifiers, service dates, and payment amounts. The 835 parser & validator 606 may generate parsing quality scores that may indicate the completeness and reliability of extracted data.

The raw zone 608 may be used as the primary data storage layer, containing parsed but unprocessed claim and remittance data. The raw zone 608 appears twice in the system architecture, with one instance receiving output from the 835 parser & validator 606 and another providing input to connection point A, which links to FIG. 6B. The raw zone 608 may implement a schema-on-read architecture that may preserve the original data structure while enabling flexible downstream transformations. The raw zone 608 may maintain data lineage information and may support versioning to track data modifications over time. The raw zone 608 may be partitioned by payer, date, and data type to optimize query performance and data retrieval.

The curated zone 610 may include cleaned, standardized, and enriched data derived from the raw zone 608. The curated zone 610 may implement data quality rules and may implement business logic transformations to normalize data representations across different payers. The curated zone 610 may perform entity resolution to link claims with their corresponding remittance advices and may maintain referential integrity across related data entities. The curated zone 610 may aggregate data at various granularities and pre-compute commonly used metrics to accelerate downstream analytics.

The analytics warehouse 612 may be operational as the centralized repository for analytical data, supporting complex queries and reporting requirements. The analytics warehouse 612 may implement dimensional modeling techniques, utilizing fact tables that contain claim transactions and dimension tables that contain payer, provider, patient, and temporal attributes. The analytics warehouse 612 may maintain historical data snapshots and may support slowly changing dimensions to track entity changes over time. The analytics warehouse 612 can be optimized for analytical workloads by utilizing columnar storage, data compression, and query optimization techniques.

The feature engineering 614 component may perform operations to transform raw data attributes into predictive features for machine learning models. The feature engineering 614 may calculate rolling window statistics of historical denial rates per payer and may encode categorical variables using techniques such as target encoding, one-hot encoding, or hash encoding. The feature engineering 614 may generate interaction features between procedure codes and diagnosis codes, and may compute temporal features such as submission lag times and days to adjudication. The feature engineering 614 may implement feature scaling and normalization techniques, and manage missing values through imputation or the creation of indicator flags. The feature engineering 614 may maintain feature metadata, including statistical distributions, cardinality, and importance scores.

The EDA & pattern mining 616 component may perform exploratory data analysis and may identify patterns in claim denial data. The EDA & pattern mining 616 may implement statistical analysis techniques to detect anomalies, outliers, and data quality issues. The EDA & pattern mining 616 may implement clustering algorithms to group similar denial patterns and may use association rule mining to identify frequently co-occurring denial reasons. EDA & pattern mining 616 may generate visualizations that reveal temporal trends, payer-specific behaviors, and seasonal variations in denial rates.

The human-in-the-loop rules 618 component enables the integration of domain expertise into the automated system through configurable business rules and manual interventions. The human-in-the-loop rules 618 may provide interfaces for subject matter experts to define exception-handling logic and capture feedback on model predictions, thereby identifying edge cases. The human-in-the-loop rules 618 may maintain rule versioning and may track rule effectiveness through performance metrics. The human-in-the-loop rules 618 may enable override mechanisms for automated decisions when human judgment may be required for complex or ambiguous cases.

The model training 620 component may execute machine learning algorithms to build predictive models for claim denial prediction. The model training 620 may implement gradient-boosted decision tree ensemble models configured with controlled tree depth to prevent overfitting. The model training 620 may use gradient descent to minimize prediction error and implement early stopping when validation performance plateaus. The model training 620 may perform hyperparameter tuning via grid search or Bayesian optimization and may use cross-validation to assess model generalization. The model training 620 may maintain training artifacts, including model weights, feature importance scores, and performance metrics.

The explainability 622 component may generate interpretable explanations of model predictions using techniques such as SHAP. The explainability 622 may compute feature contributions that may indicate which input variables most influenced each prediction. The explainability 622 may generate both global explanations that describe overall model behavior and local explanations for individual predictions. The explainability 622 may produce visualizations, including feature importance plots, partial dependence plots, and decision path diagrams, which facilitate model understanding and trust.

In an embodiment, connection points A and B establish data flow continuity between FIG. 6A and FIG. 6B, with processed data from the model training 620 and raw zone 608 flowing into the operational components depicted in FIG. 6B. These connection points may implement data serialization protocols and may maintain data consistency during the transition between processing stages.

The work queues & automation 624 component in FIG. 6B may receive inputs through connection points A and B and may orchestrate automated claim processing workflows. The work queues & automation 624 may implement priority queuing mechanisms that may route claims based on predicted denial risk, financial impact, and processing deadlines. The work queues & automation 624 may maintain multiple queues for different denial types, including authorization, coding, coverage, and documentation. The work queues & automation 624 may dispatch tasks to automation agents and may track task completion status.

The active claims feed 626 may provide real-time streaming data on claims currently being processed or edited in the revenue cycle workflow. The active claims feed 626 may interface with electronic health record systems and practice management systems to capture claim modifications as they occur. The active claims feed 626 may implement event-driven architecture using message queuing protocols and may maintain event ordering to preserve claim state consistency. The active claims feed 626 may filter and route claim events based on configurable criteria and may support both push and pull data delivery models.

The batch/streaming scoring 628 component may execute model inference on claim data using both batch and real-time processing modes. The batch/streaming scoring 628 may load trained models from the model registry 630 and may implement feature transformations consistent with training specifications. In streaming mode, batch/streaming scoring 628 can achieve sub-100-millisecond latency through model optimization techniques such as model quantization, caching, and micro-batching. In batch mode, the batch/streaming scoring 628 may efficiently process large volumes of claims through parallelization and vectorized computations. The batch/streaming scoring 628 may generate prediction outputs including denial probabilities, risk scores, and confidence intervals.

The model registry 630 may provide a centralized repository for trained machine learning models, managing model versioning, staging, and deployment. The model registry 630 may store model artifacts, including serialized model weights, preprocessing pipelines, and feature schemas. The model registry 630 may implement semantic versioning, where major versions indicate schema changes, minor versions denote new training data, and patch versions signify threshold adjustments. The model registry 630 may maintain model lineage information, including training datasets, hyperparameters, and performance metrics. The model registry 630 may support model promotion workflows from development through staging to production environments.

The risk ranking & thresholding 632 component may implement business rules to model predictions to determine claim disposition and processing priority. The risk ranking & thresholding 632 may implement configurable threshold values that may balance precision and recall based on operational requirements. The risk ranking & thresholding 632 may compute risk scores that may combine denial probability with financial impact to prioritize high-value claims. The risk ranking & thresholding 632 ay implement payer- and service-line-specific thresholds to account for varying denial patterns. The risk ranking & thresholding 632 may generate ranked claim lists that may optimize resource allocation for manual review and automated correction.

The denial analytics UI performance dashboard 634 may provide visualization and reporting interfaces for monitoring ACIS performance and the effectiveness of denial prevention. The denial analytics UI performance dashboard 634 may display key performance indicators, including denial rates, automation success rates, and financial recovery metrics. The denial analytics UI performance dashboard 634 may implement interactive drill-down capabilities that may enable investigation of specific denial patterns or payer behaviors. The denial analytics UI performance dashboard 634 may generate compliance reports that demonstrate decision transparency and support role-based access control for different user types. The denial analytics UI performance dashboard 634 may integrate real-time and historical data to display performance trends and highlight anomalies that require attention.

The scoring API 636 may expose model inference capabilities through standardized web service interfaces that external systems and applications can consume. The scoring API 636 may implement RESTful endpoints that accept JSON-formatted claim data and return structured prediction responses. The scoring API 636 may enforce authentication and authorization via OAuth2 or mutual TLS and may implement rate limiting to prevent service abuse. The scoring API 636 may maintain service-level objectives with P95 latency targets of less than 100 milliseconds and support both synchronous and asynchronous scoring modes. The scoring API 636 may include health-check endpoints and expose metrics for monitoring and alerting.

In an embodiment, the flow diagram 600 shown in FIG. 6A and FIG. 6B may be implemented using the components shown in FIG. 4. For example, the prediction engine 426, which may correspond to the model training 620 and batch/streaming scoring 628 components. The automation dispatch module 422 in FIG. 4 may implement the work queues & automation 624 to coordinate automation agents. The analytics engine 436 and the tracking and reporting engine 440, shown and described in FIG. 4, may consume data from the analytics warehouse 612 and provide inputs to the denial analytics UI-performance dashboard 634. The feedback loop module 424 in FIG. 4 may receive outputs from the scoring API 636 and remittance data processed through the 835 parser & validator 606 to enable continuous model improvement. In an embodiment, the data preprocessing module 402 shown in FIG. 4 may perform initial data preparation that feeds into the secure landing bucket 604, while the machine learning engines 430 and the machine learning models repository module 432 may work in conjunction with the model training 620 and the model registry 630. The compliance engines 434 and 446 in FIG. 4 may integrate with the human-in-the-loop rules 618 to ensure regulatory compliance throughout the processing pipeline. The performance automation module 420 may utilize outputs from the risk ranking & thresholding 632 to optimize claim processing workflows.

Figure 7:
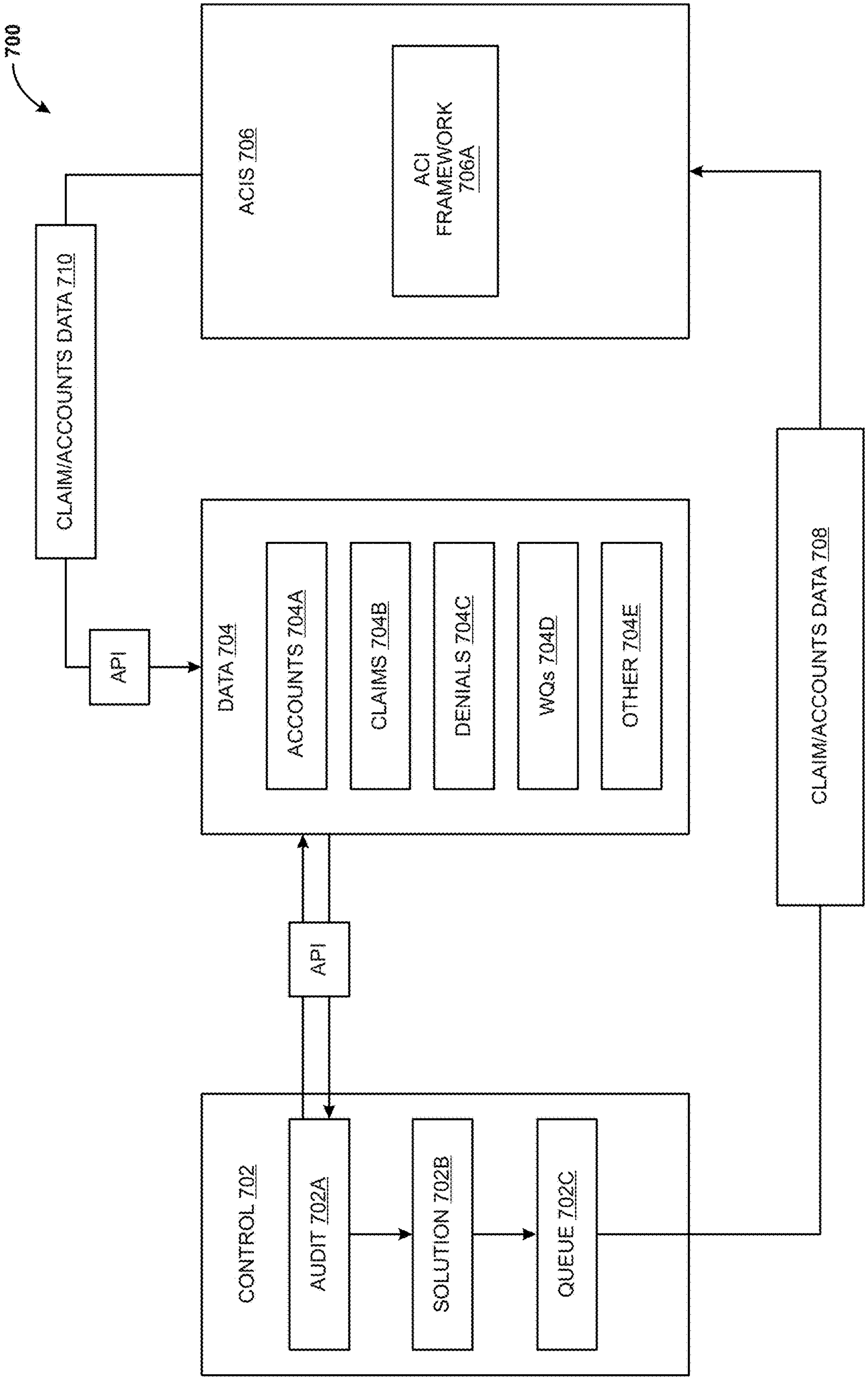
FIG. 7 illustrates an environment showing a deployment of the ACIS, according to an exemplary embodiment.

FIG. 7 illustrates an environment 700 showing a deployment of the ACIS, according to an exemplary embodiment. FIG. 7 is described in conjunction with FIGS. 1-6B. In an embodiment, FIG. 7 shows a deployment architecture 700, showing the relationship between the control layer 702, the accounts data layer 704, the ACIS 706, including the ACI framework 706A, and the data exchange interfaces 708 and 710. The deployment architecture 700 includes an audit component 702A, a solution component 702B, and a queue component 702C, which collectively form the control layer 702. The deployment architecture 700 further includes an accounts data component 704A, a claims data component 704B, a denials data component 704C, work queues (WQs) 704D, and other data components 704E, which together constitute the accounts data layer 704. The ACIS 706 may be operably connected to the ACI framework 706A, and both components 706 and 706A may be configured to interface with the control layer 702 and the accounts data layer 704 through structured data exchange mechanisms.

The control layer 702 may be configured to provide governance, oversight, and orchestration functions for claim processing workflows. The audit component 702A can be configured to track and record system activities, user actions, and data modifications throughout the claim lifecycle, ensuring compliance with regulatory requirements and internal quality standards. The solution component 702B may be configured to implement business logic and decision rules that manage how claims are evaluated, prioritized, and routed through various processing stages. The queue component 702C may be configured to manage the sequencing and prioritization of claims awaiting processing, correction, or review, thereby facilitating orderly workflow management across the deployment architecture 700.

The accounts data layer 704 may be configured to store and organize multiple categories of claim-related information. The accounts data component 704A may be configured to maintain patient account information, billing details, and financial records associated with each claim. The claims data component 704B may be configured to store structured claim information, including procedure codes, diagnosis codes, payer identifiers, service dates, and provider information, corresponding to the first attributes and second attributes recited in the independent claim. The denials data component 704C may be configured to record historical denial outcomes, denial reasons, and adjustment codes received from payer systems. The output of the denials data component 704C may be utilized by the multiple machine learning engines 430 (shown in FIG. 4) to train a plurality of machine learning models based on patterns detected in claim denial outcomes. The work queues 704D may be configured to hold claims requiring specific corrective actions, enabling the automation dispatch module 422 (shown in FIG. 4) to route claims to corresponding automation agents based on denial-type predictions. The other data components, 704E, may be configured to store supplementary information, such as payer-specific rules, coding guidelines, and reference data.

The ACIS 706 may correspond to the ACIS 104 or 204D shown in FIGS. 1 and 2, and may implement the ACIS for claim integrity in healthcare revenue cycle management, as recited in the independent claim. The ACIS 706 may be configured to interface with multiple modules and engines as shown and described in FIG. 4. In an embodiment, the ACI framework 706A may correspond to the ACI framework 304A shown in FIG. 3 and may provide the architectural foundation for the ACIS 706. The ACI framework 706A may be configured to orchestrate data flow between data sources 302 (shown in FIG. 3), including historical data 302A, real-time data 302B, payer data 302C, clinical data 302D, and electronic health records 302E, and the processing modules within the ACIS 706. The ACI Framework 706A may facilitate the operations recited in the independent claim, including receiving, in real time, a first dataset from a plurality of first data sources and a second dataset from a plurality of second data sources. The ACI framework 706A may be configured to coordinate with interfaces 306 (shown in FIG. 3), including an external interface 306A, other interfaces 306B, an EHR interface 306C, an Interactive Voice Response (IVR) interface 306D, and a patient self-referral interface 306E.

The deployment architecture 700 may be configured to exchange claim and account data through Application Programming Interfaces (APIs). A first API 708 labeled "CLAIM/ACCOUNTS DATA" may be configured to transmit structured data from the accounts data layer 704 to the ACIS 706 and the ACI Framework 706A. The first API 708 may facilitate real-time extraction of claim features, including payer-specific patterns, provider histories, and coding relationships, as recited in the independent claim. A second API 710, also labeled "CLAIM/ACCOUNTS DATA," may be configured to transmit processed data, corrected claims, and analytical results from the ACIS 706 and the ACI Framework 706A back to the accounts data layer 704. The bidirectional data flow between APIs 708 and 710 may include interfacing with electronic health record systems, where structured claim data is extracted in real-time and computed features are stored in a distributed cache. This bidirectional data flow automatically updates claim records based on denial predictions and correction outcomes.

The ACIS 706 may be configured to receive the second dataset through the first API 708, which includes a plurality of medical claims awaiting submission. The multiple machine learning engines 430 (shown in FIG. 4) may be configured to process each medical claim by extracting claim features and applying trained machine learning models to generate a denial probability score and a denial category classification for each medical claim. The prediction engine 426 (shown in FIG. 4) may be configured to generate explainability values using SHAP analysis to identify features that contribute to the denial probability score, as recited in the independent claim. For each medical claim having a denial probability score exceeding a threshold value, the automation dispatch module 422 (shown in FIG. 4) may be configured to identify corrective actions based on the denial category classification and the explainability values, and to route the claims to the work queues 704D through the second API 710.

The automation agents may be implemented within the ACIS 706 and may interact with the work queues 704D. An authorization agent may be configured to interface with payer systems to verify and update prior authorization data stored in the other data components 704E. A coding agent may be configured to validate and correct procedure and diagnosis code combinations within the claims data component 704B. A coverage agent may be configured to verify patient eligibility and benefit information associated with the accounts data component 704A. The automation dispatch module 422 (shown in FIG. 4) may be configured to execute automated corrections to medical claims using the automation agents configured for specific denial types, as recited in the independent claim.

The feedback loop module 424 (shown in FIG. 4) may be configured to receive remittance data from payer systems through the integration engine 448 (shown in FIG. 4) and the payer module 446 (shown in FIG. 4). The remittance data may include medical claim adjustment reason codes (CARC) and remittance advice remark codes (RARC) for any denied claims, which may be stored in the denials data component 704C. The plurality of machine learning engines 430 (shown in FIG. 4) may be configured to retrain the multiple machine learning models based on the remittance data to improve future denial predictions, thereby implementing the closed-loop learning architecture recited in the independent claim that continuously improves denial prediction accuracy and maintains medical claim integrity by detecting and correcting medical claim deficiencies before submission to payers.

The control layer 702 may be configured to work in conjunction with the compliance engine 434 (shown in FIG. 4) to generate visual analytics. The user interface 310 (shown in FIG. 3) may be configured to display dashboards through end user systems 310A and end user devices 310B, wherein the dashboards display key performance indicators for denial rates. Visual analytics 310C and visualizations 310D (as shown in FIG. 3) may be configured to present explainability visualizations that display feature contributions to denial predictions, as well as compliance reports that demonstrate decision transparency. The tracking and reporting engine 438 (shown in FIG. 4) is configured to quantify system performance and operational metrics, which can be monitored through the audit component 702A.

The deployment architecture 700 may be configured to maintain a distributed feature store within the ACIS 706. The feature store caches computed features derived from the accounts data layer 704. The integration engine 448 (shown in FIG. 4) may be configured to implement real-time scoring with latency below 100 milliseconds by maintaining persistent connections with the accounts data layer 704 through APIs 708 and 710. The computation engines 444 (shown in FIG. 4) may include artificial intelligence processors, Graphics Processing Units 1010A, Field-Programmable Gate Arrays 1010B, Application-Specific Integrated Circuits 1010C, or Neural Processing Units 1010D (shown in FIG. 10), configured to accelerate machine learning computations performed by the multiple machine learning engines 430.

In operation, the deployment architecture 700 enables interaction among governance functions, data repositories, and intelligent processing systems. The control layer 702 may initiate claim processing workflows by signaling the queue component 702C to select claims from the accounts data layer 704 for evaluation. The first API 708 may transmit claim and account data from the claims data component 704B and the accounts data component 704A to the ACIS 706. The ACIS 706, operating in conjunction with the ACI Framework 706A, may implement multiple machine learning models through the multiple machine learning engines 430 (shown in FIG. 4) to extract claim features and generate denial probability scores and denial category classifications. Claims exceeding the threshold value may be routed back to the work queues 704D through the second API 710, where the automation dispatch module 422 (shown in FIG. 4) may assign appropriate automation agents to execute corrective actions. The automation agents may retrieve necessary information from the denials data component 704C and the other data components 704E, perform automated corrections to the claims data component 704B, and re-score the corrected claims through the prediction engine 426 (shown in FIG. 4). Upon verification that the denial probability score falls below the threshold value, the ACIS 706 may send the corrected claims to payer systems through the payer module 446 (shown in FIG. 4). The feedback loop module 424 (shown in FIG. 4) may subsequently receive remittance data containing denial codes and payment adjustments, which may be parsed and stored in the denials data component 704C. The plurality of machine learning engines 430 may retrain the machine learning models based on the remittance data, thereby implementing continuous learning and adaptation. The audit component 702A may record all ACIS activities and transactions, the solution component 702B may update business rules based on observed patterns, and the queue component 702C may dynamically prioritize claims based on risk scores and business priorities. The bidirectional data flow between the ACIS 706 and the accounts data layer 704 through APIs 708 and 710 may enable real-time synchronization of claim statuses, denial predictions, and correction outcomes, thereby maintaining data consistency across the deployment architecture 700 and supporting the closed-loop learning architecture that continuously improves denial prediction accuracy while maintaining claim integrity throughout the healthcare revenue cycle management process.

Figure 8:
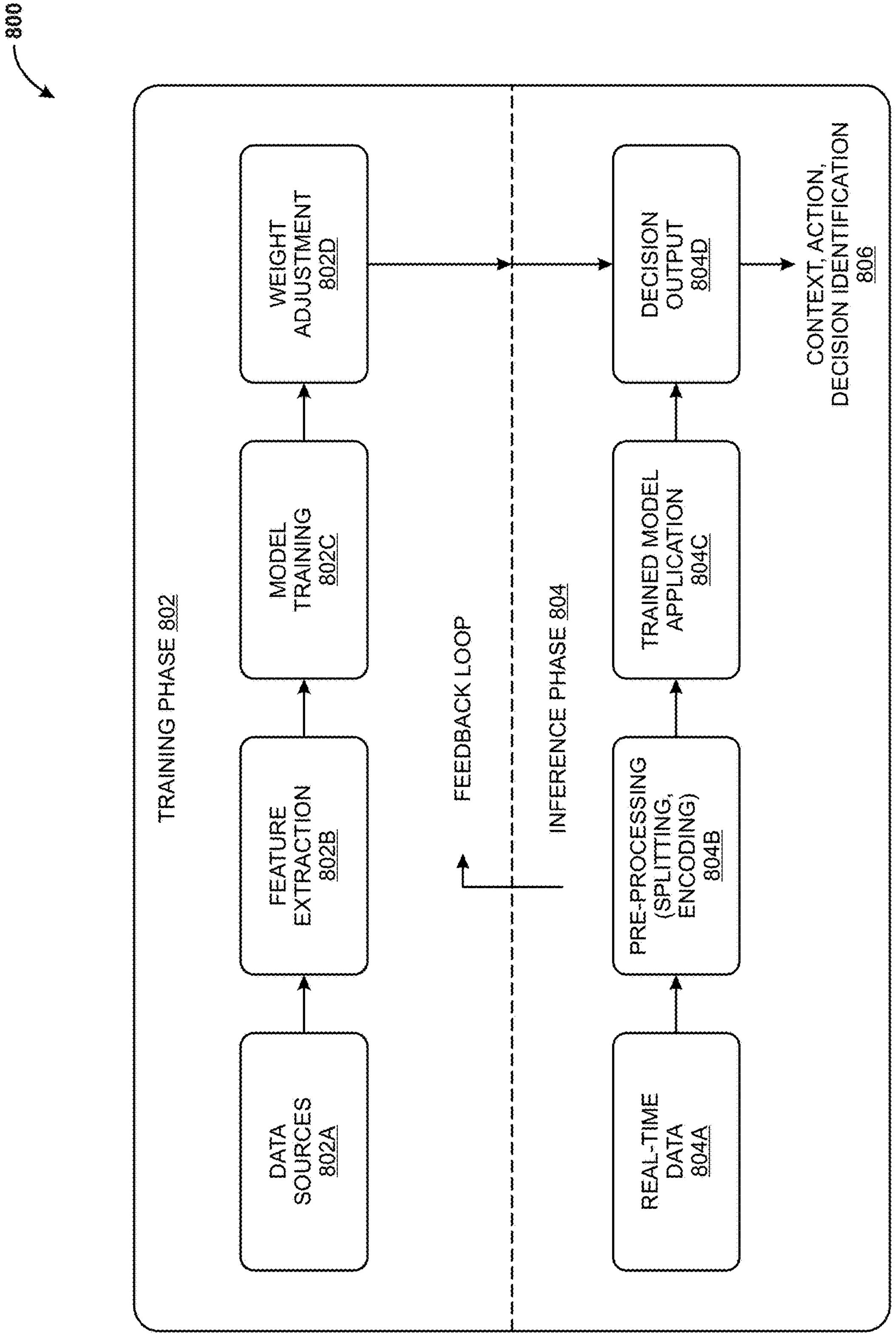
FIG. 8 illustrates a workflow for implementing machine learning training and inference by the ACIS, according to an exemplary embodiment.

FIG. 8 illustrates a workflow 800 for implementing machine learning training and inference by the ACIS, according to an exemplary embodiment. FIG. 8 is described in conjunction with FIGS. 1-7. FIG. 8 shows a workflow 800 for implementing machine learning training and inference by the ACIS. In an embodiment, FIG. 8 illustrates that workflow 800 comprises a training phase 802, an inference phase 804, and a context, action, and decision identification module 806, which facilitates bidirectional information flow between the two phases 802 and 804. The training phase 802 includes data sources 802A, a feature extraction module 802B, a model training module 802C, and a weight adjustment module 802D. The inference phase 804 includes real-time data 804A, a pre-processing module 804B, a trained model application module 804C, and a decision output module 804D. The context, action, and decision identification module 806 may be positioned between the training phase 802 and the inference phase 804 to enable feedback-driven model improvement and deployment orchestration.

In an embodiment, the data sources 802A in the training phase 802 provide historical claim transaction datasets retrieved from electronic health record systems, practice management systems, and payer remittance systems. The data sources 802A may correspond to the historical data 302A and payer data 302C shown and described in FIG. 3 and may provide historical claim transactions with associated approval and denial outcomes extracted from X12 835 electronic remittance advice files. Historical claim transactions include claim attributes such as procedure codes, diagnosis codes, payer and provider identifiers, service dates, billed amounts, and adjudication outcomes, including claim adjustment reason codes (CARC) and remittance advice reason codes (RARC).

The feature extraction module 802B receives historical claim datasets from the data sources 802A and executes feature engineering operations to transform raw claim attributes into structured feature vectors suitable for training machine learning models. The feature extraction module 802B may be implemented within the data preprocessing module 402 shown and described in FIG. 4. The feature extraction module 802B executes operations for categorical feature encoding operations including target encoding for payer identifiers and frequency encoding for procedure codes, numerical feature transformation operations including logarithmic transformations for financial variables and standardization transformations to normalize distributions, temporal feature engineering operations including submission lag calculations and rolling window statistics, aggregation feature engineering operations including provider-level denial rates and payer-level denial rates computed over rolling temporal windows, interaction feature engineering operations including procedure-diagnosis combinations and payer-provider interaction patterns, and domain-specific medical coding feature engineering operations including ICD-10 chapter mappings and CPT category groupings. The feature extraction module 802B outputs a structured feature matrix wherein each row represents a historical claim transaction and each column represents a derived feature variable.

The model training module 802C receives the structured feature matrix from the feature extraction module 802B, along with ground-truth labels indicating whether each historical claim resulted in an approval or denial outcome. The model training module 802C may be implemented within the machine learning engines 430 shown and described in FIG. 4. The model training module 802C executes gradient boosted decision tree (GBDT) collective algorithms that construct a predictive model as an additive collection of shallow decision trees. Each successive tree may be trained to predict the residual errors remaining after predictions from all previously constructed trees. The model training module 802C may configure the gradient boosting algorithm with training hyperparameters including a learning rate parameter, a maximum tree depth parameter, a minimum data in leaf parameter, subsample and feature fraction parameters, and regularization parameters. The model training module 802C implements stratified k-fold cross-validation to assess model generalization performance and hyperparameter optimization to systematically search for optimal hyperparameter configurations that maximize validation performance metrics, including the area under the receiver operating characteristic curve (AUC-ROC).

The weight adjustment module 802D executes the core gradient boosting algorithm, which iteratively constructs decision trees and updates node weights via gradient descent on the loss function. The weight adjustment module 802D may be integrated within the model training module 802C. The weight adjustment module 802D initializes the model with a constant prediction equal to the log-odds of the denial base rate. In each boosting iteration, the weight adjustment module 802D computes residual errors between current model predictions and ground-truth denial labels, constructs a new decision tree that predicts the residual errors by recursively partitioning the feature space based on optimal feature and threshold value splits, computes a weight value for each leaf node representing the optimal prediction adjustment for samples assigned to that leaf, scales the leaf weights by the learning rate parameter, and adds the newly constructed tree with computed leaf weights to the ensemble model. The weight adjustment module 802D evaluates early stopping criteria after each boosting iteration by computing validation loss on a held-out validation dataset and terminates training when validation loss has not improved for a specified number of consecutive iterations. The weight adjustment module 802D produces a trained gradient-boosted decision tree ensemble model that may be serialized and stored in the machine learning models repository module 432, as shown and described in FIG. 4.

The context, action, and decision identification module 806 provides a bidirectional interface between the training phase 802 and the inference phase 804. The context, action, and decision identification module 806 may be implemented within the feedback loop module 424. The automation dispatch module 422, shown and described in FIG. 4, receives trained model artifacts from the weight adjustment module 802D. The context, action, and decision identification module 806 receives these artifacts. It executes model validation operations, including functional testing, performance testing, accuracy testing, bias testing, and explainability testing, to verify that the trained model meets production-readiness criteria. Upon successful validation, the context, action, and decision identification module 806 deploys the trained model to the inference phase 804 by transferring the serialized model artifact to the trained model application module 804C. The context, action, and decision identification module 806 defines decision rules that map model predictions to actionable recommendations, including threshold-based classification logic. In this logic, claims with a predicted denial probability exceeding a high-risk threshold are classified as high-risk and require automated corrections. The context, action, and decision identification module 806 maps denial category classifications to specific automation agents that execute corrective actions, including authorization validation agents, eligibility verification agents, and clinical coding validation agents.

The real-time data 804A in the inference phase 804 includes active claim records created in electronic health record systems or practice management systems that have not yet been submitted to payers for adjudication. The real-time data 804A may be accessed through the integration engine 448, as illustrated in FIG. 4, which implements interface protocols including HL7 messaging, X12 EDI transaction sets, FHIR APIs, and proprietary vendor-specific APIs. The integration engine 448 may implement polling mechanisms that periodically query source systems for new claim records or use event-driven mechanisms, such as webhooks or message queues, to instantiate inference requests in near real-time.

The pre-processing module 804B receives real-time claim data from the real-time data 804A and executes feature extraction operations identical to those performed by the feature extraction module 802B during the training phase 802. The pre-processing module 804B may be implemented within the data preprocessing module 402 shown and described in FIG. 4. The pre-processing module 804B applies the same categorical encoding mappings, numerical transformations, temporal derivations, aggregation calculations, interaction derivations, and domain-specific derivations that were applied to the training dataset. The pre-processing module 804B retrieves feature engineering artifacts from the feature store 506 shown and described in FIG. 5, including target encoding mappings and standardization parameters. The pre-processing module 804B computes payer-specific pattern features by retrieving historical denial rates for payer identifiers, computes provider history features by retrieving historical denial rates for provider National Provider Identifiers, and computes coding relationship features by identifying procedure-diagnosis code combinations. The pre-processing module 804B executes data validation and applies imputation strategies for missing feature values, then assembles the extracted features into a structured feature vector with dimensionality and feature ordering matching the feature schema used during model training.

The trained model application module 804C receives the feature vector from the pre-processing module 804B and executes model inference by loading the trained gradient boosted decision tree ensemble model from the machine learning models repository module 432. The trained model application module 804C may be implemented within the prediction engine 426 shown and described in FIG. 4. The trained model application module 804C loads the trained model artifact from persistent storage and deserializes the binary model file format into an in-memory model object. The trained model application module 804C traverses the feature vector through each decision tree in the ensemble by evaluating binary split conditions at each node, accumulates the leaf weight value from the assigned leaf in each tree, sums the accumulated leaf weights across all trees to produce a raw prediction score representing log-odds of denial, and applies a sigmoid activation function to transform the raw prediction score into a calibrated denial probability value ranging from 0.0 to 1.0. The trained model application module 804C generates a denial category classification by executing a secondary multi-class classification model that produces a probability distribution over denial type categories, including authorization-related, coverage and eligibility, coding and billing error, timely filing deadline violation, and documentation deficiency categories. The trained model application module 804C generates explainability values using SHAP analysis to quantify the contribution of each input feature to the final prediction of the denial probability. It computes SHAP values using TreeSHAP algorithms optimized for tree-based models and ranks features by the absolute magnitude of their SHAP values to identify the top contributing features.

The decision output module 804D receives the denial probability score, the denial category classification, and the SHAP explainability values from the trained model application module 804C and generates actionable recommendations for claim handling. The decision output module 804D may be implemented within the automation dispatch module 422, as shown and described in FIG. 4. The decision output module 804D compares the denial probability score to a predefined threshold value and classifies claims exceeding the threshold as high-risk, requiring intervention. The decision output module 804D analyzes the denial category classification to determine the primary denial risk driver and selects corresponding automation agents to address the identified denial category. For claims with authorization-related denial categories, the decision output module 804D invokes authorization validation automation agents implemented within the pre-authorization process module 410 shown and described in FIG. 4. For claims with coverage and eligibility denial categories, the decision output module 804D invokes eligibility verification automation agents implemented within the patient intake module 404 shown and described in FIG. 4. For claims with coding and billing error denial categories, the decision output module 804D invokes clinical coding automation agents implemented within the billing and coding module 406 shown and described in FIG. 4. The decision output module 804D tracks all automated corrections by recording correction timestamps, automation agent identifiers, modified data fields, original values, and corrected values in the audits module 418 shown and described in FIG. 4. After automated corrections have been applied, the decision output module 804D transmits the corrected claim data back to the pre-processing module 804B for re-scoring, and when the updated denial probability score falls below the threshold value, the decision output module 804D routes the claim to a submission queue for transmission to the payer through X12 837 claim transaction files processed by the claim status module 412 shown and described in FIG. 4.

Figure 9A:
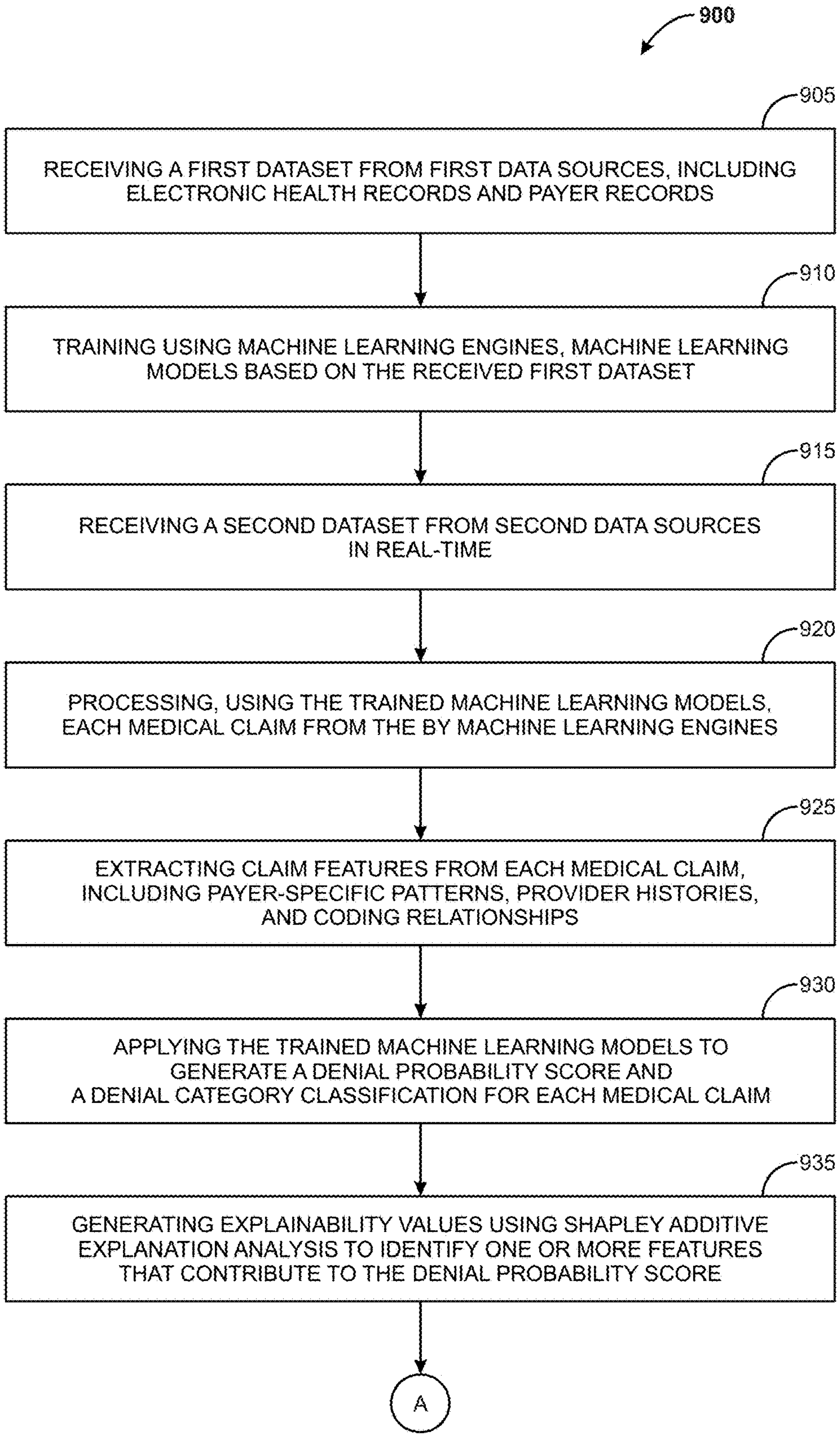
FIG. 9A and FIG. 9B illustrates a flow diagram implemented by the ACIS, according to an exemplary embodiment.
Figure 9B:
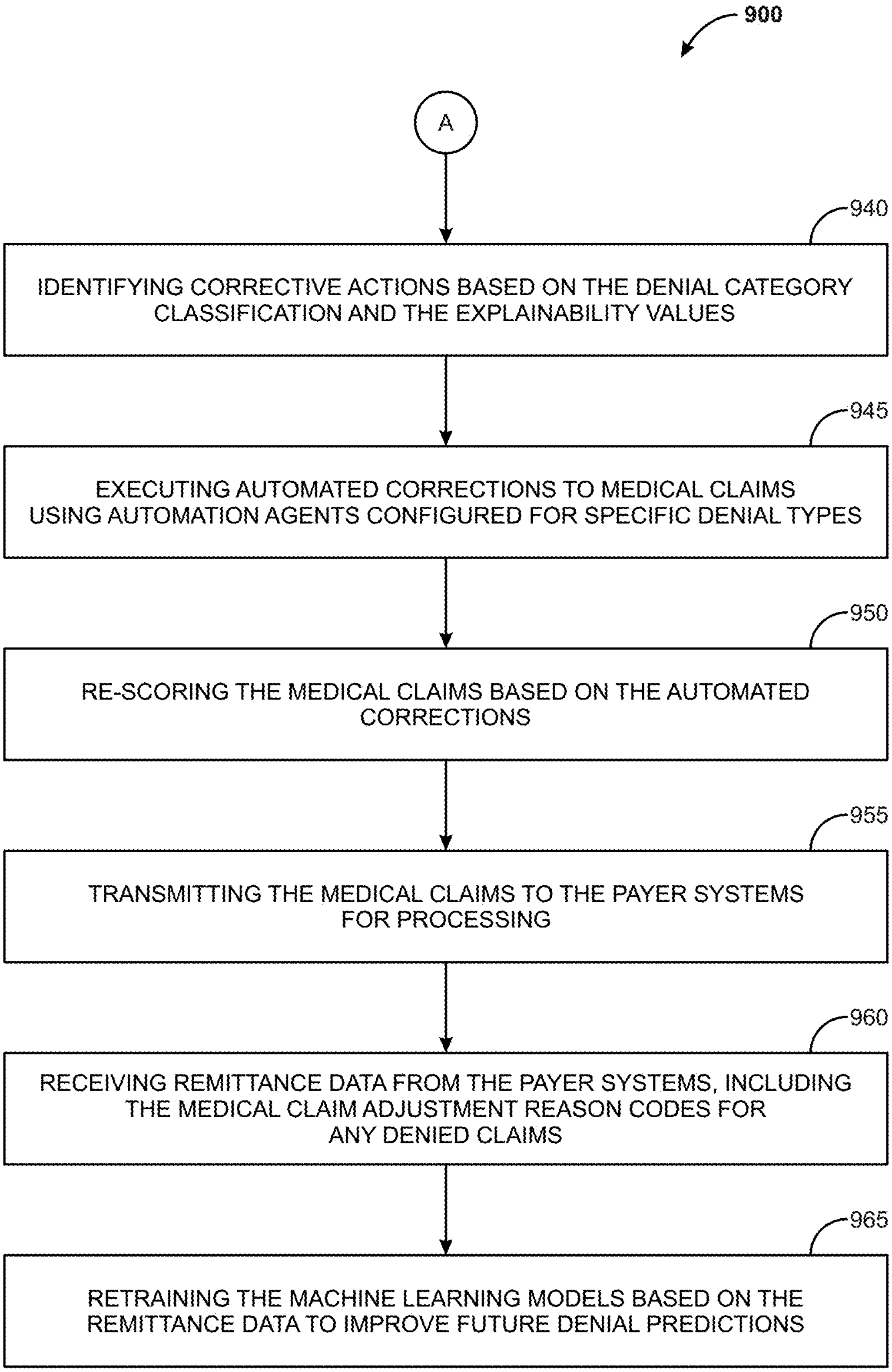

FIG. 9A and FIG. 9B illustrates a flow diagram implemented by the ACIS, according to an exemplary embodiment. FIGS. 9A and 9B are described in conjunction with FIGS. 1-8. FIG. 9A and FIG. 9B illustrates a flow diagram including a method 900 or mechanism implemented by the ACIS for automated claim integrity in healthcare revenue cycle management. The method 900 may be executed by components of the ACIS, as described in FIG. 2, FIG. 3, and FIG. 4. The integrated system architecture 300 is shown in FIG. 3 is implemented on the hardware configuration shown and described in FIG. 10.

FIG. 9A and FIG. 9B may be described as illustrating a computer-implemented method 900 for claim integrity in healthcare revenue cycle management, according to an exemplary embodiment. The method 900 may be executed by components of the ACIS 206, as shown and described in FIG. 2, and by the integrated system architecture 300 shown in FIG. 3, implemented on the hardware configuration illustrated in FIG. 10.

At step 905, a first dataset may be received by at least one processor from a plurality of first data sources, including electronic health records and payer records. The first dataset may include a plurality of historical medical claims associated with approval outcomes and denial outcomes, such that each historical claim may include first attributes, including procedure codes, diagnosis codes, payer identifiers, and historical denial reasons. The receiving operations may be performed by the CPU 1005 shown in FIG. 10, accessing data through the network interface 1020 and storing the received data in the system memory 1015. The first data sources may correspond to the EHR interface 302A and the payer portal interface 302B, as described in FIG. 3.

At step 910, a plurality of machine learning models may be trained using a plurality of machine learning engines based on the received first dataset, where the training includes adjusting the weights of nodes in gradient-boosted decision trees based on patterns detected in claim denial outcomes from the plurality of historical claims. The plurality of machine learning models may comprise gradient boosted decision tree ensemble models. Training the machine learning models may comprise constructing decision trees with controlled depth to prevent overfitting, applying gradient descent optimization to minimize prediction error, and implementing early stopping when validation performance plateaus. The training operations may be executed by the AI processors 1010 shown in FIG. 10, including the GPU 1010A for parallel processing, the TPU 1010E for tensor operations, and the NPU 1010D for specialized neural processing tasks.

At step 915, the processor may receive a second dataset from multiple second data sources in real-time. The second dataset may include a plurality of medical claims awaiting submission and associated with medical procedures, treatments, or services, where each medical claim may comprise second attributes. Real-time data reception may be facilitated by interfacing with electronic health record systems, including the extraction of structured claim data in real-time and the storage of computed features in a distributed cache with sub-100-millisecond access latency. The network interface 1020 of FIG. 10 manages data reception and processing through the RAM 1045.

At step 920, each medical claim from the plurality of medical claims may be processed by machine learning engines based on the trained plurality of machine learning models. The processing may be distributed across at least one processor, which may comprise artificial intelligence processors selected from Graphics Processing Units, Field-Programmable Gate Arrays, Application-Specific Integrated Circuits, or Neural Processing Units. The method may further comprise accelerating machine learning computations using these artificial intelligence processors. These may correspond to the GPU 1010A, FPGA 1010B, ASIC 1010C, and NPU 1010D shown in FIG. 10.

At step 925, claim features may be extracted from each medical claim, including payer-specific patterns, provider histories, and coding relationships. The extraction of claim features may comprise calculating rolling window statistics of historical denial rates per payer, encoding categorical variables using target encoding based on denial outcomes, and implementing interaction features between procedure codes and diagnosis codes. The feature extraction may utilize a distributed feature store for caching computed features, which is maintained in system memory 1015.

At step 930, the trained machine learning models may be applied to generate a denial probability score and a denial category classification for each medical claim. The application may include implementing real-time scoring with latency below 100 milliseconds, utilizing the high-speed processing capabilities of the AI processors 1010. The scoring operations may be performed by the denial management module 304C described in FIG. 3.

At step 935, explainability values may be generated using SHAP analysis to identify features that contribute to the denial probability score. The SHAP analysis can be computed by the NPU 1010D or GPU 1010A using parallel processing to calculate across multiple claim attributes efficiently. Visual analytics may be generated, wherein generating visual analytics may comprise displaying key performance indicators for denial rates via dashboards, visualizing explainability data that shows feature contributions to denial predictions, and generating compliance reports that display decision transparency. The method 900 may continue from step 935 through connector A to FIG. 9B.

At step 940, for each medical claim with a denial probability score exceeding a threshold, corrective actions may be identified based on the denial category classification and the explainability values. The identification may include routing medical claims to corresponding automation agents based on predicted denial types. The process may be executed by the CPU 1005 accessing the validation and action component 308 described in FIG. 3.

At step 945, automated corrections to medical claims may be executed by agents configured for specific denial types. The execution of automated corrections using automation agents may comprise interfacing, by an authorization agent, with payer systems to verify and update prior authorization data; validating and correcting, by a coding agent, procedure and diagnosis code combinations; and verifying, by a coverage agent, patient eligibility and benefit information. The execution of automated corrections may specifically include updating missing or incorrect authorization numbers, modifying diagnosis codes to align with medical necessity requirements, adjusting service dates to comply with timely filing limits, and correcting provider identification and credentialing information. These automation agents may correspond to components within the automation platform 304, as shown in FIG. 3.

At step 950, the medical claims may be re-scored based on the automated corrections. The re-scoring may utilize the ASIC 1010C, which is optimized for rapid inference, allowing for real-time scoring with a latency of less than 100 milliseconds.

At step 955, upon verifying that the denial probability score may be below the threshold value, the medical claims may be transmitted to the payer systems for processing. The transmission may include bidirectional data flow that automatically updates claim records based on denial predictions and correction outcomes, executed via the network interface 1020, with the CPU 1005 handling data formatting and encryption.

At step 960, remittance data may be received from the payer systems, including the medical claim adjustment reason codes for any denied claims. The receiving remittance data may comprise parsing electronic remittance advice files to extract denial codes, correlating actual denial outcomes with predicted probabilities, and calculating a population stability index to detect distribution drift. The remittance data may be processed through the network interface 1020 and stored in the HDD 1055 via the HDD interface 1025.

At step 965, the plurality of machine learning models may be retrained using remittance data to improve future denial predictions. The retraining may include executing parallel processing workflows for concurrent validation of authorization, coverage, and coding accuracy, utilizing the full complement of AI processors 1010. The GPU 1010A may perform gradient descent optimization, the TPU 1010E may execute tensor operations for weight updates, and the FPGA 1010B may be reconfigured for evolving model architectures.

In an embodiment, the computer-implemented method 900 may operate as a closed-loop learning process that continuously improves denial prediction accuracy and maintains medical claim integrity by detecting and correcting deficiencies in medical claims before they are submitted to payers. The closed-loop learning architecture may be facilitated by the bidirectional data flow capabilities described in FIG. 2, with the claim/accounts data API and claim/account update API enabling real-time modifications. The method may further comprise maintaining a distributed feature store for caching computed features, implementing real-time scoring with a latency of less than 100 milliseconds, and routing medical claims to corresponding automation agents based on denial-type predictions. The entire process can be monitored via the display device 1070, which is connected to the I/O interface 1035B, providing visual analytics through the visual analytics component 310 of FIG. 3.

In an embodiment, the ACIS for claim integrity in healthcare revenue cycle management may be operable to receive a first dataset from a plurality of first data sources, including electronic health records and payer records. The first dataset includes a plurality of historical medical claims associated with approval outcomes and denial outcomes, wherein each historical claim includes first attributes, including procedure codes, diagnosis codes, payer identifiers, and historical denial reasons, enabling comprehensive pattern recognition across diverse healthcare data ecosystems with the technical advantage of creating a unified data fabric that captures both provider-side clinical information and payer-side administrative decisions to establish ground truth for machine learning model training. The ACIS implements multiple machine learning engines to train multiple machine learning models based on the received first dataset.

In an embodiment, the training includes adjusting the weights of nodes in gradient-boosted decision trees based on patterns detected in claim denial outcomes from the plurality of historical claims. The technical advantage of iterative residual learning is that each sequential tree corrects errors from previous trees while maintaining computational efficiency through shallow tree architectures with controlled depth parameters. The ACIS receives a second dataset from multiple secondary data sources in real-time. The second dataset includes a plurality of medical claims awaiting submission and associated with medical procedures, treatments, or services, wherein each medical claim comprises second attributes. The technical advantage of streaming data ingestion is that it enables proactive intervention before claim submission rather than reactive correction after denial.

Based on the machine learning model, the ACIS processes each medical claim using machine learning engines to extract claim features. For instance, this may include payer-specific patterns, provider histories, and coding relationships. The technical advantage of capturing complex interdependencies between claim elements that traditional rule-based systems miss through feature engineering that transforms raw claim attributes into predictive signals. The ACIS applies the trained machine learning models to generate a denial probability score and a denial category classification for each medical claim. The technical advantage of dual-output prediction is that it quantifies risk magnitude while simultaneously identifying specific denial reasons, enabling targeted corrections. The ACIS generates explainability values using SHAP to identify features that contribute to the denial probability score, providing the critical technical advantage of regulatory-compliant, transparent AI decisions. This enables every prediction to be traced back to specific claim features with quantified contribution values, which are essential for audit trails and payer appeals.

In an embodiment, for each medical claim having the denial probability score exceeding a threshold value, the ACIS identifies corrective actions based on the denial category classification and the explainability values, executes automated corrections to medical claims using automation agents configured for specific denial types, and re-scores the medical claims based on the automated corrections. The technical advantage of a self-healing claims ecosystem is that AI-driven insights trigger immediate remediation through automation agents that operate in parallel to maximize correction throughput. Upon verifying that the denial probability score is below the threshold, the ACIS sends medical claims to payer systems for processing, ensuring only clean claims with acceptable risk profiles enter the submission pipeline. The ACIS receives remittance data from payer systems, including the medical claim adjustment reason codes for any denied claims, and retrains the machine learning models on this data to improve future denial predictions. The technical advantage of a closed-loop learning architecture is that it continuously improves denial prediction accuracy by incorporating actual payer decisions as feedback signals for refining the model.

In an embodiment, the machine learning models comprise gradient-boosted decision tree ensemble models implemented using the LightGBM or XGBoost frameworks. Training machine learning models includes constructing decision trees with controlled depth, typically limited to 6-7 levels and containing approximately 63 leaf nodes, to prevent overfitting while maintaining sufficient model capacity. The training step may include applying gradient descent to minimize prediction error via sequential residual fitting, where each tree targets the pseudo-residuals of the ensemble's current predictions. The subsequent step may include implementing early stopping when validation performance plateaus, typically after 1,500-2,000 boosting rounds, as determined by monitoring the area under the receiver operating characteristic curve (ROC) metrics on a held-out validation set. The combined technical advantage of robust generalization to unseen claims while avoiding memorization of training data noise through regularization techniques, including minimum samples per leaf constraints and L1/L2 penalties on leaf values.

In an embodiment, the automation agents may include an authorization agent that interfaces with payer systems to verify and update prior authorization data through standardized 278 transaction protocols and proprietary payer application programming interfaces. The automation agent may further include a coding agent that validates and corrects procedure and diagnosis code combinations using natural language processing-based code mapping rules and clinical decision support logic. The automation agent may further include a coverage agent that verifies patient eligibility and benefit information via 270/271 electronic data interchange transactions with clearinghouses. The technical advantage of modular, specialized correction capabilities is that each automation agent maintains domain-specific expertise and can be independently updated as payer requirements evolve without affecting other system components. Extracting claim features comprises calculating rolling window statistics of historical denial rates per payer using exponentially weighted moving averages with configurable decay factors typically set between 0.9 and 0.95 to balance recency bias with statistical stability, encoding categorical variables using target encoding based on denial outcomes where each category level receives a smoothed mean denial rate calculated using Bayesian averaging with prior probabilities, and implementing interaction features between procedure codes and diagnosis codes through Cartesian products filtered by clinical relevance matrices, providing the technical advantage of capturing temporal patterns in payer behavior while mitigating overfitting through statistical regularization of high-cardinality categorical features.

In an embodiment, the ACIS processor comprises artificial intelligence processors, selected from Graphics Processing Units, Field-Programmable Gate Arrays, Application-Specific Integrated Circuits, or Neural Processing Units, configured to accelerate machine learning computations by massively parallelizing tree traversal operations. Graphics Processing Units, such as NVIDIA A10, A100, or L4 models, execute tree ensemble predictions in parallel thread blocks, where each thread processes one claim across the entire forest. This approach achieves throughput of 10-100 million predictions per minute in batch processing scenarios. Field-Programmable Gate Arrays (FPGAs) implement custom tree-traversal pipelines in a hardware description language, offering deterministic sub-100 microsecond latency suitable for real-time scoring requirements. Each tree-comparison operation maps to dedicated logic blocks connected through high-bandwidth on-chip interconnects. Application-Specific Integrated Circuits provide maximum energy efficiency for high-volume deployments by hardcoding the trained model weights into silicon, achieving power consumption below 25 watts while maintaining throughput exceeding 50 million predictions per minute. Neural Processing Units accelerate feature preprocessing operations, including embedding lookups and normalization computations that feed into gradient-boosted decision tree models.

In an embodiment, the ACIS further comprises operations to maintain a distributed feature store for caching computed features using Redis or Apache Ignite in-memory data grids with consistent hashing for horizontal scalability across multiple nodes, implement real-time scoring with a latency below 100 milliseconds achieved through model compilation to ONNX runtime format with optimized C++ inference serving layers, and route the medical claims to a corresponding automation agents based on denial type predictions using publish-subscribe message queuing with Apache Kafka or RabbitMQ for reliable asynchronous processing, providing the technical advantage of decoupled microservices architecture where scoring, correction, and submission components scale independently based on workload characteristics.

In an embodiment, receiving remittance data comprises parsing electronic remittance advice files in ANSI X12 835 format to extract denial codes, including claim adjustment reason codes and remittance advice remark codes, and mapping them to internal denial taxonomies. The next step may include correlating actual denial outcomes with predicted probabilities through probabilistic record linkage, utilizing claim control numbers and service line identifiers as matching keys. The subsequent step may include calculating a population stability index to detect distribution drift by comparing current feature distributions against training baselines using Kullback-Leibler divergence metrics with alert thresholds typically set at 0.25 for critical features, delivering the technical advantage of automated model monitoring that proactively identifies when retraining becomes necessary due to shifts in payer behavior or claim composition.

In an embodiment, the ACIS generates visual analytics, including dashboards displaying key performance indicators for denial rates segmented by payer, provider, service type, and time period, using interactive visualization libraries such as D3.js or Plotly. Explainability visualizations may display feature contributions to denial predictions through waterfall charts and force-directed graphs that map SHAP values to human-interpretable claim elements, as well as through compliance reports that provide decision transparency with complete audit trails, linking each correction action to the underlying model predictions and confidence scores. The technical advantage of actionable insights that enable revenue cycle managers to identify systemic issues and optimization opportunities while maintaining regulatory compliance documentation.

In an embodiment, the automated corrections include updating missing or incorrect authorization numbers by querying payer authorization databases and matching against scheduled procedures using fuzzy string matching algorithms with Levenshtein distance thresholds. The next steps may include modifying diagnosis codes to align with medical-necessity requirements using clinical decision support rules that map procedure-diagnosis pairs to payer-specific coverage policies. The next steps may include adjusting service dates to comply with timely filing limits by calculating submission windows from the date of service and automatically prioritizing claims approaching deadline thresholds. The next step may include correcting provider identification and credentialing information by validating national provider identifiers against the National Plan and Provider Enumeration System registry and cross-referencing with payer-specific provider enrollment files.

In an embodiment, the technical advantage of claim remediation is that it addresses the most common denial reasons through the deterministic application of rules augmented by machine learning insights. Interface with electronic health record systems includes extracting structured claim data in real-time via HL7 Fast Healthcare Interoperability Resources application programming interfaces and legacy HL7 version 2 message streams, utilizing message queuing for reliability and consistency. The next steps include storing computed features in a distributed cache implemented with Apache Ignite or Hazelcast, achieving sub-100-millisecond access latency through memory-optimized data structures and index-free adjacency. In an embodiment, bidirectional data flow is implemented to automatically update claim records based on denial predictions and correction outcomes, utilizing change data capture mechanisms and event sourcing patterns for enhanced auditability. Parallel-processing workflows can execute concurrently to validate authorization, coverage, and coding accuracy, utilizing thread pool executors with configurable concurrency limits based on system resources. The technical advantage of seamless integration with existing healthcare information technology infrastructure is that it maintains data consistency and transactional integrity.

In an embodiment, the computer-implemented method for claim integrity operates through receiving, by at least one processor, a first dataset from a plurality of first data sources with the data acquisition pipeline described for the ACIS implementation. The step of training gradient-boosted decision tree models with identical hyperparameters: a learning rate of 0.05, a maximum tree depth of 7, a minimum samples per leaf of 20, and L2 regularization with lambda=1.0. The step of receiving real-time claim streams through message-oriented middleware with guaranteed delivery semantics. The step of processing claims through the same feature extraction and model inference pipeline, achieving consistent sub-100 millisecond latency. The step of executing automated corrections via the agent architecture. The processor comprises artificial intelligence processors accelerates machine learning computations using the same hardware configurations, with Graphics Processing Units providing 10-30 million predictions per minute for edge-optimized models through parallel tree traversal, Field-Programmable Gate Arrays delivering deterministic 30-100 microsecond latency through pipelined tree evaluation circuits, and Application-Specific Integrated Circuits achieving maximum energy efficiency below 25 watts while maintaining throughput exceeding 500,000 queries per second for compressed models with pruned trees and quantized weights.

In an embodiment, the complete implementation demonstrates practical application through processing tens of thousands of medical claims monthly in production deployments. For instance, achieving a 25-40% reduction in preventable denials across authorization, eligibility, and coding categories as validated through randomized controlled trials, thereby reducing claim processing cycle time from 3-5 days to under 1 hour through automated correction workflows, enabling human billing specialists to focus on complex exception handling while automation agents manage 70-80% of routine corrections autonomously. This generates a return on investment exceeding 300% within the first year, primarily through reduced denial write-offs and accelerated cash flow, as documented in real-world healthcare system deployments.

In an embodiment, the ACIS operates as a closed-loop learning ecosystem, where machine learning models trained on historical claims using gradient-boosted decision trees with 2000 trees and 63 leaves each achieve an area under the receiver operating characteristic curve exceeding 0.85 for denial prediction. The automation agents correctly identified deficiencies with 95% accuracy for authorization issues and 89% accuracy for coding errors. The real-time scoring infrastructure processes streaming claims with 99.99% uptime via redundant model-serving endpoints. The continuous retraining includes weekly updates to remittance data, maintaining model performance despite evolving payer policies, and establishing a self-improving quality control loop that transforms reactive revenue cycle management into proactive claim optimization.

Figure 10:
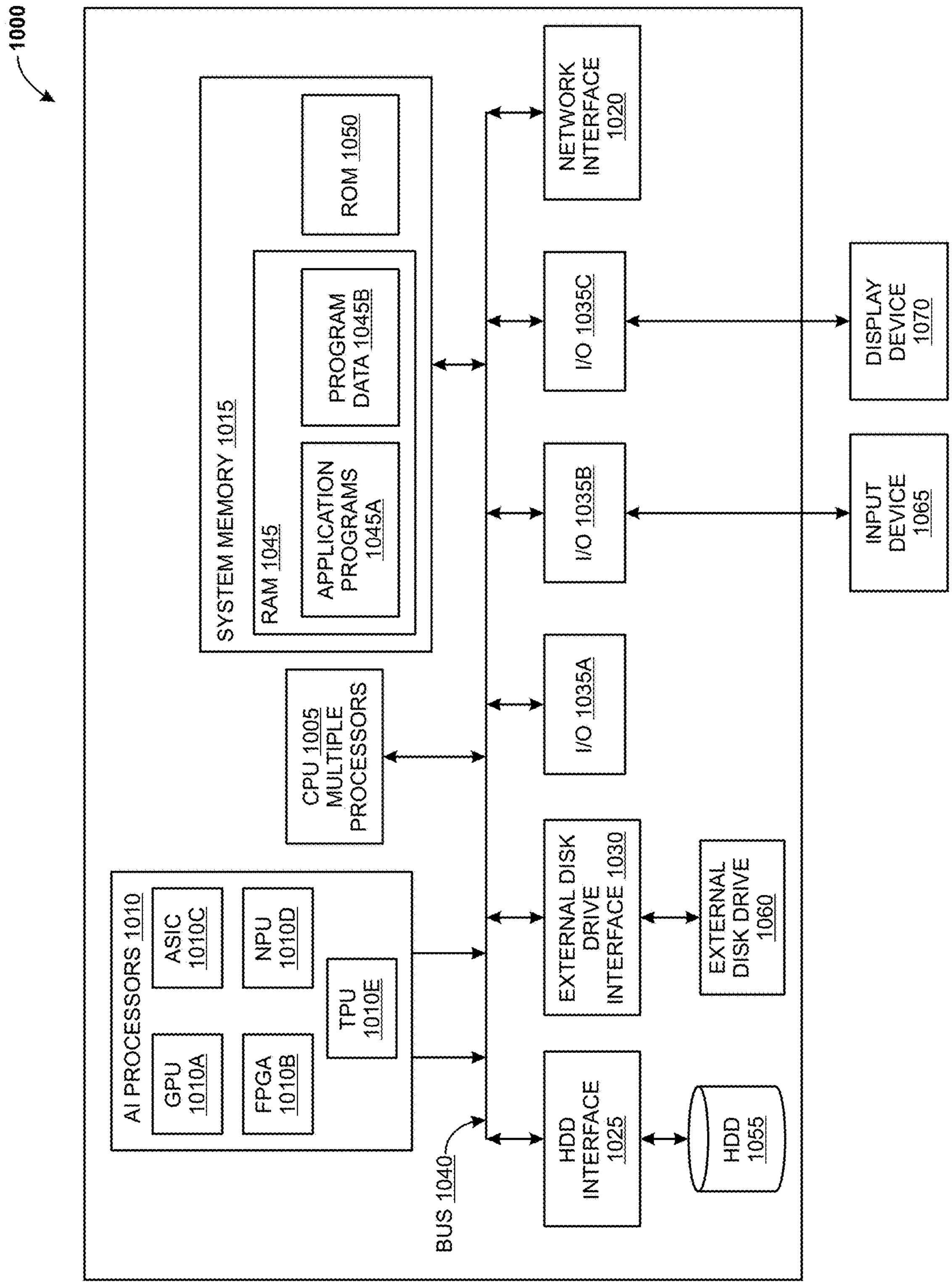
FIG. 10 illustrates an exemplary hardware configuration of a special-purpose computer that implements elements of the ACIS, according to exemplary embodiments.

FIG. 10 illustrates an exemplary hardware configuration of a special-purpose computer 1000 that implements elements of the ACIS, according to exemplary embodiments. The special-purpose computer 1000, shown in FIG. 10, includes CPU 1005, including multicore processors, AI processors 1010, including Graphics Processing Units (GPU) 1010A, Field-Programmable Gate Arrays (FPGA) 1010B, Application-Specific Integrated Circuits (ASIC) 1010C, Neural Processing Units (NPU) 1010D, Tensor Processing Units (TPU) 1010E, system memory 1015, network interface 1020, hard disk drive (HDD) interface 1025, external disk drive interface 1030, and input/output (I/O) interfaces 1035A, 1035B, 1035C. These above-described components or hardware elements of the special-purpose computer 1000 may be communicatively coupled to each other via a system bus 1038. In an embodiment, the CPU 1005 may execute arithmetic, logic, and/or control operations by accessing the system memory 1015. The CPU 1005 and the AI processors 1010 may implement the interfaces, processors, and other components of the exemplary devices and/or systems described above. The AI processors 1010 may execute AI operations. The AI processors 1010 may include multiple types of processors tailored or customized for implementing specific AI workloads.

In an embodiment, the GPU 1010A may be designed for rendering graphics and is highly effective for executing AI-related operations due to its parallel processing capabilities. The GPU 1010A can execute multiple calculations simultaneously and is suitable for training AI models. The GPU 1010A with AI-specific hardware (e.g., the ASIC 1010C, the NPU 1010D, the TPU 1010E, etc.) may be integrated to accelerate the AI tasks. For example, tensor cores may be designed to accelerate the training of neural networks and machine learning models by enhancing matrix multiplication, a fundamental operation in many AI algorithms. In an embodiment, the FPGA 1010B may be a reconfigurable processor implemented to execute specific AI tasks, thereby offering flexibility and efficiency in real-time applications. The FPGA 1010B may have a unique design that includes a series of interconnected, configurable logic blocks. The reprogrammability of the FPGA 1010B provides a high level of customization, enabling it to implement a wide range of AI applications.

In an embodiment, the ASIC 1010C may be custom-designed processors optimized for specific AI applications, providing high performance and energy efficiency. The ASIC 1010C may be designed solely to accelerate AI workloads. The ASIC 1010C is not reprogrammable, unlike the FPGA 1010B; however, its design enables significant improvements in speed and efficiency for tasks such as deep learning inference and training. In an embodiment, the NPU 1010D may be designed to execute AI operations or functions, particularly those involving neural networks. The NPU 1010D may be designed to accelerate neural network computations and is often integrated into CPUs or Systems on Chips (SoCs). The NPU 1010D can execute operations to process large volumes of data more efficiently than other general-purpose processors and perform various AI tasks, such as image recognition and natural language processing (NLP). The NPU 1010D may be used in mobile devices and personal computers to execute AI tasks without significantly increasing power consumption.

In an embodiment, the TPU 1010E may be designed specifically for accelerating machine learning workloads, particularly those involving tensor computations. The TPU 1010E can be utilized in data centers to power various AI services, including search algorithms and language translation. The TPU 1010E processor architecture may be optimized for high throughput and low latency, facilitating the implementation of large-scale AI applications. In an embodiment, the AI processors 1010, including the GPU 1010A, the FPGA 1010B, the ASIC 1010C, the NPU 1010D, and the TPU 1010E, may execute operations or functions to perform multiple complex operations, computations, and calculations simultaneously, thereby enabling faster execution of the AI tasks compared to the sequential processing of general-purpose CPUs. The AI processors 1010 may be designed to execute operations more efficiently. For example, low-precision arithmetic may be used to reduce power consumption, thereby improving the performance of the implemented AI applications. In an embodiment, the AI processors 1010 may be customized to implement specific AI models, machine learning models, machine learning engines, and AI applications, enabling optimized execution of operations or functions.

In an embodiment, implementing AI workloads or AI tasks using the AI processors 1010 may provide technical advantages, such as parallel processing, reduced precision, hardware optimization, energy efficiency, and support for neural networks. The AI processors 1010 may be designed with high parallelism, allowing them to execute multiple AI-related calculations simultaneously. AI tasks or AI workloads, such as matrix multiplication and vector operations, may be used in neural networks. The AI processors 1010 may use reduced-precision arithmetic (e.g., 8-bit or 14-bit) to improve computational and power efficiency while maintaining acceptable accuracy levels for AI tasks. The AI processors 1010 may include hardware components, such as multiply-accumulate (MAC) units and on-chip memory, to execute specific AI workloads. The AI processors 1010 may be optimized for neural network tasks, including forward and backward passes during training and inference, and support various neural network architectures and frameworks.

In an embodiment, the special-purpose computer 1000 does not necessarily include AI processors 1010, for example, if the special-purpose computer 1000 is used to implement a device other than a central processing device. The system memory 1015 may store information and/or instructions for use in combination with the CPU 1005. The system memory 1015 may include volatile and non-volatile memory, such as random-access memory (RAM) 1045 and read-only memory (ROM) 1040. A basic input/output system (BIOS) containing the basic routines that help to transfer information between elements within the special-purpose computer 1000, such as during start-up, may be stored in the ROM 1040. The system bus 1040 may be any of several types of bus structures, including a memory bus or memory controller, a peripheral bus, and a local bus utilizing various bus architectures.

The special-purpose computer 1000 may include the network interface 1020 for communicating with other computers and/or devices via a network.

Furthermore, the special-purpose computer 1000 may include a hard disk drive (HDD) 1055 for reading from and writing to a hard disk (not shown), as well as an external disk drive 1038 for reading from or writing to a removable disk (not shown). The removable disk may be a magnetic disk for a magnetic disk drive or an optical disk, such as a CD-ROM for an optical disk drive. The HDD 1055 and the external disk drive 1060 are connected to the system bus 1038 by the HDD interface 1025 and the external disk drive interface 1030, respectively. The drives and their associated non-transitory computer-readable media provide non-volatile storage of computer-readable instructions, data structures, program modules, and other data when the special-purpose computer operates as a general-purpose computer. The relevant data may be organized in a database, such as a relational or object database.

Although the exemplary environment described herein employs a hard disk (not shown) and an external disk (not shown), it should be appreciated by those skilled in the art that other types of computer-readable media which may store data that is accessible by a computer, such as magnetic cassettes, flash memory cards, digital video disks, random access memories, read-only memories, and the like, may also be used in the exemplary operating environment.

Several program modules may be stored on the hard disk, external disk, the ROM 1050, or the RAM 1045, including an operating system (not shown), application programs 1045A, other program modules (not shown), and program data 1045B. The application programs may include at least some of the functions described above.

The special-purpose computer 1000 may be connected to the input device 1065, such as a mouse and/or keyboard, and the display device 1070, such as a liquid crystal display, via corresponding I/O interfaces 1035A to 1035C and the system bus 1040. In addition to an implementation using a special-purpose computer 1000, as shown in FIG. 10, part or all of the functionality of the exemplary embodiments described herein may be implemented as hardware circuits. Examples of such hardware circuits include, but are not limited to, Large Scale Integration (LSI) and Reduced Instruction Set Computer (RISC) circuits.

One or more embodiments are now described with reference to the drawings, wherein reference numerals refer to elements throughout. Numerous specific details are provided in the following description to offer a thorough understanding of the various embodiments. It is evident, however, that the various embodiments may be practiced without these specific details (and without applying them to any networked environment or standard).

As used in this application, in some embodiments, the terms "component," "system," and the like are intended to refer to, or comprise, a computer-related entity or an entity related to an operational apparatus with one or more specific functionalities, wherein the entity may be either hardware, a combination of hardware and software, software, or software in execution. As an example, a component may be, but is not limited to, a process running on a processor, a processor, an object, an executable, a thread of execution, computer-executable instructions, a program, and/or a computer. By way of illustration, and not limitation, both an application running on a server and the server may be components.

The above descriptions and illustrations of embodiments, including what is described in the Abstract, are not intended to be exhaustive or to limit one or more embodiments to the precise forms disclosed. While specific embodiments of, and examples for, one or more embodiments are described herein for illustrative purposes, various equivalent modifications are possible within the scope, as those skilled in the relevant art will recognize. These modifications may be made in accordance with the above description. Rather, the scope is to be determined by the following claims, which are to be interpreted in accordance with established doctrines of claim construction.

What is claimed:

1. A system for detecting and correcting deficiencies in medical claims before submission to payer systems, comprising:

a processor;

a memory storing instructions which, when executed by the processor, cause the system to execute operations, to:

receive a first dataset from a plurality of first data sources, including one or more electronic health records and one or more payer records, wherein the first dataset includes a plurality of historical medical claims associated with approval outcomes and denial outcomes, wherein each historical claim includes one or more first attributes, including procedure codes, diagnosis codes, payer identifiers, and historical denial reasons;

using a plurality of machine learning engines, train a plurality of machine learning models based on the received first dataset, wherein training the plurality of machine learning models includes adjusting weights of nodes in gradient boosted decision trees based on patterns detected in one or more claim denial outcomes from the plurality of historical medical claims;

receive a second dataset from a plurality of second data sources in real-time, wherein the second dataset includes a plurality of medical claims awaiting submission and associated with one or more medical procedures, treatments, or services, wherein each medical claim awaiting submission comprises one or more second attributes;

based on the trained plurality of machine learning models, process each medical claim awaiting submission from the plurality of medical claims awaiting submission by one or more machine learning engines, by:

extracting one or more claim features from each medical claim awaiting submission, including one or more of payer-specific patterns, provider histories, and coding relationships;

applying the trained plurality of machine learning models to generate a denial probability score and a denial category classification for each medical claim awaiting submission; and generating one or more explainability values using Shapley additive explanations (SHAP) analysis to identify one or more features that contribute to the denial probability score;

for each medical claim awaiting submission, having the denial probability score exceeding a threshold value:

identify one or more corrective actions based on the denial category classification and the one or more explainability values;

execute one or more automated corrections to one or more medical claims awaiting submission using one or more automation agents configured for specific denial types, wherein an automation orchestrator:

evaluates denial-type probability distributions for one or more medical claims awaiting submission from the plurality of medical claims awaiting submission, each having the denial probability score exceeding the threshold value, analyzes the denial category classification and the one or more explainability values, to identify the one or more corrective actions required for each medical claim awaiting submission, sends one or more correction tasks to the one or more automation agents corresponding to the one or more identified corrective actions based on configurable routing rules and priority weights, tracks claim state transitions using a finite-state machine model comprising one or more states, including scored, queued, in-correction, corrected, rescored, clean, and submitted, and coordinates sequential correction dependencies, wherein eligibility verification is completed before authorization checks, and authorization updates are completed before coding validation; and re-score the one or more medical claims awaiting submission based on the one or more automated corrections, wherein the re-scoring comprises:

extracting one or more feature vectors reflecting corrected claim attributes, recalculating the denial probability score using the trained plurality of machine learning models, evaluating whether a recalculated denial probability score has decreased below a configurable clean claim threshold, and, for medical claims awaiting submission remaining above the clean claim threshold, routing the medical claims awaiting submission back for additional correction by the one or more automation agents in an iterative correction loop, wherein the iterative correction loop enforces a maximum iteration limit, and upon reaching the maximum iteration limit without achieving the clean claim threshold, routing one or more medical claims awaiting submission to one or more exception-handling workflows; and upon verifying the denial probability score is below the threshold value, send the one or more medical claims awaiting submission to the payer systems for processing;

receive remittance data from the payer systems, including medical claim adjustment reason codes for any of the medical claims awaiting submission that are denied by the payer systems; and retrain the plurality of machine learning models based on the remittance data to improve future denial predictions, wherein the system operates as a closed-loop learning architecture that continuously improves denial prediction accuracy and maintains medical claim integrity by detecting and correcting deficiencies in the medical claims awaiting submission.

2. The system of claim 1, wherein the plurality of machine learning models comprises gradient boosted decision tree ensemble models, and wherein training the plurality of machine learning models, comprises:

constructing decision trees with controlled depth to prevent overfitting;

applying gradient descent optimization to minimize prediction error; and implementing early stopping when validation performance plateaus.

3. The system of claim 1, wherein the one or more automation agents, comprise:

an authorization agent that interfaces with the payer systems to verify and update prior authorization data;

a coding agent that validates and corrects procedure and diagnosis code combinations; and a coverage agent that verifies patient eligibility and benefit information.

4. The system of claim 1, wherein extracting the one or more claim features, comprises:

calculating rolling window statistics of historical denial rates per payer;

encoding categorical variables using target encoding based on denial outcomes; and implementing interaction features between procedure codes and diagnosis codes.

5. The system of claim 1, wherein the processor comprises one or more artificial intelligence processors selected from Graphics Processing Units, Field-Programmable Gate Arrays, Application-Specific Integrated Circuits, or Neural Processing Units configured to accelerate machine learning computations.

6. The system of claim 1, further comprising operations to:

maintain a distributed feature store for caching computed features;

implement real-time scoring with latency below 100 milliseconds; and route the one or more medical claims awaiting submission to corresponding one or more automation agents based on the denial-type probability distributions, wherein routing comprises publishing, by the automation orchestrator, the one or more correction tasks to event-driven messaging topics corresponding to specific denial categories, subscribing, by each of the one or more automation agents, to message queue topics corresponding to its respective denial category, and processing, by the one or more automation agents, the one or more correction tasks asynchronously in parallel, wherein multiple correction workflows execute concurrently for one or more medical claims awaiting submission having multiple elevated denial-type probabilities, and wherein the automation orchestrator implements load-balancing mechanisms that distribute the one or more correction tasks across multiple instances of the one or more automation agents to achieve horizontal scalability and prevent processing bottlenecks during peak claim volumes.

7. The system of claim 1, wherein receiving the remittance data, comprises:

parsing electronic remittance advice files to extract denial codes;

correlating actual denial outcomes with predicted probabilities; and calculating a population stability index to detect distribution drift, and wherein retraining the plurality of machine learning models comprises implementing temporal validation using out-of-time validation in which training is performed on historical medical claims from earlier time periods and validation is performed on more recent medical claims to simulate realistic deployment conditions, comparing a candidate retrained model against a currently deployed production model across validation metrics through automated model quality gates, wherein the candidate retrained model must demonstrate a statistical improvement or maintain performance within acceptable degradation tolerances to qualify for promotion to production deployment, deploying the candidate retrained model through progressive deployment using shadow mode in which the candidate retrained model scores production medical claims in parallel with the currently deployed production model without influencing operational decisions, and maintaining automated rollback capabilities that detect performance degradation in the candidate retrained model through continuous monitoring and automatically revert to a previous model version when the performance degradation exceeds predetermined thresholds.

8. The system of claim 1, further comprising operations to generate visual analytics, including:

dashboards displaying key performance indicators for denial rates;

explainability visualizations showing one or more feature contributions to denial predictions; and compliance reports displaying decision transparency.

9. The system of claim 1, wherein the one or more automated corrections, comprises:

updating missing or incorrect authorization numbers;

modifying diagnosis codes to align with medical necessity requirements;

adjusting service dates to comply with timely filing limits; and correcting provider identification and credentialing information.

10. The system of claim 1, further comprising interfacing with one or more electronic health record systems using an integration engine, wherein the interfacing comprises:

extracting structured claim data in real-time and storing computed features in a distributed cache with sub-100 millisecond access latency;

implementing bidirectional data flow that automatically updates of the one or more medical claims awaiting submission based on denial predictions and correction outcomes, wherein implementing the bidirectional data flow comprises modifying one or more medical claim attributes in the one or more electronic health record systems through the integration engine, the one or more claim attributes including one or more of authorization numbers, diagnosis codes service dates, and provider information, and performing atomic feature updates that refresh the computed features stored in the distributed cache when the one or more claim attributes are modified, thereby recalculating derived features including submission lag metrics and payer denial rate statistics to reflect a current claim state during re-scoring operations; and executing parallel processing workflows for concurrent validation of authorization, coverage, and coding accuracy.

11. A computer-implemented method for detecting and correcting deficiencies in medical claims before submission to payer systems, comprising:

receiving, by at least one processor, a first dataset from a plurality of first data sources, including one or more electronic health records and one or more payer records, wherein the first dataset includes a plurality of historical medical claims associated with approval outcomes and denial outcomes, wherein each historical claim includes one or more first attributes, including procedure codes, diagnosis codes, payer identifiers, and historical denial reasons;

training, using a plurality of machine learning engines, a plurality of machine learning models based on the received first dataset, wherein training the plurality of machine learning models, includes adjusting weights of nodes in gradient boosted decision trees based on patterns detected in one or more claim denial outcomes from the plurality of historical medical claims;

receiving, by the at least one processor, a second dataset from a plurality of second data sources in real-time, wherein the second dataset includes a plurality of medical claims awaiting submission and associated with one or more medical procedures, treatments, or services, wherein each medical claim awaiting submission comprises one or more second attributes;

processing, based on the trained plurality of machine learning models, each medical claim awaiting submission from the plurality of medical claims awaiting submission by one or more machine learning engines, wherein the processing comprises:

extracting one or more claim features from each medical claim awaiting submission, including one or more of payer-specific patterns, provider histories, and coding relationships;

applying the trained plurality of machine learning models to generate a denial probability score and a denial category classification for each medical claim awaiting submission; and generating one or more explainability values using Shapley additive explanations (SHAP) analysis to identify one or more features that contribute to the denial probability score;

for each medical claim awaiting submission, having the denial probability score exceeding a threshold value:

identifying one or more corrective actions based on the denial category classification and the one or more explainability values;

executing one or more automated corrections to one or more medical claims awaiting submission using one or more automation agents configured for specific denial types, wherein an automation orchestrator:

evaluates denial-type probability distributions for one or more medical claims awaiting submission from the plurality of medical claims awaiting submission, each having the denial probability score exceeding the threshold value, analyzes the denial category classification and the one or more explainability values, to identify the one or more corrective actions required for each medical claim awaiting submission, sends one or more correction tasks to the one or more automation agents corresponding to the one or more identified corrective actions based on configurable routing rules and priority weights, tracks claim state transitions using a finite-state machine model comprising one or more states, including scored, queued, in-correction, corrected, rescored, clean, and submitted, and coordinates sequential correction dependencies, wherein eligibility verification is completed before authorization checks, and authorization updates are completed before coding validation;

re-scoring the one or more medical claims awaiting submission based on the one or more automated corrections, wherein the re-scoring comprises:

extracting one or more feature vectors reflecting corrected claim attributes, recalculating the denial probability score using the trained plurality of machine learning models, evaluating whether a recalculated denial probability score has decreased below a configurable clean claim threshold, and, for medical claims awaiting submission remaining above the clean claim threshold, routing the medical claims awaiting submission back for additional correction by the one or more automation agents in an iterative correction loop, wherein the iterative correction loop enforces a maximum iteration limit, and upon reaching the maximum iteration limit without achieving the clean claim threshold, routing one or more medical claims awaiting submission, to one or more exception-handling workflows; and upon verifying the denial probability score is below the threshold value, sending the one or more medical claims awaiting submission to the payer systems for processing;

receiving remittance data from the payer systems, including medical claim adjustment reason codes for any of the medical claims awaiting submission that are denied by the payer systems; and retraining the plurality of machine learning models based on the remittance data to improve future denial predictions, wherein the computer-implemented method operates as a closed-loop learning process that continuously improves denial prediction accuracy and maintains medical claim integrity by detecting and correcting deficiencies the medical claims awaiting submission.

12. The method of claim 11, wherein the plurality of machine learning models comprises gradient boosted decision tree ensemble models, and wherein training the plurality of machine learning models, comprises:

constructing decision trees with controlled depth to prevent overfitting;

applying gradient descent optimization to minimize prediction error; and implementing early stopping when validation performance plateaus.

13. The method of claim 11, wherein executing the one or more automated corrections using the one or more automation agents, comprises:

interfacing, by an authorization agent, with the payer systems to verify and update prior authorization data;

validating and correcting, by a coding agent, procedure and diagnosis code combinations; and verifying, by a coverage agent, patient eligibility and benefit information.

14. The method of claim 11, wherein extracting the one or more claim features, comprises:

calculating rolling window statistics of historical denial rates per payer;

encoding categorical variables using target encoding based on denial outcomes; and implementing interaction features between procedure codes and diagnosis codes.

15. The method of claim 11, wherein the at least one processor comprises one or more artificial intelligence processors selected from Graphics Processing Units, Field-Programmable Gate Arrays, Application-Specific Integrated Circuits, or Neural Processing Units, and wherein the method further comprises:

accelerating machine learning computations using the one or more artificial intelligence processors.

16. The method of claim 11, further comprising:

maintaining a distributed feature store for caching computed features;

implementing real-time scoring with latency below 100 milliseconds; and routing the one or more medical claims awaiting submission to corresponding one or more automation agents based on the denial-type probability distributions, wherein routing comprises publishing, by the automation orchestrator, the one or more correction tasks to event-driven messaging topics corresponding to specific denial categories, subscribing, by each of the one or more automation agents, to message queue topics corresponding to its respective denial category, and processing, by the one or more automation agents, the one or more correction tasks asynchronously in parallel, wherein multiple correction workflows execute concurrently for one or more medical claims awaiting submission having multiple elevated denial-type probabilities, and wherein the automation orchestrator implements load-balancing mechanisms that distribute the one or more correction tasks across multiple instances of the one or more automation agents to achieve horizontal scalability and prevent processing bottlenecks during peak claim volumes.

17. The method of claim 11, wherein receiving the remittance data, comprises:

parsing electronic remittance advice files to extract denial codes;

correlating actual denial outcomes with predicted probabilities; and calculating a population stability index to detect distribution drift, and wherein retraining the plurality of machine learning models comprises implementing temporal validation using out-of-time validation in which training is performed on historical medical claims from earlier time periods and validation is performed on more recent medical claims to simulate realistic deployment conditions, comparing a candidate retrained model against a currently deployed production model across validation metrics through automated model quality gates, wherein the candidate retrained model must demonstrate a statistical improvement or maintain performance within acceptable degradation tolerances to qualify for promotion to production deployment, deploying the candidate retrained model through progressive deployment using shadow mode in which the candidate retrained model scores production medical claims in parallel with the currently deployed production model without influencing operational decisions, and maintaining automated rollback capabilities that detect performance degradation in the candidate retrained model through continuous monitoring and automatically revert to a previous model version when the performance degradation exceeds predetermined thresholds.

18. The method of claim 11, further comprising generating visual analytics, wherein generating visual analytics comprises:

displaying, via dashboards, key performance indicators for denial rates;

visualizing explainability data showing one or more feature contributions to denial predictions; and generating compliance reports displaying decision transparency.

19. The method of claim 11, wherein executing the one or more automated corrections, comprises:

updating missing or incorrect authorization numbers;

modifying diagnosis codes to align with medical necessity requirements;

adjusting service dates to comply with timely filing limits; and correcting provider identification and credentialing information.

20. The method of claim 11, further comprising interfacing with one or more electronic health record systems using an integration engine, wherein the interfacing comprises:

extracting structured claim data in real-time and storing computed features in a distributed cache with sub-100 millisecond access latency;

implementing bidirectional data flow that automatically updates of the one or more medical claims awaiting submission based on denial predictions and correction outcomes, wherein implementing the bidirectional data flow comprises modifying one or more medical claim attributes in the one or more electronic health record systems through the integration engine, the one or more claim attributes including one or more of authorization numbers, diagnosis codes, service dates, and provider information, and performing atomic feature updates that refresh the computed features stored in the distributed cache when the one or more claim attributes are modified, thereby recalculating derived features including submission lag metrics and payer denial rate statistics to reflect a current claim state during re-scoring operations; and executing parallel processing workflows for concurrent validation of authorization, coverage, and coding accuracy.

* * * * *